United States Patent
Ishii et al.

(10) Patent No.: US 9,767,108 B2
(45) Date of Patent: Sep. 19, 2017

(54) RETRIEVAL DEVICE, METHOD FOR CONTROLLING RETRIEVAL DEVICE, AND RECORDING MEDIUM

(75) Inventors: Yohsuke Ishii, Tokyo (JP); Shoji Kodama, Tokyo (JP)

(73) Assignee: HITACHI SOLUTIONS, LTD., Tokyo (JP)

(*) Notice: Subject to any disclaimer, the term of this patent is extended or adjusted under 35 U.S.C. 154(b) by 287 days.

(21) Appl. No.: 14/413,868

(22) PCT Filed: Jul. 13, 2012

(86) PCT No.: PCT/JP2012/067942
§ 371 (c)(1),
(2), (4) Date: Jan. 9, 2015

(87) PCT Pub. No.: WO2014/010082
PCT Pub. Date: Jan. 16, 2014

(65) Prior Publication Data
US 2015/0213043 A1    Jul. 30, 2015

(51) Int. Cl.
G06F 17/30 (2006.01)

(52) U.S. Cl.
CPC .. *G06F 17/30106* (2013.01); *G06F 17/30091* (2013.01); *G06F 17/30203* (2013.01); *G06F 17/30292* (2013.01); *G06F 17/30336* (2013.01); *G06F 17/30917* (2013.01)

(58) Field of Classification Search
CPC ......... G06F 17/30106; G06F 17/30091; G06F 17/30203; G06F 17/30292; G06F 17/30336; G06F 17/30917
See application file for complete search history.

(56) References Cited

U.S. PATENT DOCUMENTS

| 7,051,019 | B1* | 5/2006 | Land ............... G06F 17/30265 |
| 7,613,993 | B1* | 11/2009 | Baer ............... G06F 17/2229 |
| | | | 707/999.001 |
| 7,716,198 | B2* | 5/2010 | Meyerzon ......... G06F 17/30684 |
| | | | 707/706 |
| 7,725,454 | B2 | 5/2010 | Kamani et al. |
| 7,734,644 | B2* | 6/2010 | Gras ............... G06F 17/30855 |
| | | | 707/770 |
| 7,739,260 | B1* | 6/2010 | Anati ............... G06F 17/30528 |
| | | | 707/706 |

(Continued)

OTHER PUBLICATIONS

PCT International Search Report and Written Opinion on application PCT/JP2012/067942 mailed Oct. 23, 2012; 5 pages, with English translation of Search Report.

*Primary Examiner* — Huawen A Peng
(74) *Attorney, Agent, or Firm* — Foley & Lardner LLP

(57) ABSTRACT

A search device receives a search request, extracts at least one of an alias or a metadata name from the search request, converts the alias to metadata name by referring to metadata schema management information for managing in an inclusive manner a namespace alias and a metadata name for the retrieval device to identify a metadata schema definition defining the structure of a retrieval-target file that includes metadata, and specifies a field name from the metadata name by referring to schema mapping management information for managing the corresponding relationship between a metadata name of metadata schema definition information and a field name of the retrieval index schema definition.

18 Claims, 55 Drawing Sheets

(56) References Cited

U.S. PATENT DOCUMENTS

| | | | |
|---|---|---|---|
| 7,890,886 B2* | 2/2011 | Matthews | G06F 9/4443 |
| | | | 715/808 |
| 8,433,697 B2* | 4/2013 | Osterman | G06F 17/301 |
| | | | 707/706 |
| 2007/0016546 A1* | 1/2007 | De Vorchik | G06F 17/30091 |
| 2009/0024587 A1* | 1/2009 | Kamani | G06F 17/30613 |
| 2014/0006345 A1* | 1/2014 | Laitkorpi | G06F 3/0647 |
| | | | 707/610 |

* cited by examiner

7000

```
<?xml version="1.0"?>
<xsd:schema
   targetNamespace="http://AAA.com/ProductA/v2"
   xmlns:xsd="http://www.w3.org/2001/XMLSchema"
   xmlns:proa="http://AAA.com/ProductA/v2">

<xsd:element name="ProductA" type="dcm:ProductAType"/>

<xsd:complexType name="ProductAType">
 <xsd:sequence>
  <xsd:element ref="proa:PatientID" />
  <xsd:element ref="proa:PatientName" />
  <xsd:element ref="proa:VendorCustomID" />
   ...
 </xsd:sequence>
</xsd:complexType>

<xsd:element name="PatientID" type="xsd:integer" />
<xsd:element name="PatientName" type="xsd:string" />
<xsd:element name="VendorPatientID" type="xsd:integer" />
...
</xsd:schema>
```

*FIG. 7*

| ID 7110 | NAMESPACE ALIAS 7120 | NAMESPACE NAME 7130 | METADATA NAME 7140 | METADATA TYPE 7150 |
|---|---|---|---|---|
| 1 | A2 | http://AAA.com/ProductA/v2 | /ProductA | DicomType |
| 2 | A2 | http://AAA.com/ProductA/v2 | /ProductA/PatientID | integer |
| 3 | A2 | http://AAA.com/ProductA/v2 | /ProductA/PatientName | string |
| 4 | A2 | http://AAA.com/ProductA/v2 | /ProductA/VendorPatientID | integer |

| MAPPING ID | NAMESPACE NAME | METADATA NAME | FIELD NAME | FIELD TYPE | FIELD ALIAS |
|---|---|---|---|---|---|
| 101 | http://AAA.com/ProductA/v2 | /ProductA | <NONE> | <NONE> | <NONE> |
| 102 | http://AAA.com/ProductA/v2 | /ProductA/PatientID | CUSTOMMETA_A2_/ProductA/PatientID | integer | PatientID |
| 103 | http://AAA.com/ProductA/v2 | /ProductA/PatientName | CUSTOMMETA_A2_/ProductA/PatientName | string | PatientName |
| 104 | http://AAA.com/ProductA/v2 | /ProductA/VendorPatientID | CUSTOMMETA_A2_/ProductA/VendorPatientID | integer | VendorPatientID |

FIG. 9

| FIELD NAME | FIELD TYPE | ... |
|---|---|---|
| filename | string | ... |
| filesize | integer | ... |
| changetime | date | ... |
| content | text | ... |
| ... | ... | ... |
| CUSTOMMETA_A2_/ProductA/PatientID | integer | ... |
| CUSTOMMETA_A2_/ProductA/PatientName | string | ... |
| CUSTOMMETA_A2_/ProductA/VendorPatientID | integer | ... |

| FIELD NAME | FIELD VALUE | LOCATIONAL INFORMATION | | | | | |
|---|---|---|---|---|---|---|---|
| | | FILE IDENTIFICATION INFORMATION | LOCATIONAL OFFSET | WEIGHT | FILE IDENTIFICATION INFORMATION | LOCATIONAL OFFSET | WEIGHT |
| filename | example1.xml | f1 | NULL | 1.0 | NULL | NULL | 0 | ... |
| | example2.xml | f2 | NULL | 1.0 | NULL | NULL | 0 | ... |
| filesize | 100 | f1 | NULL | 1.0 | NULL | NULL | 0 | ... |
| | 200 | f2 | NULL | 1.0 | NULL | NULL | 0 | ... |
| changetime | 2010/10/20 12:34:56 | f1 | NULL | 1.0 | NULL | NULL | 0 | ... |
| | 2010/11/22 10:30:00 | f2 | NULL | 1.0 | NULL | NULL | 0 | ... |

| FIELD NAME (7410) | FIELD VALUE (7420) | LOCATIONAL INFORMATION (7430) | | | | | | |
|---|---|---|---|---|---|---|---|---|
| | | FILE IDENTIFICATION INFORMATION (7431) | LOCATIONAL OFFSET (7432) | WEIGHT (7433) | FILE IDENTIFICATION INFORMATION (7434) | LOCATIONAL OFFSET (7435) | WEIGHT (7436) | ... |
| content | abc | f1 | 20, 40 | 1.0, 0.5 | f2 | 15 | 1.0 | ... |
| | def | f2 | 40 | 0.5 | NULL | NULL | 0 | ... |
| | hij | f1 | 70 | 0.8 | NULL | NULL | 0 | ... |
| | ... | ... | ... | ... | ... | ... | ... | ... |
| CUSTOMMETA_A2_/ProductA/PatientID | 1000 | f1 | NULL | 1.0 | NULL | NULL | 0 | ... |
| | 1001 | f2 | NULL | 1.0 | NULL | NULL | 0 | ... |
| CUSTOMMETA_A2_/ProductA/PatientName | Alice | f1 | NULL | 1.0 | NULL | NULL | 0 | ... |
| | Bob | f2 | NULL | 1.0 | NULL | NULL | 0 | ... |
| CUSTOMMETA_A2_/ProductA/VendorPatientID | 777 | f1 | NULL | 1.0 | NULL | NULL | 0 | ... |
| | 888 | f2 | NULL | 1.0 | NULL | NULL | 0 | ... |

| FILE IDENTIFICATION INFORMATION | FILEPATH NAME |
|---|---|
| f1 | /dir1/file1 |
| f2 | /dir1/file2 |
| ... | ... |

CALL SCHEMA MAPPING MANAGEMENT TABLE — 8310

8311 — NAMESPACE ALIAS   [A2 ▽]   [Call]
                                   8312

REGISTER SEARCH INDEX SCHEMA MANAGEMENT TABLE — 8320

8326  8321       8322           8323        8324              8325

| | MAPPING ID | FIELD UPDATE FLAG | NAMESPACE ALIAS | FIELD NAME | FIELD TYPE | ... |
|---|---|---|---|---|---|---|
| ☐ | 101 | NO | A2 | <NONE> | <NONE> | ... |
| ☐ | 102 | YES | A2 | CUSTOMMETA_A2_/ProductA/PatientID | integer | ... |
| ☐ | 103 | YES | A2 | CUSTOMMETA_A2_/ProductA/PatientName | string | ... |
| ☐ | 104 | YES | A2 | CUSTOMMETA_A2_/ProductA/VendorPatientID | integer | ... |

[EDIT]  [DELETE]  [REGISTER]  [CANCEL]
 8327    8328      8329        8330

ENTER SEARCH CONDITIONS — 8410

| Namespace Alias ▽ | is ▽ | A2 ▽ | [+] [−] |
| AND ▽ | PatientID ▽ | is ▽ | 1000 ▽ | [+] [−] |
| OR ▽ | ▽ | ▽ | ▽ | [+] [−] |

Search — 8411

8420
SEARCH RESULTS   LIST   TABLE   SORT BY  filesize ▽   ASC   DESC
                 8421   8422             8423          8424  8425

8430

1. example1.xml filesize: 100
   changetime: 2010/10/20 12:34:56
   PatientID: 1000
   PatientName: Alice
   VendorPatientID: 777

2. example1-2.xml filesize: 120
   changetime: 2010/12/20 10:00:00
   PatientID: 1000
   PatientName: Alice
   VendorPatientID: 777

ENTER SEARCH CONDITIONS

| Namespace Alias ▽ | is ▽ | A2 ▽ | [+][−] |

| AND ▽ | PatientID ▽ | is ▽ | 1000 ▽ | [+][−] |

| OR ▽ | ▽ | ▽ | ▽ | [+][−] |

[Search]

8411

8420

SEARCH RESULTS  [LIST]  [TABLE]  SORT BY [filesize ▽]  [ASC] [DESC]

8440  8421  8422  8423  8424  8425

| filename | file size | change time | Patient ID | Patient Name | Vendor PatientID |
|---|---|---|---|---|---|
| example1.xml | 100 | 2010/10/20 12:34:56 | 1000 | Alice | 777 |
| example1-2.xml | 120 | 2010/12/20 10:00:00 | 1000 | Alice | 777 |

*FIG. 22*

| FIELD NAME | FIELD TYPE | LATEST SCHEMA DEFINITION UPDATE TIME | ... |
|---|---|---|---|
| filename | string | 2008/10/10 14:00:00 | ... |
| filesize | integer | 2008/10/10 14:00:00 | ... |
| changetime | date | 2008/10/10 14:00:00 | ... |
| content | text | 2008/10/10 14:00:00 | ... |
| ... | ... | ... | ... |
| CUSTOMMETA_A2_/ProductA/PatientID | integer | 2010/12/10 20:00:00 | ... |
| CUSTOMMETA_A2_/ProductA/PatientName | string | 2010/12/10 20:00:00 | ... |
| CUSTOMMETA_A2_/ProductA/VendorPatientID | integer | 2010/12/10 20:00:00 | ... |

*FIG. 24*

| FIELD NAME (7310) | FIELD TYPE (7320) | LATEST SCHEMA DEFINITION UPDATE TIME (7330) | ... |
|---|---|---|---|
| filename | string | 2008/10/10 14:00:00 | ... |
| filesize | integer | 2008/10/10 14:00:00 | ... |
| changetime | date | 2008/10/10 14:00:00 | ... |
| content | text | 2008/10/10 14:00:00 | ... |
| ... | ... | ... | ... |
| MetadataName | string[] | 2010/12/10 20:00:00 | ... |
| CUSTOMMETA_A2_/ProductA/PatientID | integer | 2010/12/10 20:00:00 | ... |
| CUSTOMMETA_A2_/ProductA/PatientName | string | 2010/12/10 20:00:00 | ... |
| CUSTOMMETA_A2_/ProductA/VendorPatientID | integer | 2010/12/10 20:00:00 | ... |

| METADATA ID | METADATA NAME | FILE LIST |
|---|---|---|
| 1 | /ProductA | f1, f2 |
| 2 | /ProductA/PatientID | f1, f2 |
| 3 | /ProductA/PatientName | f1, f2 |
| 4 | /ProductA/VendorPatientID | f1, f2 |

FIG. 31

| OCCURRENCE TIME | OPERATION TYPE | OBJECT TYPE | PATH NAME |
|---|---|---|---|
| 2011/04/15 10:00:00 | CREATION | FILE | /DirA/FileP |
| 2011/04/15 11:00:00 | UPDATE | FILE | /DirA/FileP |
| 2011/04/15 11:30:00 | DELETION | FILE | /DirB/FileX |

7710 / 7720 / 7730 / 7740

7700

*FIG. 44*

RETRIEVAL DEVICE, METHOD FOR CONTROLLING RETRIEVAL DEVICE, AND RECORDING MEDIUM

BACKGROUND

This invention relates to a method of controlling a search server for providing a function of searching files stored in a file storage system.

The use of computers is expanding in various industries and various usages because of improvement in performance and more inexpensive prices. In recent years, data files stored in computer systems have been increased massively. In managing such a huge number of files, there has occurred a problem that users cannot know the place storing an intended file.

To address this problem, full-text search services and metadata search services have come into use.

In a full-text search service, a search server parses file data stored in a computer system to prepare search indices. A user sends a search query to search for an intended file to the search server so that the user can access the target file based on the search results returned from the search server.

In a metadata search service, the search server extracts combinations of data composed of a metadata name and a metadata value included in each file to be searched and creates a search index of the combinations of data. A user specifies a search condition on the metadata name and the metadata value to acquire search results.

These search services will be more important for the users and will be more widely used because the file data to be stored in a computer system will increase more and more and users will have difficulty in knowing which place stores which file data for all the file data.

Traditional search servers for providing a metadata search service require to pre-register definition information defining which metadata is to be indexed for search, based on the data format for metadata search and definition information on data schema. This definition information needs to include metadata names for identifying the names of metadata and metadata types for defining possible values and data structures of metadata.

The data format for metadata search is not limited to only one kind; a metadata search may be conducted on files in different data formats. In such a case, the search server requires registration of definition information on metadata in each data format.

A known technique to manage definition information on metadata in multiple data formats is that the search server manages definition information on multiple data formats and mapping definition information for integrally managing the multiple data formats. Such a technique is disclosed in, for example, U.S. Pat. No. 7,725,454 B2. The technique according to U.S. Pat. No. 7,725,454 B2 allows metadata names in different data formats to be expressed in a unified notation. As a result, the search server can access metadata based on the unified notation, achieving indexing or searching using the unified notation.

SUMMARY

The technique according to U.S. Pat. No. 7,725,454 B2 can handle metadata in multiple data formats with a unified notation; however, a problem may arise that files having specific metadata have difficulty to be identified.

This problem is caused by the fact that, since the search server manages the metadata names in a united notation, there is no option other than using either original metadata names or metadata names in the unified notation used by the search server when a user uses a search service.

The former case using the original metadata names has difficulty in discrimination, if identical metadata names exist among multiple data formats. Accordingly, a metadata search results in extraction of files including metadata having the identical names but differing in usage, leading to difficulty in obtaining desired results.

The latter case using metadata in a unified notation assigns a name having a long character string mechanically to prevent a conflict among metadata names in different data formats under the unified notation. If a user directly designates this name, the convenience of the search service will be lost, leading to difficulty in identifying files having specific metadata.

In view of the above, for a user of a search service to efficiently obtain files including desired metadata as search results, demanded is a control technique to directly and easily identify files having specific metadata.

This invention enables designation of aliases for convenience of search as search conditions for metadata search, in addition to original metadata names in a data format or metadata names assigned by a search server. As a result, even if the data to be searched are in different data formats, the search apparatus can easily identify files having specific metadata, so that a search service can be applied to files including any desired metadata.

BRIEF DESCRIPTION OF THE DRAWINGS

FIG. 7 is a diagram illustrating a configuration of a schema definition file according to the first embodiment of this invention.

FIG. 8 is a diagram illustrating a configuration of a metadata schema management table according to the first embodiment of this invention.

FIG. 9 is a diagram illustrating a configuration of a schema mapping management table according to the first embodiment of this invention.

FIG. 10 is a diagram illustrating a configuration of a search index schema management table according to the first embodiment of this invention.

FIG. 11A is a diagram illustrating a configuration of a search index management table according to the first embodiment of this invention.

FIG. 11B is a diagram illustrating a configuration of a search index management table according to the first embodiment of this invention.

FIG. 12 is a diagram illustrating a configuration of a search index registered file management table according to the first embodiment of this invention.

FIG. 18 illustrates an example of an operation screen to execute the search index schema definition registration according to the first embodiment of this invention.

FIG. 21 illustrates an example of an operation screen to execute the file search according to the first embodiment of this invention.

FIG. 22 illustrates an example of an operation screen to execute the file search according to the first embodiment of this invention.

FIG. 24 illustrates the search index schema management table according to the second embodiment of this invention.

FIG. 27 is a search index schema management table according to a third embodiment of this invention.

FIG. 31 is a diagram illustrating a configuration of a metadata name management table according to the fourth embodiment of this invention.

FIG. 44 is a diagram illustrating a configuration of a file change list management table according to the eighth embodiment of this invention.

DETAILED DESCRIPTION OF THE EMBODIMENTS

Hereinafter, embodiments of this invention are described with the accompanying drawings.

Embodiment 1

Figure 1:
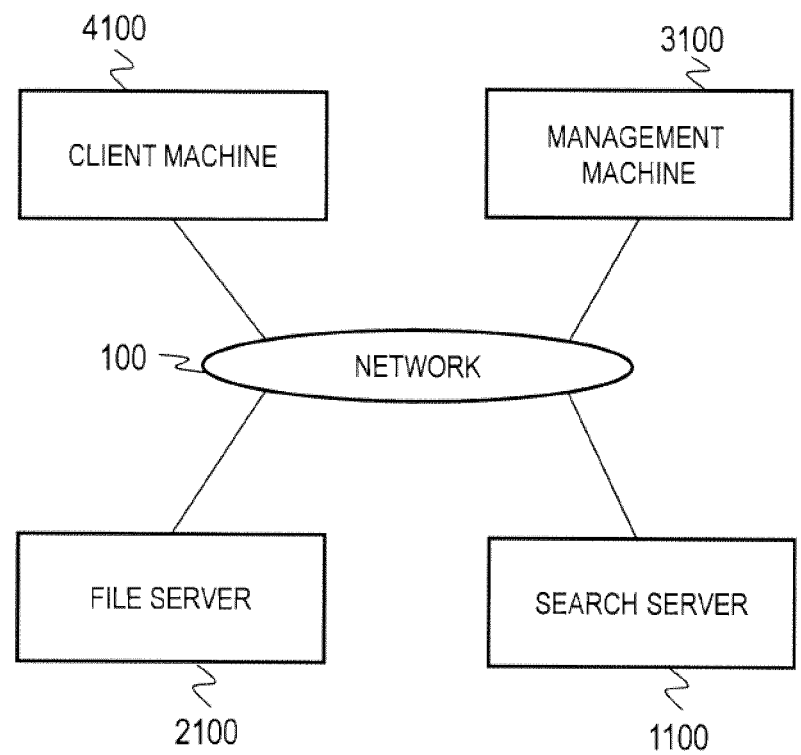
FIG. 1 is a block diagram illustrating an example of a computer system according to a first embodiment of this invention.

FIG. 1 is a block diagram illustrating an example of a computer system in a first embodiment of this invention.

This embodiment describes updating of a schema definition for search indices in a search server 1100 for providing a metadata search function together with a full-text search function. This embodiment enables customizing the objects of metadata search in the search server 1100. As a result, the search server 1100 can search metadata having a new data format or custom metadata uniquely extended in an existing data format.

FIG. 1 is a block diagram illustrating a configuration of a computer system in this embodiment. A search server 1100, a file server 2100, a management machine 3100, and a client machine 4100 are coupled via a network 100.

In the computer system, the search server 1100 provides a file search service to search files stored in the file server 2100. This file search service provides a full-text search function responsive to designation of a search keyword and a metadata search function responsive to designation of a metadata name to be searched for and a search condition. The file server 2100 receives a file access request from a user and provides a file sharing service. The management machine 3100 is used by a system administrator to maintain and manage the search server 1100 and the file server 2100. The client machine 4100 receives an input from the user with an input device 4171 to send a search request to the search server 1100 or to send a file access request to the file server 2100. This computer system allows the user to search files stored in the file server 2100 with the search server 1100.

FIG. 1 shows one component for each of the components; however, the system configuration is not limited to this. Each component may be multiple components, if possible, to form the system. Further, FIG. 1 shows each component as an independent apparatus; however, the configuration is not limited to this. Any two or more components may be implemented as a single apparatus. The coupling by the network 100 may be implemented by any type of network, such as the Internet coupling or an intranet coupling using a local area network.

Figure 2:
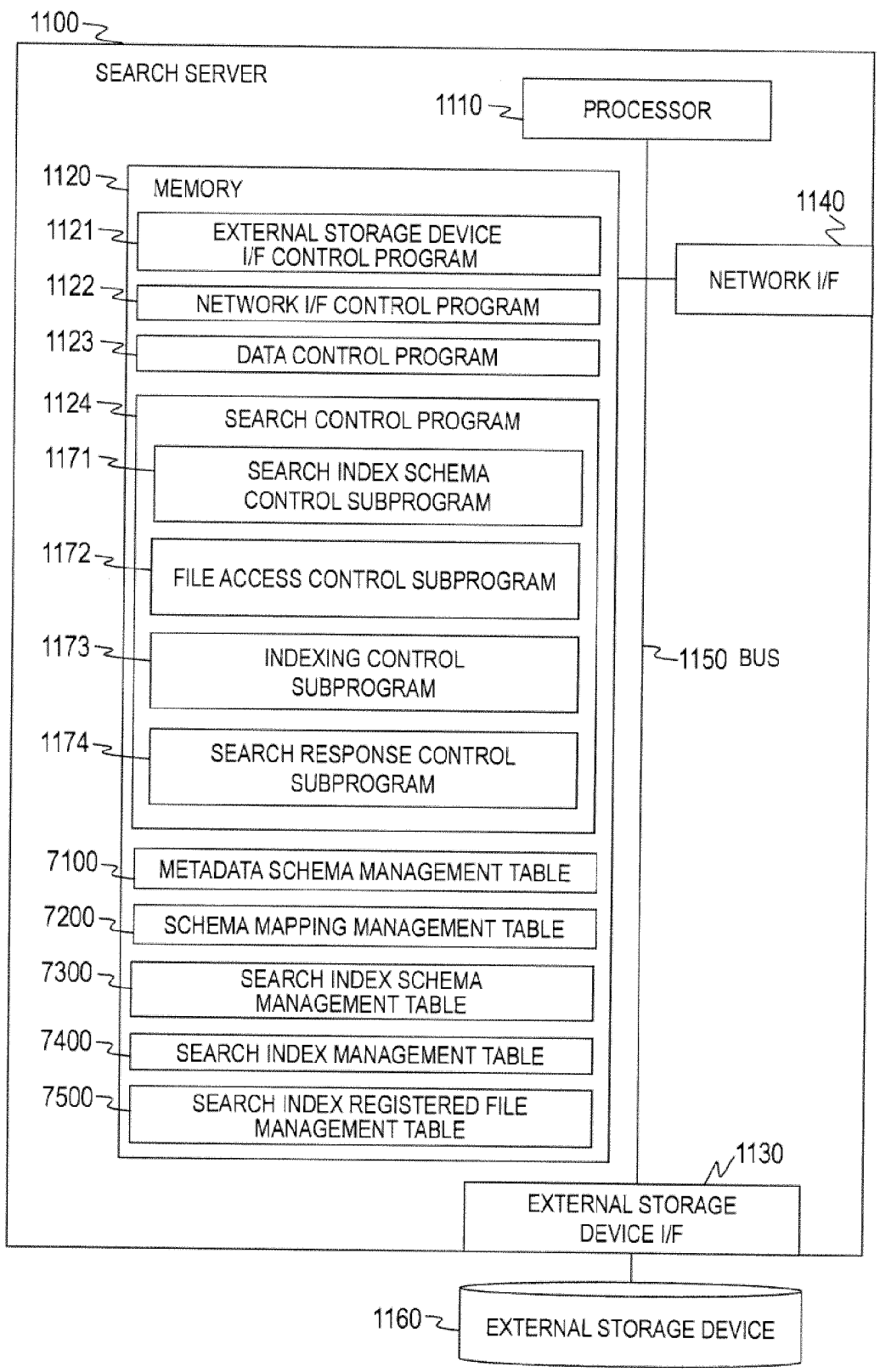
FIG. 2 is a block diagram illustrating a hardware configuration and functional units of the search server according to the first embodiment of this invention.

FIG. 2 is a block diagram illustrating a hardware configuration and functional units of the search server 1100. The search server 1100 includes a processor 1110 for executing programs, a memory 1120 for temporarily storing the programs and data, an external storage device I/F 1130 for accessing an external storage device 1160, a network I/F 1140 for accessing other apparatuses coupled via the network 100, and a bus 1150 for coupling these devices.

The memory 1120 stores programs including an external storage device I/F control program 1121 for controlling the external storage device I/F 1130, a network I/F control program 1122 for controlling the network I/F 1140, a data control program 1123 for providing a file system or database to be used to manage the data stored in the search server 1100, a search control program (search controller) 1124 for creating indices and for providing a search service in the search server 1100. The memory 1120 further stores a metadata schema management table 7100, a schema mapping management table 7200, a search index schema management table 7300, a search index management table 7400, and a search index registered file management table 7500 to be used by the search control program 1124.

The search control program 1124 includes a search index schema control subprogram (search index schema controller) 1171, a file access control subprogram (file access controller) 1172, an indexing control subprogram (indexing controller) 1173, and a search response control subprogram (search response controller) 1174.

The search index schema control subprogram 1171 manages search index schema definitions to be used for the file search service provided by the search server 1100. A search index schema definition is to define a manner of indexing the files to be searched. For example, the definition can be specified to break all text data into tokens having some length to be indexed for full-text search or to index combinations of a specific metadata name and a value. Specifics of a search index schema definition will be described later.

The file access control subprogram 1172 performs processing for the search server to acquire data and metadata of the files stored in the file server.

The indexing control subprogram 1173 performs processing of parsing data and metadata of the files in need of updating the indices and reflecting the result to the search index managed by the search server 1100 for the search service. Specifically, the indexing control subprogram 1173 parses the data and metadata of the files which are in need of updating the index and acquired by the file access control subprogram 1172, and reflects the result to the search index management table 7400 and the search index registered file management table 7500 managed by the search server.

The search response control subprogram 1174 receives a search request from a user, creates search results with reference to the search index management table 7400 and the search index registered file management table 7500 in the search server, and provides the search results.

The metadata schema management table 7100, the schema mapping management table 7200, the search index schema management table 7300, the search index management table 7400, and the search index registered file management table 7500 will be described later.

The processor 1110 executes programs loaded to the memory 1120 to operate as functional units for implementing predetermined functions. For example, the processor 1110 operates in accordance with the search control program 1124 to function as a search controller, executes the data control program 1123 to function as a data manager. The same applies to the other programs. Furthermore, the processor 1110 operates as functional units for performing individual processes executed by each program. The computers and the computer system are apparatuses and a system including these functional units.

The programs for implementing the functions of the search server 1100 and information such as the tables can be stored in a storage device such as the external storage device 1160, a non-volatile semiconductor memory, a hard disk drive, or an SSD (Solid State Drive) or otherwise in a computer-readable non-transitory data storage medium such as an IC card, an SD card, or a DVD.

Figure 3:
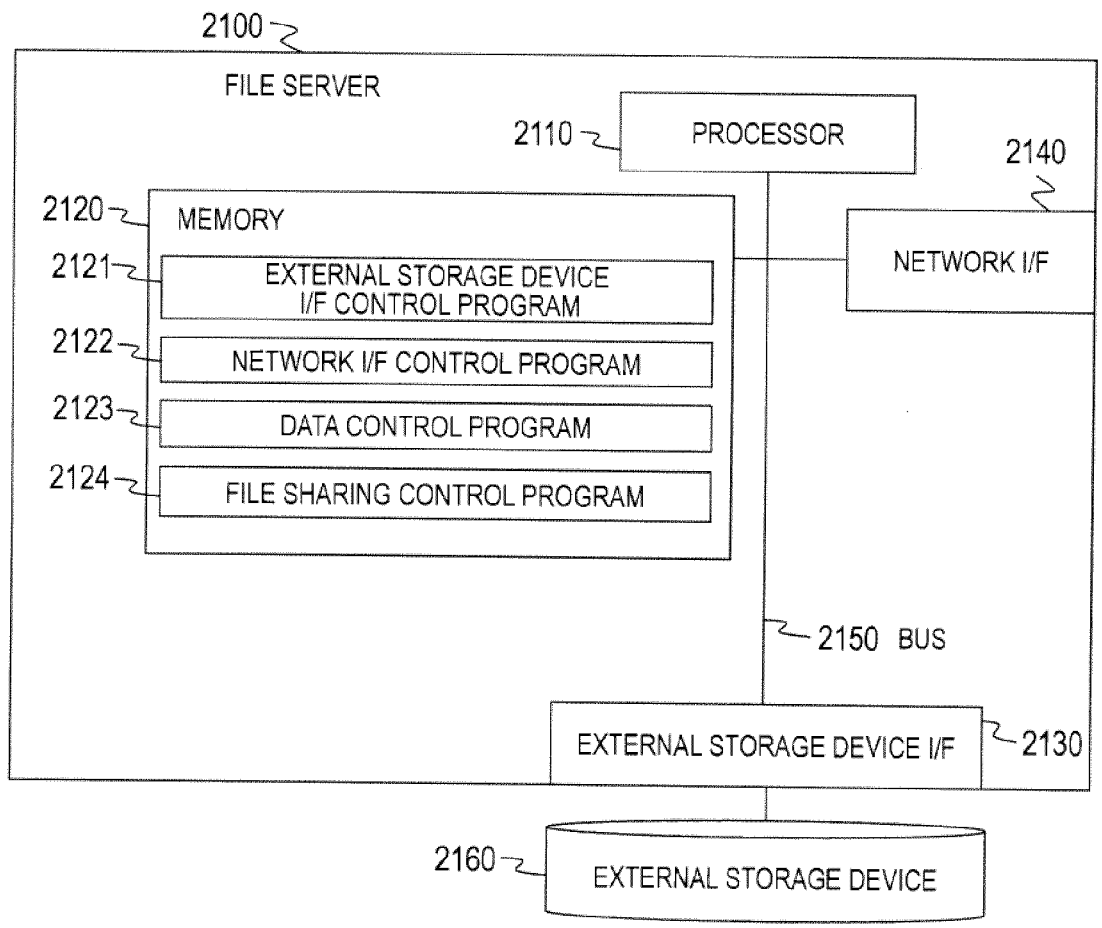
FIG. 3 is a block diagram illustrating a hardware configuration and functional units of the file server according to the first embodiment of this invention.

FIG. 3 is a block diagram illustrating a hardware configuration and functional units of the file server 2100. The file server 2100 includes a processor 2110 for executing programs, a memory 2120 for temporarily storing the programs and data, an external storage device I/F 2130 for accessing an external storage device 2160, a network I/F 2140 for accessing other apparatuses coupled via the network, and a bus 2150 for coupling these devices.

The memory 2120 stores programs including an external storage device I/F control program 2121 for controlling the external storage device I/F 2130, a network I/F control program 2122 for controlling the network I/F 2140, a data control program 2123 for providing a file system or database to be used to manage the data stored in the file server 2100, and a file sharing control program 2124 for storing files in the file server and for sharing the files among a plurality of users.

The processor 2110 executes programs loaded to the memory 2120 to operate as functional units for implementing predetermined functions. For example, the processor 2110 executes the file sharing control program 2124 to function as a file sharing controller. The same applies to the other programs. The programs and tables can be stored in a storage device such as the external storage device 2160, a non-volatile semiconductor memory, a hard disk drive, or an SSD (Solid State Drive) or otherwise in a computer-readable non-transitory data storage medium such as an IC card, an SD card, or a DVD, like in the search server 1100.

Figure 4:
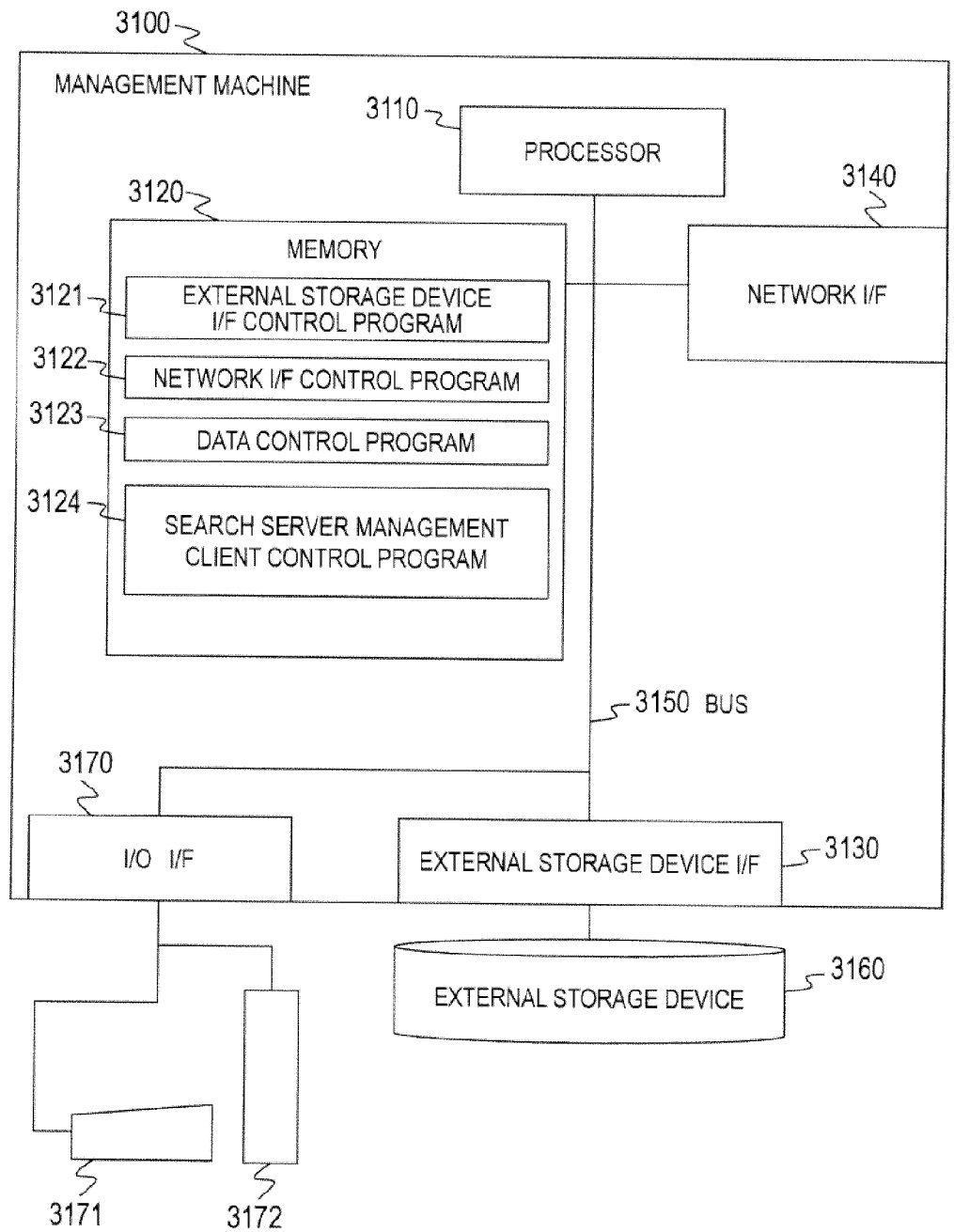
FIG. 4 is a block diagram illustrating the hardware configuration and functional units of the management machine according to a first embodiment of this invention.

FIG. 4 is a block diagram illustrating a hardware configuration of the management machine 3100. The management machine 3100 includes a processor 3110 for executing programs, a memory 3120 for temporarily storing the programs and data, an external storage device I/F 3130 for accessing an external storage device 3160, a network I/F 3140 for accessing other apparatuses coupled via the network, and a bus 3150 for coupling these devices.

The management machine 3100 further includes an input device 3171 and an output device 3172 (a console or a management screen), which are coupled to the bus 3150 via an I/O interface (I/F). The management machine 3100 receives an input from the system administrator with the input device 3171 and outputs a response received from the search server 1100 or another apparatus to the output device 3172.

The memory 3120 stores programs including an external storage device I/F control program 3121 for controlling the external storage device I/F 3130, a network I/F control program 3122 for controlling the network I/F 3140, and a search server management client control program 3124 to be used to manage the search server 1100 from the management machine.

Although not shown in this drawing, the memory 3120 may further store a file server management client control program to be used to manage the file server 2100 from the management machine.

The search server management client control program 3124 corresponds to a client program for management provided by the search server 1100 to be managed or a program for providing functions according to the specifications to be provided by the search server. For example, it may be used with a web application program for the search server or a general-use web browser.

The processor 3110 executes programs loaded to the memory 3120 to operate as functional units for implementing predetermined functions. For example, the processor 3110 executes the search server management client control program 3124 to function as a search server manager. The same applies to the other programs. The programs and tables can be stored in a storage device such as the external storage device 3160, a non-volatile semiconductor memory, a hard disk drive, or an SSD (Solid State Drive) or otherwise in a computer-readable non-transitory data storage medium such as an IC card, an SD card, or a DVD, like in the search server 1100.

Figure 5:
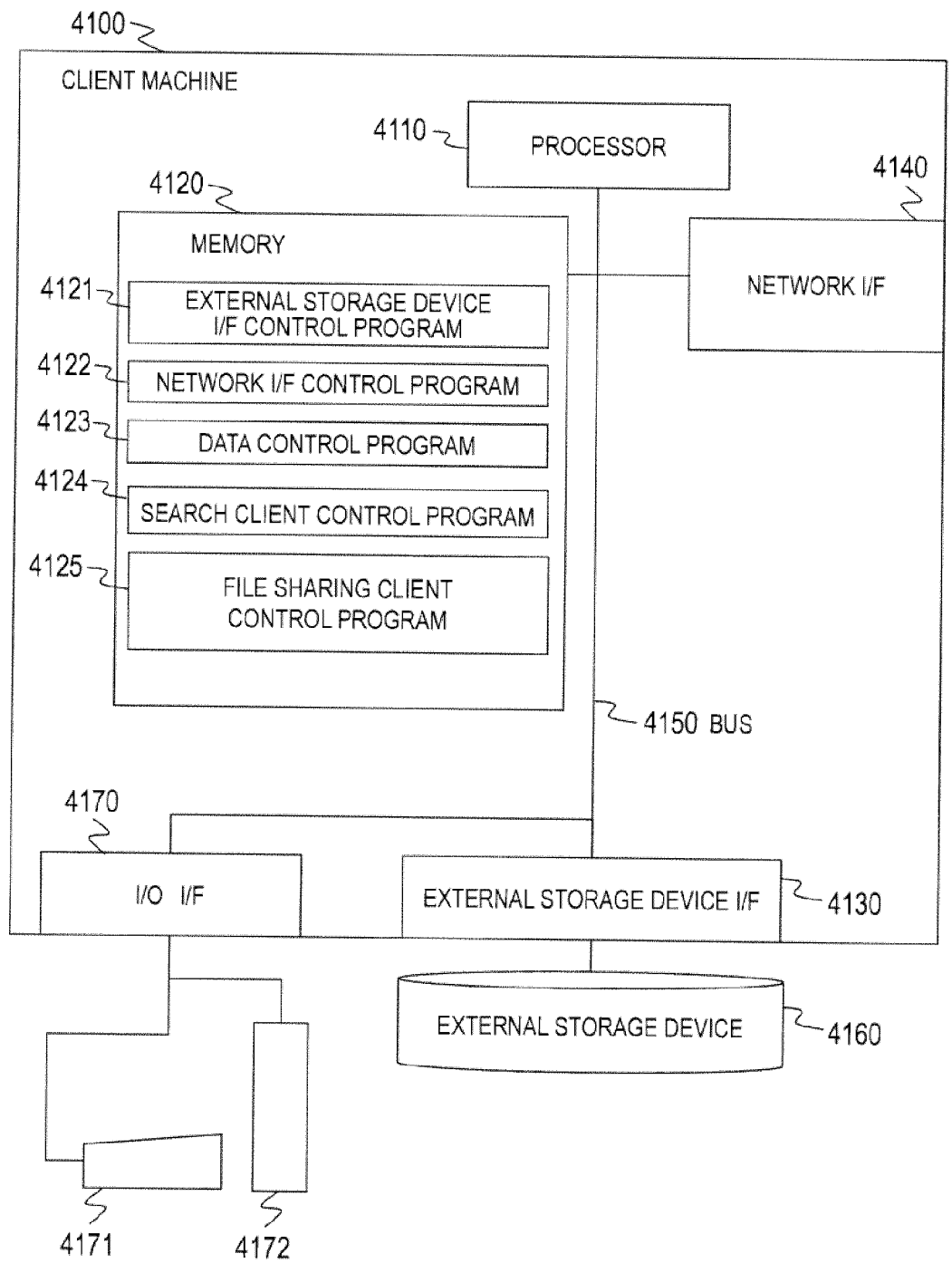
FIG. 5 is a block diagram illustrating the hardware configuration and functional units of the client machine according to a first embodiment of this invention.

FIG. 5 is a block diagram illustrating a hardware configuration of the client machine 4100. The client machine 4100 includes a processor 4110 for executing programs, a memory 4120 for temporarily storing the programs and data, an external storage device I/F 4130 for accessing an external storage device 4160, a network I/F 4140 for accessing other apparatuses coupled via the network, and a bus 4150 for coupling these devices.

The client machine 4100 further includes an input device 4171 and an output device 4172 (a console or a management screen), which are coupled to the bus 4150 via an I/O interface (I/F) 4170. The client machine 4100 receives an input from a user with the input device 4171 and outputs a response received from the search server 1100 or another apparatus to the output device 4172.

The memory 4120 stores programs including an external storage device I/F control program 4121 for controlling the external storage device I/F 4130, a network I/F control program 4122 for controlling the network I/F 4140, a data control program 4123 for providing a file system or database to be used to manage the data stored in the client machine 4100, a search client control program 4124 to be used to access the search server 1100 from the client machine 4100, and a file sharing client control program 4125 to be used to access the files shared in the file storage from the client machine 4100.

The search client control program 4124 corresponds to a client program provided by the search server 1100 to be used or a program for providing functions according to the specifications to be provided by the search server. For example, it may be used with a web application program for the search server or a general-use web browser.

Figure 6:
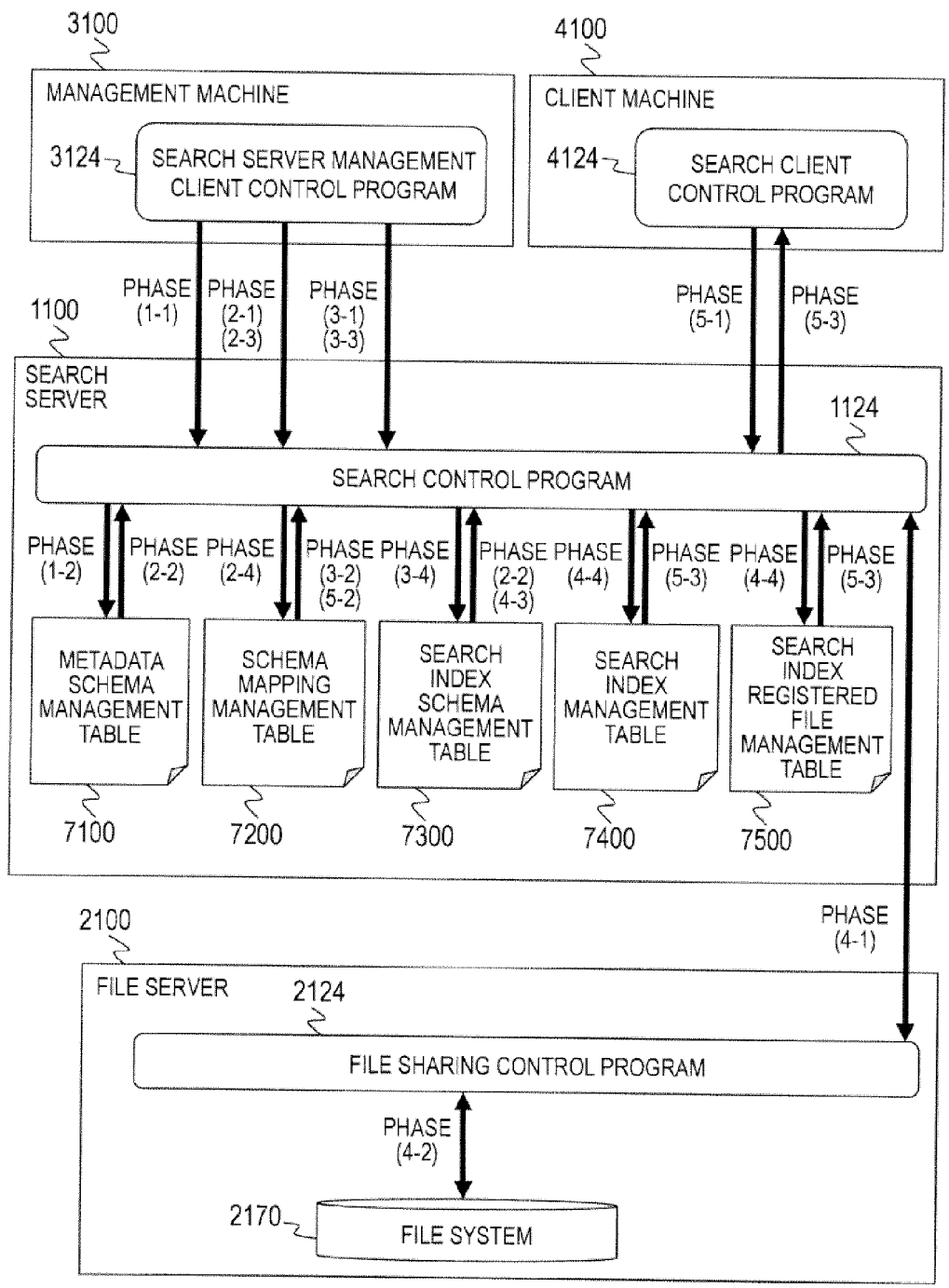
FIG. 6 is an explanatory diagram illustrating flows of processing performed in the computer system according to the first embodiment of this invention.

FIG. 6 is an explanatory diagram illustrating flows of processing performed in the computer system of this invention. This section describes five flows of processing: metadata schema registration (processing (1-n)) from the management machine 3100 to the search server 1100, schema mapping definition registration (processing (2-n)) from the management machine 3100 to the search server 1100, search index schema definition registration (processing (3-n)) from the management machine to the search server 1100, search index update (processing (4-n)) from the client machine 4100 to the files in the file server 2100, and file search (processing (5-n)) from the client machine 4100 to the search server 1100.

First, the processing (1-n) is described. The system administrator sends a request for registration of a schema definition file for metadata (7000 in FIG. 7) to the search server 1100 with the search server management client control program 3124 in the management machine 3100 (phase (1-1)). The schema definition file for metadata is a file defining a file structure for metadata search and assigning identification information called a namespace to the structure.

In this operation, the system administrator designates an alias of the namespace defined in the schema definition file for metadata. The alias enables easy identification of the namespace unique to the search server 1100. Details of the schema definition file for metadata will be described later.

The search server 1100 extracts a metadata schema definition from the received metadata schema definition file, allows the requestor or the system administrator at the management machine 3100 to check the extracted definition as necessary, alters the extracted definition as necessary, and stores the metadata schema definition in the metadata schema management table 7100 (phase (1-2)). This is the end of the processing flow of the metadata schema registration.

Next, schema mapping definition registration (2-n) is described. The system administrator calls up a screen to register a schema mapping definition to a search server 1100 with the search server management client control program 3124 in the management machine 3100 (phase (2-1)). In this operation, the system administrator designates a namespace alias to identify a metadata schema definition registered in the search server 1100 at the phase (1-2) to use the schema mapping definition.

The search server 1100 acquires a metadata schema definition associated with the designated namespace alias from the metadata schema management table 7100, creates candidate schema mapping information based on the definition, and presents the specifics of the candidate to the requestor (phase (2-2)). The schema mapping information created by the search server 1100 includes field names in the search indices to be associated with metadata names in the metadata schema and data types of the fields.

The system administrator checks the candidate schema mapping information presented by the search server 1100 with the management machine 3100 and sends information to alter the candidate to the search server 1100 if necessary (phase (2-3)). The search server 1100 creates final schema mapping information based on the candidate schema mapping information and the alteration information from the requestor (management machine), and stores it to the schema mapping management table 7200 (phase (2-4)). This is the end of the processing flow of the schema mapping definition registration.

Next, search index schema definition registration (3-n) is described. The system administrator calls up a screen to register a search index schema to the search server 1100 with the search server management client control program 3124 in the management machine 3100 (phase (3-1)).

In this operation, the system administrator designates the namespace alias used at the foregoing phase (2-1) to register a search index schema definition. The search server 1100 acquires schema mapping information associated with the designated namespace alias from the schema mapping management table 7200, creates a candidate search index schema definition based on the acquired information, and presents the specifics of the candidate to the requestor (management machine 3100) (phase (3-2)). The search index schema definition created by the search server 1100 includes the field names and data types of the fields in the schema mapping definition.

The system administrator checks the information presented on the output device 3172 of the management machine 3100 and sends information to alter the specifics of the candidate to the search server 1100 if necessary (phase (3-3)).

The search server 1100 creates a final search index schema definition based on the candidate search index schema definition and the alteration information from the requestor (management machine 3100), and stores it to the search index schema management table 7300 (phase (3-4)).

As a result, update of the search index schema definition (search index schema information) in the search server 1100 becomes available, allowing easy addition of new metadata to be designated in a search. This is the end of the processing flow of the search index schema definition registration.

Next, search index update (4-n) is described. The search control program 1124 in the search server 1100 accesses the files in the file server 2100, determines the files in need of updating the search indices, and retrieves the files in need of updating the search indices (phase (4-1)).

To determine the files in need of updating the search indices, an approach exists that acquires the latest change time of each file and makes the determination depending on whether it is later than the previous update of search indices. The file server 2100 that has received a file access request acquires the information on the files using the file system 2170 managed by the file server 2100 as necessary, and provides it to the requestor (for example, the search server 1100) (phase (4-2)). The search control program 1124 that has acquired the files in need of updating the search indices identifies the file type of each file, acquires schema definition information matching the file type from the search index schema management table 7300, and parses the file to extract information required to create search index data (phase (4-3)).

Thereafter, the search control program 1124 creates search index data based on the created information and reflects the data to the search index management table 7400 and the search index registered file management table 7500 (phase (4-4)). This is the end of the processing flow of the search index update.

Lastly, file search (5-n) is described. The user sends a request for file search to the search server 1100 with the search client control program 4124 in the client machine 4100 (phase (5-1)).

Upon receipt of the request for file search, the search control program 1124 in the search server 1100 converts the metadata name designated in a query sentence provided as a search condition to a field name used in the search index schema of the search server 1100 (phase (5-2)).

The search server 1100 acquires information in the schema mapping management table 7200 to use it in the foregoing conversion to a field name. After the conversion, the search control program 1124 extracts files matching the designated search condition with reference to the search index management table 7400 and the search index registered file management table 7500, organizes the search results, and provides them to the requestor (client machine 4100) (phase (5-3)). In organizing the search results, the search server 1100 returns the metadata name converted to the field name in the search index schema into the original metadata name. This is the end of the processing flow of the file search.

FIG. 7 is a diagram illustrating a configuration of a schema definition file to be registered to the search server 1100 by the system administrator in metadata schema registration. The schema definition file 7000 in FIG. 7 shows the file content according to the W3C XML schema specification by way of example. The schema definition file 7000 declares that a URI indicated by a character string "http://AAA.com/ProductA/v2" is the namespace.

This file also defines an XML document having child elements of an integer type of metadata "PatientID", a string type of metadata "PatientName", and an integer type of metadata "VendorPatientID" under an XML element named "ProductA".

Although FIG. 7 provides an example using the W3C XML schema, the schema definition file is not limited to this. Any type of file can be used as far as the search server 1100 can extract information about metadata schema.

FIG. 8 is a diagram illustrating a configuration of a metadata schema management table 7100 managed in the search server 1100. The metadata schema management table 7100 manages schema definition information (metadata schema definitions) used by the files registered in the search server 1100 to be searched in metadata search.

Specifically, the metadata schema management table 7100 includes constituent information of IDs 7110, namespace aliases 7120, name space names 7130, metadata names 7140, and metadata types 7150.

Each ID 7110 stores an identification number automatically assigned to a record of this table. Each namespace alias 7120 stores an alias which is assigned, at the registration of a schema definition file 7000 (see FIG. 7) describing the definition of a metadata schema, by the requestor (for example, the system administrator using the management machine 3100) to the namespace defined in the schema definition file. This namespace alias 7120 is determined to be unique to the search server 1100.

Each namespace name 7130 stores a name representing a namespace defined in a schema definition file 7000 describing the definition of a metadata schema at the registration of the schema definition file 7000. This namespace name 7120 is determined to be unique to the search server 1100. If using an XML namespace as a namespace name 7120, a uniquely identifiable URI is to be used.

Each metadata name 7140 stores a metadata name extracted from a schema definition file 7000. If the schema definition is in the XML schema, the search server 1100 may extract element names or attribute names in XML as metadata names 7140 and store them to the corresponding entries in the form of XPath expressions.

Each metadata type 7150 stores information about a data type ("type" in FIG. 7) associated with a metadata name extracted from a schema definition file 7000.

FIG. 9 is a diagram illustrating a configuration of a schema mapping management table 7200 managed in the search server 1100. The schema mapping management table 7200 manages correspondence relations between the metadata schema definitions in the aforementioned metadata schema management table 7100 and search index schema definitions in the later-described search index schema management table 7300.

Specifically, the schema mapping management table 7200 includes constituent information of mapping IDs 7210, namespace names 7220, metadata names 7230, field names 7240, field types 7250, and field aliases 7260.

Each mapping ID 7210 stores an identification number automatically assigned to a record of this table. Each namespace name 7220 stores the same information as stored in a namespace name 7130 in the metadata schema management table 7100. Each metadata name 7230 stores the same information as stored in a metadata name 7140 in the metadata schema management table 7100.

Each field name 7240 stores a name associated with the metadata name extracted from a search index schema definition and stored in the metadata name 7230. This field name 7240 has uniqueness in the search server 1100. For example, as shown in FIG. 9, it may be a custom-added field name, which is a character string obtained by coupling a character string indicating a custom extension (CUSTOM-META . . . ), a character string indicating a namespace alias (A2), and a character string indicating a metadata name (ProductA/ . . . ).

Each field type 7250 stores information defining a type of data to be stored in the field. It may store the same information as stored in a metadata type 7150 in the metadata schema management table 7100 or information determined by the system administrator. Examples of the data types to be specified in this field include integer type showing a numerical value, string type showing a character string, and text type adapted to keyword search by breaking a text into tokens.

The data types may include a sortable data type to sort search results with the value of the field and a data type that is not sortable with the value but is compressible for storage to minimize the search index data size.

Each field alias 7260 stores an alias of the field name 7240. This field alias 7260 may be unique to the namespace or unique to the search server 1100. The following description is based on the case where the field aliases 7260 are determined to be unique to the namespace.

The field alias 7260 may be determined automatically in the search server 1100 or may be determined by the system administrator. In conducting metadata search designating a field name, the field name 7240 might have a long character string for the uniqueness in the search server 1100. Instead of such a field name 7240, a field alias 7260 having a short character string may be used.

For a metadata name 7230 predetermined not to be indexed, the field name 7240, the field type 7250, and the field alias 7260 may store a character string indicating that no value is to be associated with the metadata name 7230. For example, a character string "<NONE>" may be stored as shown in FIG. 9 to mean that no value is to be associated with the metadata name 7230.

FIG. 10 is a diagram illustrating a configuration of a search index schema management table 7300 managed in the search server 1100. The search index schema management table 7300 manages schema information defining structures of index data to be used in providing a search service in the search server 1100.

The search server 1100 creates index data required to perform search operations such as full-text search using keywords or metadata search using metadata names and search conditions based on the information defined in the search index schema management table 7300. Specifically, the search index schema management table 7300 includes constituent elements such as field names 7310 and field types 7320.

Each field name 7310 stores the same information as stored in a field name 7240 in the aforementioned schema mapping management table 7200. However, the schema mapping management table 7200 may include field names 7240 which are not included in the field names 7310 of the search index schema management table 7300.

If a field name 7240 registered in the schema mapping management table 7200 is not registered in the search index schema management table 7300 as a field name 7310, the field name is not indexed and cannot be used in search. This Embodiment 1 allows individual determination whether to index the field name 7310. As a result, in customizing a search index schema definition in the search server 1100, addition or deletion of a field or change of a field type are available on a trial basis.

The field names 7310 and the field types 7320 should be the same as registered in the schema mapping management table 7200. Accordingly, in changing a field name 7310 or a field type 7320, the corresponding field name 7240 or field type 7250 in the schema mapping management table 7200 is changed first and the information in the schema mapping management table 7200 after the change is retrieved to the search index schema management table 7300.

FIGS. 11A and 11B are diagrams illustrating a configuration of a search index management table 7400 managed in the search server 1100. The search index management table 7400 manages information on search indices created by the search server 1100. Specifically, the search index management table 7400 includes constituent information such as field names 7410, field values 7420, and locational information 7430.

Each field name 7410 stores the same information as stored in a field name 7310 in the aforementioned search index schema management table 7300. Each field value 7420 stores an object (such as a numerical value or a character string) obtained by parsing in indexing a file in association with a field designated by a field name 7410. In the example shown in FIGS. 11A and 11B, for a field name 7410 indicating "filename", character strings indicating the file names of the files to be searched are stored in field values 7420.

For a field name 7410 indicating "content", tokens obtained by breaking the text of the entire content of each file for keyword search are stored in field values 7420. Locational information 7430 registers information on the files including the object registered in the field value 7420.

The locational information 7430 includes constituent elements of file identification information 7431, 7434, locational offsets 7432, 7435, and weights 7433, 7436. The file identification information 7431, 7435 register information for identifying a file including the object stored in the field value 7420.

Specifically, the file identification information 7431, 7435 may register the same information as registered in file identification information 7510 in the later-described search index registered file management table 7500, a filepath name used to actually access the file, or an identifier of the file. The locational offsets 7432, 7435 register information on the offset to locate the object in the file. If the object appears at a plurality of locations of a single file, the same number of pieces of offset information is registered. The weights 7433, 7436 register a value indicating a significance level in including the object. The significance level is determined by the search server 1100 as appropriate. A greater value means higher significance. This value can be used in narrowing down or sorting search results.

The search index management table 7400 is configured to allow registration of a plurality pieces of locational information 7430 for one field value 7420. As a result, the table 7400 can support a case where a plurality of files include the object stored in a field value 7420. The locational information 7430 may include a null value meaning the value of the entry is invalid. The null value can be used in an entry in which some cells are empty because the locational information 7430 includes fewer records than the other entries or an entry in which information of the locational offsets 7432, 7435 is unnecessary.

FIG. 12 is a diagram illustrating a configuration of a search index registered file management table 7500 managed in the search server 1100. The search index registered file management table 7500 manages information about the files acquired from the files in the file server 2100 for the search server 1100 to create search indices. Specifically, the search index registered file management table 7500 includes constituent elements such as file identification information 7510, filepath names 7520, and metadata 7530.

Each piece of file identification information 7510 is an identifier for uniquely identifying a file acquired by the search server 1100 to create a search index. This identifier may be a serial number assigned by the search server 1100 or a serial number assigned by the file server 2100 holding the file. Alternatively, a character string usable for identification can be used.

Each filepath name 7520 corresponds to the filepath name where the file is stored. The search server 1100 sends a file acquisition request to the file server 2100 designating the filepath name 7520 to acquire the file.

This search index registered file management table 7500 allows the search control program 1124 to use only the search index management table 7400 in determining whether each file matches a search condition to respond to a search request of a user. The search control program 1124 refers to the search index registered file management table 7500 as necessary to acquire file access information only for the files matching the search condition.

Hereinabove, the configuration of the system and the configuration of the management information provided by this invention have been described. Hereinafter, processing performed in this invention and examples of operation screens to be used to execute the processing will be described.

In the following description, processing of metadata schema registration (FIG. 13), schema mapping definition registration (FIG. 15), search index schema definition registration (FIG. 17), search index update (FIG. 19), and file search (FIG. 20) is described. For operation screen examples, a metadata schema registration screen (FIG. 14), a schema mapping definition registration screen (FIG. 16), a search index schema definition registration screen (FIG. 18), and a file search screen (FIGS. 21 and 22) are described.

Figure 13:
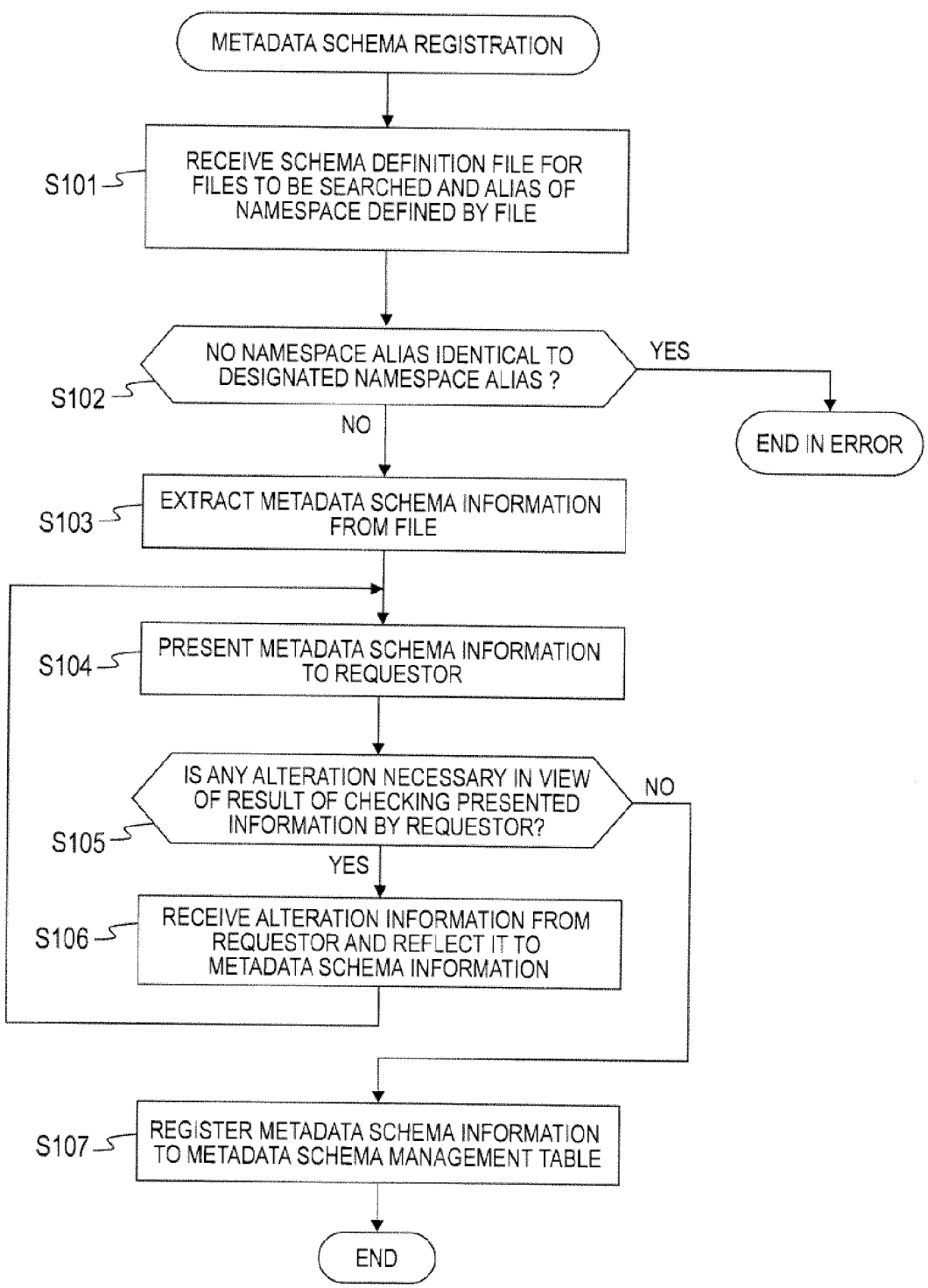
FIG. 13 is a flowchart illustrating an example of metadata schema registration according to the first embodiment of this invention.

FIG. 13 is a flowchart illustrating an example of metadata schema registration performed by the search index schema control subprogram 1711 in the search server 1100. This processing includes allowing the system administrator to register a schema definition file 7000 describing a metadata schema definition to the search server 1100, extracting definition information on a metadata schema from the schema definition file 7000, and registering the schema definition information to the metadata schema management table 7100.

First, the processor 1110 executing the search index schema control subprogram 1171 receives a schema definition file 7000 for the files to be searched and an alias of the namespace defined in the file from the search server management client control program 3124 in the management machine 3100 (Step S101). At this step, the processor 1110 acquires a schema definition file 7000 as shown in FIG. 7. Any style other than the style shown in FIG. 7 is acceptable if allowing acquisition of schema definition information. To simplify the following description, mentioning the processor 1110 is omitted because the agent that executes the program is the same processor 1110.

Next, the search index schema control subprogram 1171 determines whether the alias of the namespace designated in the schema definition file 7000 is identical to another namespace alias already used in the search server 1100 (Step S102).

If the alias of the namespace is identical to another (Yes at Step S102), the search index schema control subprogram 1171 is terminated in error. If the alias of the namespace is not identical to any one (No at Step S102), the search index schema control subprogram 1171 extracts a metadata schema definition from the received schema definition file 7000 (Step S103).

The metadata schema definition to be extracted at this step is information such as metadata names and metadata types indicating the data types of the metadata. If the schema definition file 7000 is written in XML format, the metadata schema definition may be extracted using XSLT for transforming some format of XML data into a different format of XML data.

Next, the search index schema control subprogram 1171 presents (sends) the extracted metadata information to the requestor (for example, the management machine 3100) (Step S104). At this step, the search index schema control subprogram 1171 sends the extracted information to the search server management client program 3124 in the management machine 3100 and the search server management client program 3124 outputs the information to the output device 3172 (such as a management screen or a management console) of the management machine 3100 for the system administrator to see it.

The search index schema control subprogram 1171 subsequently determines whether the extracted information needs any alteration as a result of the check by the requestor (Step S105). The information returned from the search server management client program 3124 in response to the information sent to the requestor may include information indicating whether to alter the presented information. The subprogram 1171 makes the determination with reference to the information.

If alteration is necessary (Yes at Step S105), the search index schema control subprogram 1171 acquires alteration information for the metadata schema definition from the requestor (management machine 3100) and reflects the alteration information to the metadata schema definition (Step S106). Thereafter, the search index schema control subprogram 1171 repeats the processing from Step S104.

If no alteration is necessary (No at Step S105), the search index schema control subprogram 1171 registers the extracted metadata schema definition to the metadata schema management table 7100 to terminate the processing.

The foregoing description has described an example of processing that registers a schema definition file 7000 to the search server 1100, parses the content of the schema definition file 7000, and uses the result; however, the processing is not limited to this. The system administrator may directly specify the information to be registered to the metadata schema management table 7100 and register the information to the management table.

Figure 14:
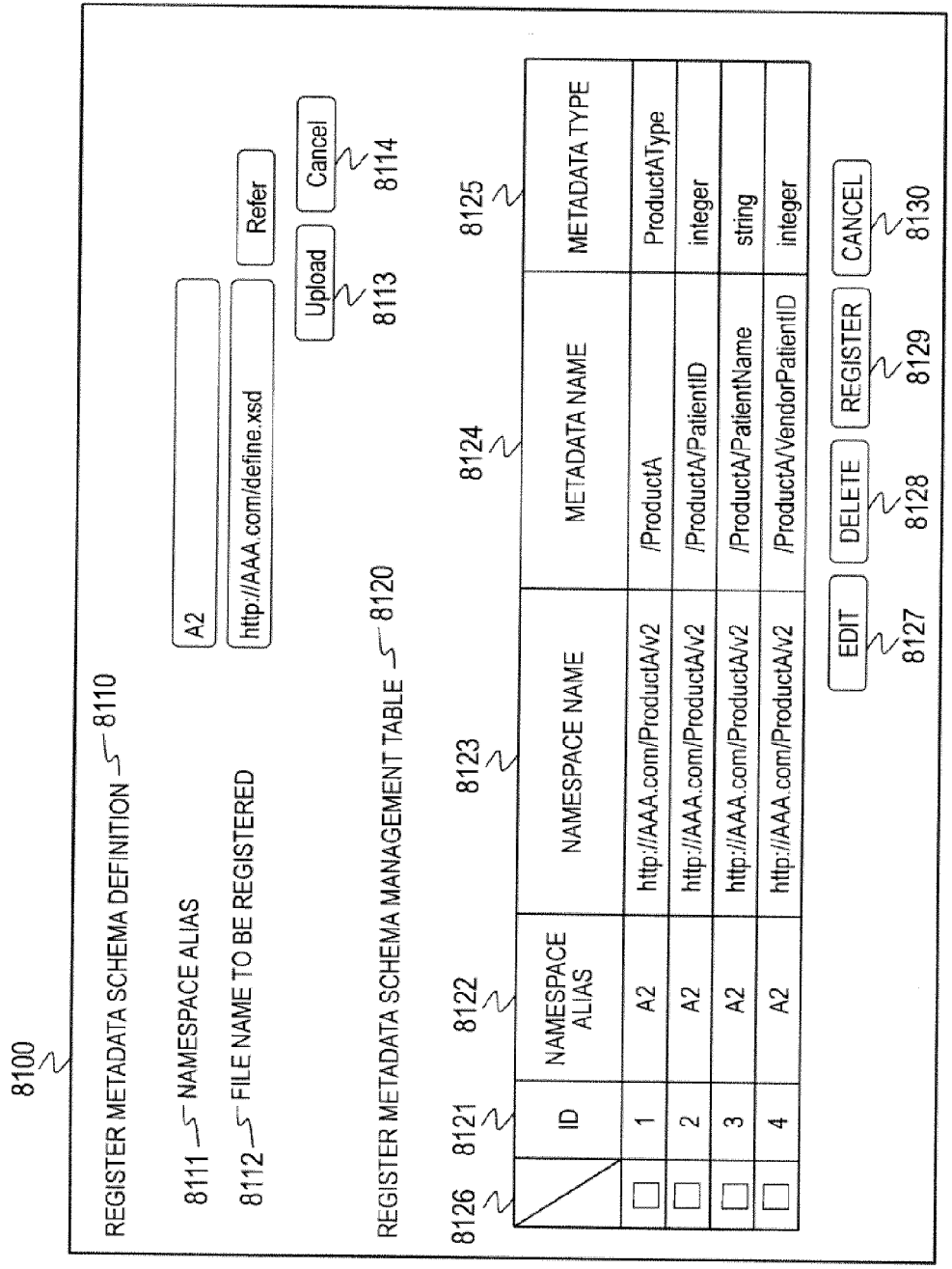
FIG. 14 illustrates an example of an operation screen to execute the metadata schema registration according to the first embodiment of this invention.

FIG. 14 illustrates an example of an operation screen to execute the above-described metadata schema registration through the management screen of the management machine 3100. The metadata schema registration screen 8100 displayed on the output device 3172 of the management machine 3100 provides a metadata schema definition file registration section 8110 and a metadata schema management table registration section 8120.

The metadata schema definition file registration section 8110 provides an entry field 8111 for a namespace alias and an entry field 8112 for the file name to be registered. Pressing the Upload button 8113 after entering these two fields allows registration of the designated schema definition file to the search server 1100. Pressing the Cancel button 8114 cancels the file registration.

The metadata schema management table registration section 8120 indicates, in response to press of the Upload button 8113, the specifics of the metadata schema extracted by the search server 1100. The indicated information is the same as the information in the entries of the metadata schema management table 7100. Designating a record with a checkbox 8126 and pressing the Edit button 8127 allow alteration of the specifics of the indicated information. Likewise, pressing the Delete button 8128 leads to deleting the information. Pressing the Register button 8129 after fixing the specifics to be registered leads to registering the metadata schema to the metadata schema management table 7100. Pressing the Cancel button 8130 leads to canceling the registration to the metadata schema management table 7100.

Figure 15:
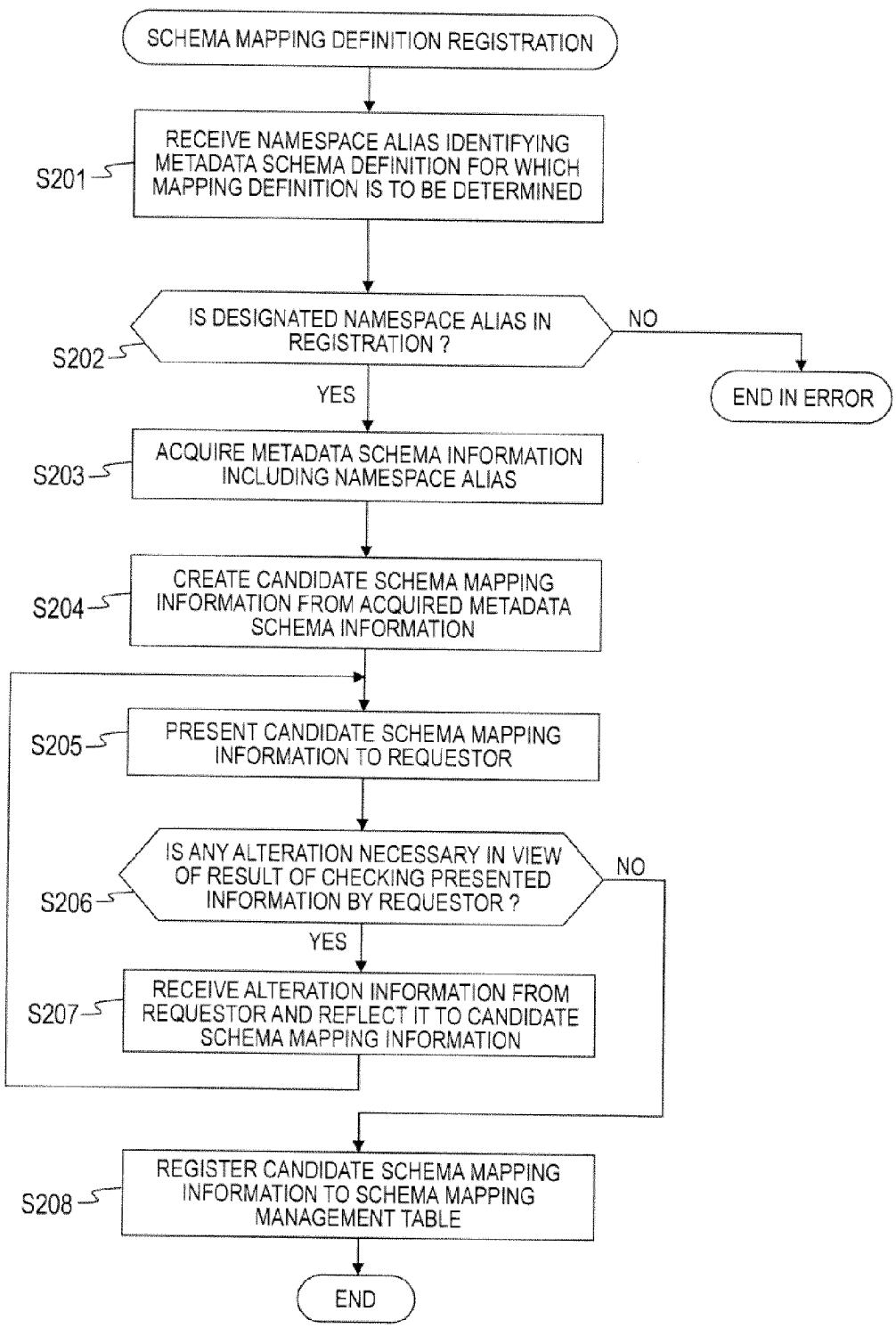
FIG. 15 illustrates a flowchart of schema mapping definition registration according to the first embodiment of this invention.

FIG. 15 illustrates a processing flow of schema mapping definition registration performed by the processor 1110 of the search server 1100 executing the search index schema control subprogram 1171. The following description is simplified by omitting the processor 1110, like the description of FIG. 13.

This processing includes allowing the system administrator to designate a namespace alias for identifying a metadata schema definition, acquiring the metadata schema definition having the namespace, creating information required for a schema mapping definition from the metadata schema definition, and registering the created information to the schema mapping management table 7200.

First, the search index schema control subprogram 1171 receives the alias of the namespace to identify the metadata schema definition for which a mapping definition is to be determined from the search server management client program 3124 in the management machine 3100 (Step S201). The information to identify a metadata schema definition may be in any style as far as it can identify a metadata schema definition. For example, a namespace name itself is acceptable.

Next, the search index schema control subprogram 1171 determines whether the namespace alias designated at Step S201 is in registration of the search server 1100 (Step S202).

If the namespace alias is not in registration (No at Step S202), the processing is terminated in error. If the namespace alias is in registration (Yes at Step S202), the search index schema control subprogram 1171 acquires the metadata schema definition from the metadata schema management table 7100 with reference to the received namespace alias (Step S203). The metadata schema definition is acquired from the records including the designated namespace alias 7120 among the records registered in the metadata schema management table 7100.

Next, the search index schema control subprogram 1171 creates candidate schema mapping information from the acquired metadata schema definition (Step S204). At this step, the search index schema control subprogram 1171 creates candidates for the field names 7240 from the namespace name 7130 and the metadata names 7140, creates candidates for the field types 7250 from the metadata types 7150, and creates candidates for the field aliases 7260 from the metadata names 7140. The search index schema control subprogram 1171 combines these three constituent elements with the specifics acquired from the metadata schema management table 7100 to create candidate schema mapping information.

Next, the search index schema control subprogram 1171 sends the created candidate schema mapping information to the requestor (for example, the management machine 3100) to present it with the output device 3172 (Step S205). The search index schema control subprogram 1171 sends the information to be presented to the search server management client program 3124 in the management machine 3100 and the search server management client program 3124 outputs the information to be presented to the output device 3172 such as a management screen or a management console for the system administrator to see it.

Subsequently, the search index schema control subprogram 1171 determines whether the presented information needs any alteration in view of the result of checking the presented information by the requestor (Step S206). The information returned from the search server management client program 3124 in response to the information sent to the requestor may include information indicating whether to alter the presented information. The subprogram 1171 makes the determination with reference to this information.

If alteration is necessary (Yes at Step S206), the search index schema control subprogram 1171 acquires alteration information for the candidate schema mapping information from the requestor and reflects the alteration information to the candidate schema mapping information (Step S207). Thereafter, the search index schema control subprogram 1171 repeats the processing from Step S205.

If no alteration is necessary (No at Step S206), the search index schema control subprogram 1171 registers the schema mapping information to the schema mapping management table 7200 to terminate the processing.

The foregoing description has described an example of processing that uses candidate schema mapping information created based on the designated namespace alias and information registered in the metadata schema management table 7100; however, the processing is not limited to this. The system administrator may directly specify the information to be registered to the schema mapping management table 7200 and register the information to the management table.

Figure 16:
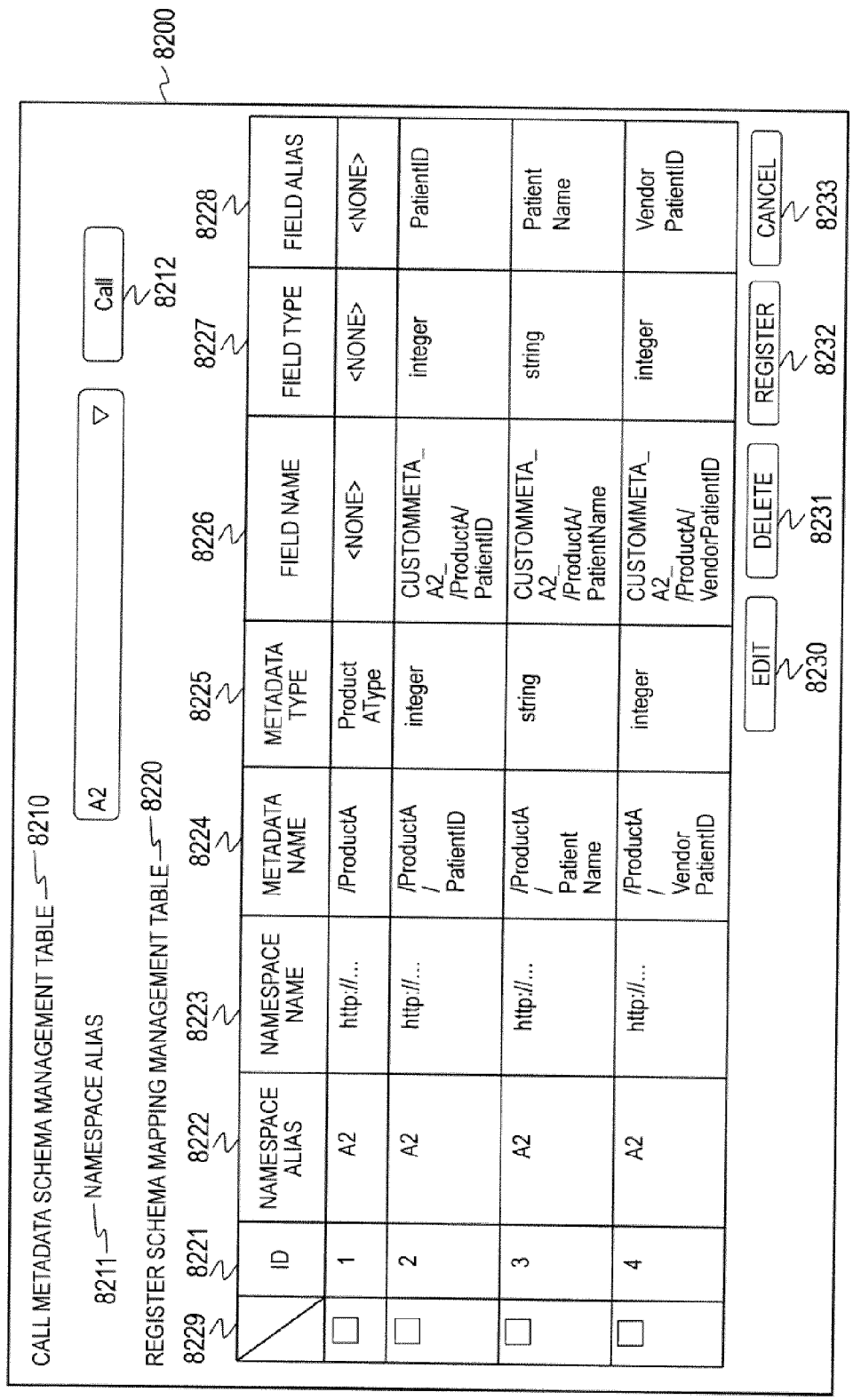
FIG. 16 illustrates an example of an operation screen to execute the schema mapping definition registration according to the first embodiment of this invention.

FIG. 16 illustrates an example of an operation screen to execute the above-described schema mapping definition registration through the management screen of the management machine 3100. The schema mapping definition registration screen 8200 provides a metadata schema management table call section 8210 and a schema mapping management table registration section 8220.

The metadata schema management table call section 8210 provides an entry field 8211 for a namespace alias. Pressing the Call button 8212 after entering a namespace alias leads to retrieving records having the designated namespace alias from the metadata schema management table 7100 and outputting them to the later-described schema mapping management table registration section 8220.

The schema mapping management table registration section 8220 indicates, in response to press of the aforementioned Call button 8212, the specifics of the records of the metadata schema management table 7100 having the designated namespace alias and candidate schema mapping information created from these records. The information to be indicated is entries (IDs 8221, namespace aliases 8222, namespace names 8223, metadata names 8224, and metadata types 8225) of the metadata schema management table 7100 and entries for the above-described three kinds of created information (field names 8226, field types 8227, and field aliases 8228). Designating a record with a checkbox 8229 and pressing the Edit button 8230 allows alteration (update) of the specifics of the information. Likewise, pressing the Delete button 8231 leads to deleting the information. Pressing the Register button 8232 after fixing the specifics to be registered leads to registering the information to the schema mapping management table 7200. Pressing the Cancel button 8233 leads to canceling the registration to the schema mapping management table 7200.

Figure 17:
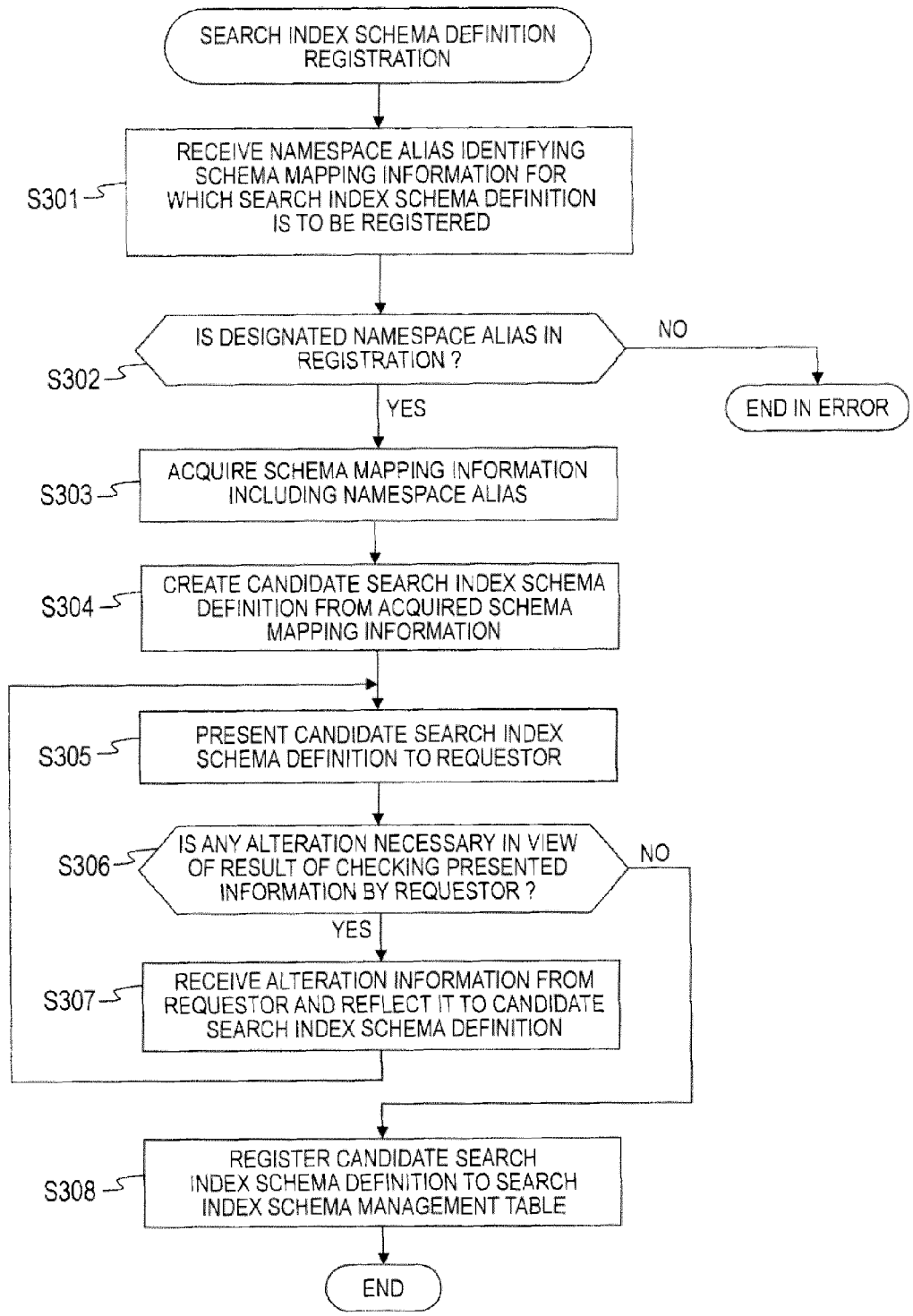
FIG. 17 illustrates a flowchart of search index schema definition registration according to the first embodiment of this invention.

FIG. 17 illustrates a processing flow of search index schema definition registration performed by the processor 1110 of the search server 1100 executing the search index schema control subprogram 1171. The following description omits the mention of the processor 1110 for the purpose of simplicity, like the description of FIG. 13.

This processing includes allowing the system administrator to designate an associated namespace alias to identify the field information to be registered to the search index schema definition, acquiring a metadata schema definition and a schema mapping definition having the namespace, acquiring information on the fields to be registered from these definitions, and registering the information on the fields to be registered to the search index schema management table 7300.

First, the search index schema control subprogram 1171 receives a namespace alias to identify the schema mapping information for which a search index schema definition is to be registered from the search server management client program 3124 in the management machine 3100 (Step S301). The information to identify schema mapping information may be in any style as far as it can identify schema mapping information. For example, a namespace name itself is acceptable.

Next, the search index schema control subprogram 1171 determines whether the designated namespace alias is in registration of the search server 1100 (Step S302).

If the namespace alias is not in registration (No at Step S302), the processing is terminated in error. If the namespace alias is in registration (Yes at Step S302), the search index schema control subprogram 1171 acquires schema mapping information from the metadata schema management table 7100 and the schema mapping management table 7200 with reference to the received namespace alias (Step S303).

At this step, the metadata schema definition is acquired by selecting the records having the designated namespace alias 7120 from the records registered in the metadata schema management table 7100. The schema mapping information is acquired by selecting the records having the designated namespace alias 7220 from the records registered in the schema mapping management table 7200.

Next, the search index schema control subprogram 1171 creates a candidate search index schema definition from the acquired schema mapping information (Step S304). At this step, the search index schema control subprogram 1171 creates the candidate search index schema definition by combining the namespace alias 7120 acquired from the metadata schema management table 7100, and the field names 7240 and the field types 7250 acquired from the schema mapping management table 7200.

Next, the search index schema control subprogram 1171 sends the created candidate search index schema definition to the requestor (for example, the management machine 3100) to output them to the output device 3172 (Step S305).

At this step, the search index schema control subprogram 1171 sends the information to be presented to the search server management client program 3124 in the management machine 3100 and the search server management client program 3124 outputs the information to be presented to the output device 3172 such as a management screen or a management console for the system administrator to see it.

Subsequently, the search index schema control subprogram 1171 determines whether the presented information needs any alteration in view of the result of the checking the presented information by the requestor (Step S306). Specifically, the search index schema control subprogram 1171 requests the system administrator to designate the information to be registered and not to be registered to the search index schema management table 7300 and determines whether to alter the information based on the designation. The information returned from the search server management client program 3124 in response to the information sent to the requestor may include information indicating whether to alter the presented information. The subprogram 1171 makes the determination with reference to this information.

If alteration is necessary (Yes at Step S306), the search index schema control subprogram 1171 acquires alteration information for the candidate search index schema definition from the requestor and reflects the alteration information to the candidate search index schema definition (Step S307). Specifically, the subprogram 1171 keeps the fields designated as necessary to the search index schema management table 7300 and deletes the fields designated as unnecessary. Thereafter, the search index schema control subprogram 1171 repeats the processing from Step S305.

If no alteration is necessary (No at Step S306), the search index schema control subprogram 1171 registers the candidate search index schema definition to the search index schema management table 7300 and terminates the processing.

The foregoing description has described an example of processing that uses a candidate search index schema definition created based on the designated namespace alias and information registered in the metadata schema management table 7100 and the schema mapping management table 7200; however, the processing is not limited to this. The system administrator may directly specify the information to be registered to the search index schema management table 7300 and register the information to the management table. In this case, however, the consistency of the information to be registered and the information in the entries registered in the schema mapping management table 7200 should be guaranteed.

FIG. 18 illustrates an example of an operation screen to execute the above-described search index schema definition registration through the management screen of the management machine 3100. The search index schema definition registration screen 8300 provides a schema mapping management table call section 8310 and a search index schema management table registration section 8320.

The schema mapping management table call section 8310 provides an entry field 8311 for a namespace alias. Pressing the Call button 8312 after entering a namespace alias leads to retrieving records having the designated namespace alias from the metadata schema management table 7100 and the schema mapping management table 7200 and outputting them to the later-described search index schema management table registration section 8320.

The search index schema management table registration section 8320 indicates, in response to press of the aforementioned Call button 8312, a candidate search index schema definition created from the specifics of the records of the metadata schema management table 7100 having the designated namespace alias and the specifics of the records of the schema mapping management table 7200 having the same namespace name 7130. The information to be indicated is the entries (namespace aliases 8323) of the metadata schema management table 7100 and the entries (mapping IDs 8321, field names 8324, and field types 8325) of the schema mapping management table 7200, and entries indicating whether to add the record to the search index schema management table 7300 (field update flags 8322). Designating a record with a checkbox 8326 and pressing the Edit button 8327 allows alteration of the specifics. Likewise, pressing the Delete button 8328 leads to deleting the specifics. Pressing the Register button 8329 after fixing the specifics to be registered leads to registering the information to the search index schema management table 7300. Pressing the Cancel button 8330 leads to canceling the registration to the search index schema management table 7300.

In the search index schema definition registration screen 8300, the field update flags 8322 are provided to allow a choice that the created search index schema definition does not include a field which will not be designated in a search. Specifically, the search control program 1124 creates a search index schema definition including the field if the field update flag 8322 indicates "Yes" and creates a search index schema definition not including the field if the field update flag 8322 indicates "No". This configuration eliminates the fields not to be searched from the search index schema management table 7300, preventing excessive expansion of the table.

Figure 19:
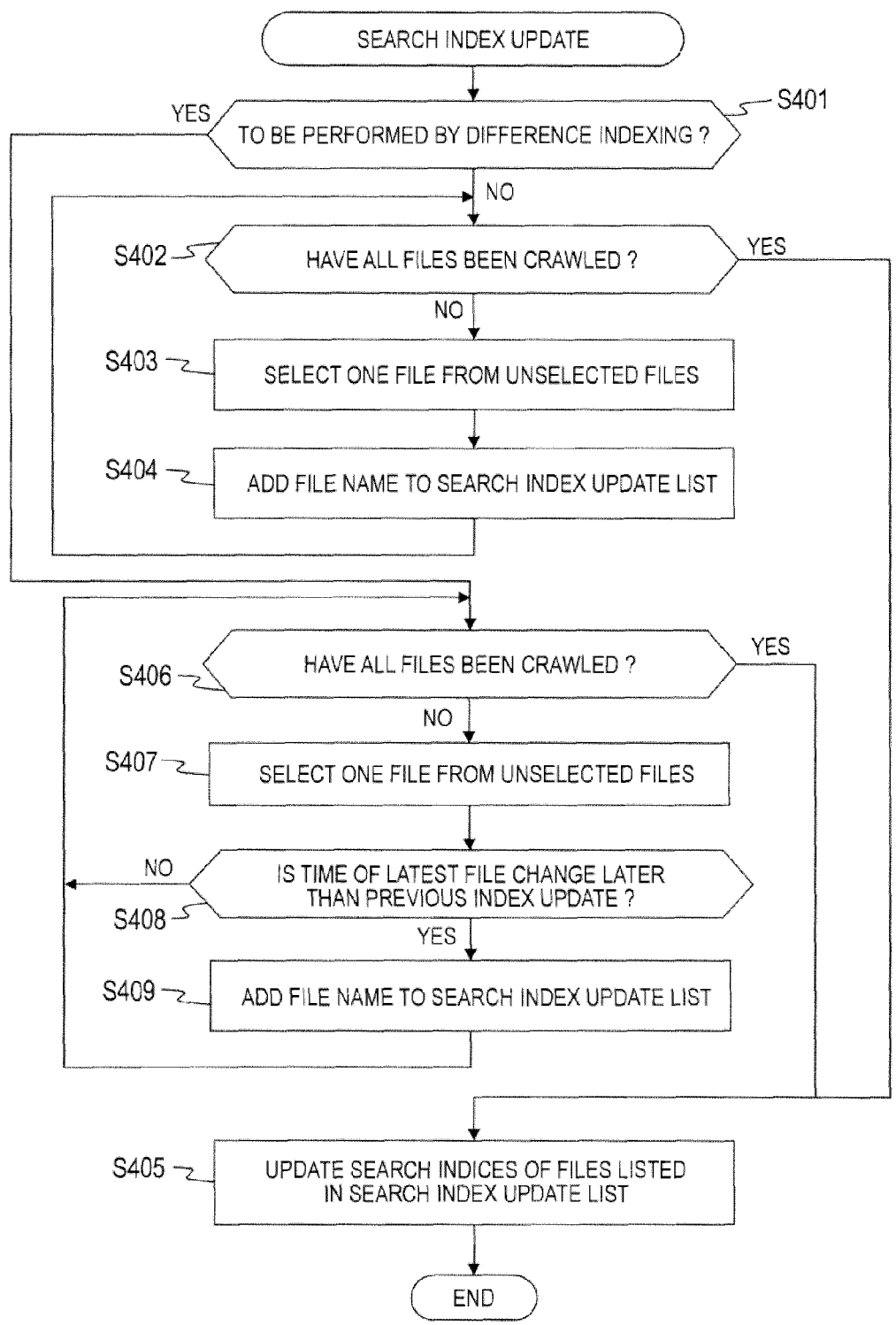
FIG. 19 illustrates a flowchart of search index update performed by the indexing control subprogram according to the first embodiment of this invention.

FIG. 19 illustrates a processing flow of search index update performed by the indexing control subprogram 1173 in the search server 1100. In this processing, the processor 1110 executing the indexing control subprogram 1173 accesses the files in the file server 2100 with the access control subprogram 1172 in response to a search index update start request predetermined in the search server 1100. The processor 1110 executing the indexing control subprogram 1173 determines files in need of updating the search indices are to be updated among the files in the file server 2100 and acquires data and metadata related to the files in need of updating the search indices. The processor 1110 executing the indexing control subprogram 1173 updates the search indices based on the acquired data and reflects the update to the search index management table 7400 and the search index registered file management table 7500. The following description omits the mention of the processor 1110, like the foregoing description of FIG. 13.

First, the indexing control subprogram 1173 determines whether to execute the search index update by difference indexing (Step S401). This determination may be made based on information indicating difference indexing is to be performed or full indexing is to be performed specified together with a search index update request.

In the case of full indexing and not difference indexing (No at Step S401), the indexing control subprogram 1173 performs the following processing. First, the indexing control subprogram 1173 determines whether all files in the file server 2100 to be searched have been crawled (Step S402).

If all files have not been crawled (No at Step S402), the indexing control subprogram 1173 selects one of the files that have not been selected in the crawling among the files stored in the file server 2100 (Step S403).

The indexing control subprogram 1173 adds its file name to a search index update list (Step S404). At this step, the indexing control subprogram 1173 adds the file name of the file selected at Step S403 to this list. Thereafter, the indexing control subprogram 1173 returns to Step S402 and repeats the processing until the file names of all files are added to the search index update list. Although this description provides an example that adds the file names one by one, the processing is not limited to this. For example, if a list of files can be acquired, the list may be used.

If all files have been crawled in the case of full indexing (Yes at Step S402), the indexing control subprogram 1173 updates the search indices of the files listed in the search index update list (Step S405).

At this step, the indexing control subprogram 1173 acquires data and metadata of the selected files from the file server 2100 and identifies the types of the files listed in the search index update list. The indexing control subprogram 1173 acquires metadata schema definitions for indexing and information for indexing from the metadata schema management table 7100, schema mapping management table 7200, and search index schema management table 7300 with the identified types. The indexing control subprogram 1173 extracts contents to be indexed from the selected files based on the acquired information and reflects the extracted contents to the search index management table 7400 and search index registered file management table 7500. This is the end of the full indexing.

In the case of difference indexing (Yes at Step S401), the indexing control subprogram 1173 performs the following processing. First, the indexing control subprogram 1173 determines whether all files in the file server 2100 to be searched have been crawled (Step S406).

If all files have not been crawled (No at Step S406), the indexing control subprogram 1173 selects one of the files that have not been selected in the crawling among the files stored in the file server 2100 (Step S407).

Subsequently, the indexing control subprogram 1173 refers to the time information on the latest change of the selected file and determines whether the time is later than the previous index update (Step S408).

If the time of the latest change of the selected file is later than the previous index update (Yes at Step S408), the indexing control subprogram 1173 determines that the selected file needs search index update and adds the file name of the selected file to the search index update list (Step S409). The indexing control subprogram 1173 then returns to Step S406 and repeats the above-described processing on all files.

If the time of the latest change of the selected file is earlier than the previous index update (No at Step S408), the indexing control subprogram 1173 determines that the selected file does not need search index update and returns to Step S406. Subsequently, the indexing control subprogram 1173 repeats the above-described processing on all files.

If all files have been crawled in the case of difference indexing (Yes at Step S406), the indexing control subprogram 1173 updates the search indices of the files listed in the search index update list (Step S405). This is the end of the difference indexing.

The above-described processing completes search index update by full indexing or difference indexing with predetermined timing (or cycles).

Figure 20:
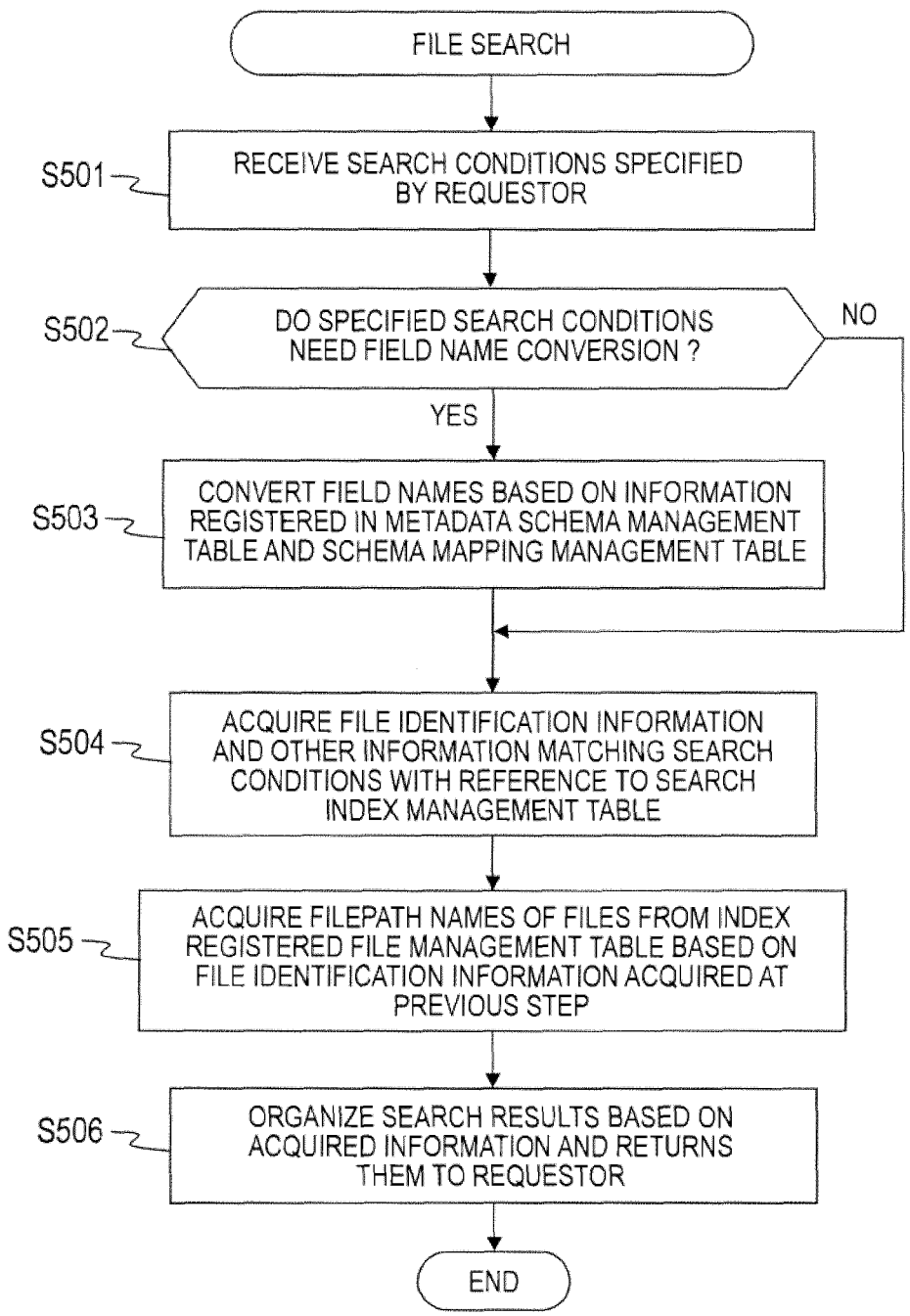
FIG. 20 is a flowchart illustrating a processing of file search using search indices in the search server according to the first embodiment of this invention.

FIG. 20 is a flowchart illustrating a processing flow of file search using search indices in the search server 1100. Hereinafter, file search performed by the processor 1110 of the search server 1100 executing the search response control subprogram 1174 is described by way of example. Specifically, described is search processing when the search server 1100 receives a search request from the search client control program 4124 in the client machine 4100. This processing is started when the search control program 1124 receives a search request. The following description omits the mention of the processor 1110 for the purpose of simplicity, like the description of FIG. 13.

First, the search response control subprogram 1174 parses the content of the search request received from the search requestor (client machine 4100) and acquires search conditions specified in the search request (Step S501).

Next, the search response control subprogram 1174 determines whether the search conditions specified in the search request need conversion of the field names for the search (Step S502). At this step, if a search condition specifies a name identical to a field name 7310 in the search index schema management table 7300, direct search with the field name can be conducted; accordingly, the search response control subprogram 1174 determines that the conversion is unnecessary. In contrast, if a search condition specifies a field alias 7260 and a namespace name 7220 in the schema mapping management table 7260, or if the search condition specifies a field alias 7260 in the schema mapping management table 7260 and a namespace alias 7120 in the metadata schema management table 7100, direct search cannot be conducted; accordingly, the search response control subprogram 1174 converts the field name to be a searchable field name. That is to say, if a field name 7310 in the search index schema management table 7300 is specified as a search condition, the search response control subprogram 1174 determines that the conversion is unnecessary and, in the other cases, it determines that the conversion is necessary.

If field name conversion is necessary (Yes at Step S502), the search response control subprogram 1174 converts field names based on the information registered in the metadata schema management table 7100 and the schema mapping management table 7200 (Step S503). Specifically, in the case where a field alias 7260 and a namespace name 7220 in the schema mapping management table 7200 are designated as search conditions, the search response control subprogram 1174 converts the field alias 7260 into the field name 7240 of the same record in the table. In the case where a field alias 7260 in the schema mapping management table 7200 and a namespace alias 7120 in the metadata schema management table 7100 are designated as search conditions, the search response control subprogram 1174 acquires the namespace name 7130 corresponding to the namespace alias 7120 to likewise convert the field alias 7260 into the field name 7240 corresponding to the namespace name 7220. Thereafter, the search response control subprogram 1174 proceeds to Step S504.

If field name conversion is not necessary (No at Step S502), the search response control subprogram 1174 identifies a record matching the search conditions with reference to the search index management table 7400 and acquires the file identification information 7431, 7434 and other information stored in the record (Step S504).

Next, the search response control subprogram 1174 refers to the search index registered file management table 7500 and acquires the filepath names 7520 of the files based on the file identification information 7431, 7434 acquired at the previous step (Step S505).

Lastly, the search response control subprogram 1174 organizes the search results based on the acquired information, returns them to the requestor, and terminates the processing (Step S506).

Through the above-described processing, the search server 1100 returns filepaths matching the search conditions in response to a search request from the client machine 4100. If the search request requires field name conversion, the search server 1100 converts the field names with reference to the metadata schema management table 7100 and the schema mapping management table 7200 to conduct a search for filepaths matching the search conditions.

FIG. 21 illustrates an example of an operation screen to execute the above-described file search through the screen of the output device 4172 of the client machine 4100 used by a search user. The file search screen 8400 provides a search condition entry section 8410 and a search result output section 8420.

The search condition entry section 8410 provides entry fields for inputting search conditions. This section may be designed in any style as far as a plurality of conditions can be entered by combining logical expressions. A search condition in this description corresponds to a combination of a field name to be designated for search and a value stored in the field identified by the field name or a range of the value. To identify a field, the namespace name of the field and the alias of the namespace name may be added. Instead of the field name, a field alias may be designated. The example of FIG. 21 shows search conditions to retrieve files having a namespace alias "A2" and a field value "1000" in the field identified by the field name "PatientID". Upon press of the Search button 8411 after entry of the foregoing search conditions, the client machine 4100 sends the designated search conditions to the search server 1100 and the search server 1100 conducts a search.

The search result output section 8420 outputs the results retrieved by the search server 1100 through the search under the designated search conditions in response to the press of the Search button 8411. The example of FIG. 21 shows an output list 8430, in which files matching the search conditions are output in a list style as search results. As to the output style of the search results, a list style is chosen by pressing the List button 8421 and a later-described table style is chosen by pressing the Table button 8422. Any output style other than the list style and the table style may be configured.

The output list 8430 may include information on the field names related to metadata and the values of the metadata of each file. Which fields are to be output or in which format the information is to be output may be configured as desirable.

The search result output section 8420 provides a search result sorting condition entry field 8423 to allow designation of the field to be used in sorting, and an ASC button 8424 and a DESC button 8425 to allow designation of sorting the search results by ascending order or descending order. Pressing the ASC button 8424 after entry of a field name in the sorting condition entry field 8423 leads the search result output section 8420 to output the search results sorted with the field value in ascending order. Pressing the DESC button 8425 after entry of a field name in the sorting condition entry field 8423 leads the search result output section 8420 to output the search results sorted with the field value in descending order.

FIG. 22 illustrates an example of an operation screen to execute the above-described file search through the screen for a search user of the client machine 4100 when the table style is designated to output search results. The screen configuration is almost the same as FIG. 21. Hereinafter, only the difference from FIG. 21 is described.

The difference from the screen shown in FIG. 21 is that the search result output section 8420 shows an output table 8440 in which the files matching the search conditions are output in a table style as search results. In outputting search results in a table style, information on the field names related to metadata and the values of the metadata of each file are output as columns of the table. Which fields are to be output or in which format the fields are to be output may be configured as desirable.

Embodiment 1 of this invention has been described above; however, this invention is not limited to Embodiment 1 and can take various configurations within the range of the spirit of the invention.

As set forth above, Embodiment 1 allows designation of not only a metadata name original in the data format or a metadata name assigned by the search server 1100 but also an alias of the namespace name 7130 (namespace alias 7120), which is provided for the purpose of convenience in search, in a search condition specified for data search. As a result, the search server 1100 can easily identify files having specific metadata even if the data to be searched are in different data formats. Accordingly, the file server 2100 can store files having a plurality of kinds of metadata and the search server 1100 can provide a search service on those files.

Although the above-described Embodiment 1 has provided an example in which a metadata name is extracted from a schema definition file 7000, if the schema definition file 7000 is written in XML language, a tag name may be used instead of the metadata name.

In the above-described Embodiment 1, at the first update of the search index management table 7400 after update of the fields in the search index schema management table 7300, the search server 1100 can incorporate data on the files associated with the updated fields into the search index management table 7400. That is to say, after an intended search index schema definition is added to the search index schema management table 7300, the search server 1100 identifies files including a metadata name corresponding to an added field as the files in need of updating. The search server 1100 can reindex the files identified as the files in need of updating and update the search index management table 7400 and the search index registered file management table 7500.

Embodiment 2

The above-described Embodiment 1 incorporates, at the first update of search indices after update of the fields in the search index schema management table 7300 in the search server 1100, data relating to the updated fields into the search index management table 7400 for conducting search. If the updating search indices after the update of the fields is performed by full indexing, information on the updated fields for all the files can be acquired without omission.

However, when a large number of files are stored in the file server 2100, updating search indices by full indexing may take excessively long time.

On the other hand, in the case of updating the search indices by difference indexing, if a file including an updated field is not updated in the file server 2100, the search server 1100 cannot identify the file as a file in need of updating the search index. Accordingly, the data relating to the updated field cannot be incorporated to the search index management table 7400. Specifically, a file changed before the previous search index update time applies the case. Accordingly, even if a field is added to the search index schema management table 7300, information on the field of the file may not be reflected to the search index management table 7400 depending on the time of the latest change of the file.

The same problem may arise because of change of a field type or rename of a field name as well as addition of a field to the search index schema management table 7300.

In view of such circumstances, demanded is an arrangement to more speedily and efficiently perform search index update after update of field information in the search index schema management table 7300.

In the following, Embodiment 2 for controlling difference indexing is described. In Embodiment 2, the search server 1100 determines whether the search index schema management table 7300 in the search server 1100 includes any updated field when conducting search index update on the files stored in the file server 2100. If it includes some updated field, the search server 1100 conducts a file search with the field name as a keyword using the search index management table 7400 managed in the search server 1100 and treats the files hit by the search as the files in need of updating the search indices.

The differences of Embodiment 2 from Embodiment 1 are part of the search index schema management table 7300 and the processing of search index schema definition registration and search index update; the remaining configuration is the same as described in the foregoing Embodiment 1.

Figure 23:
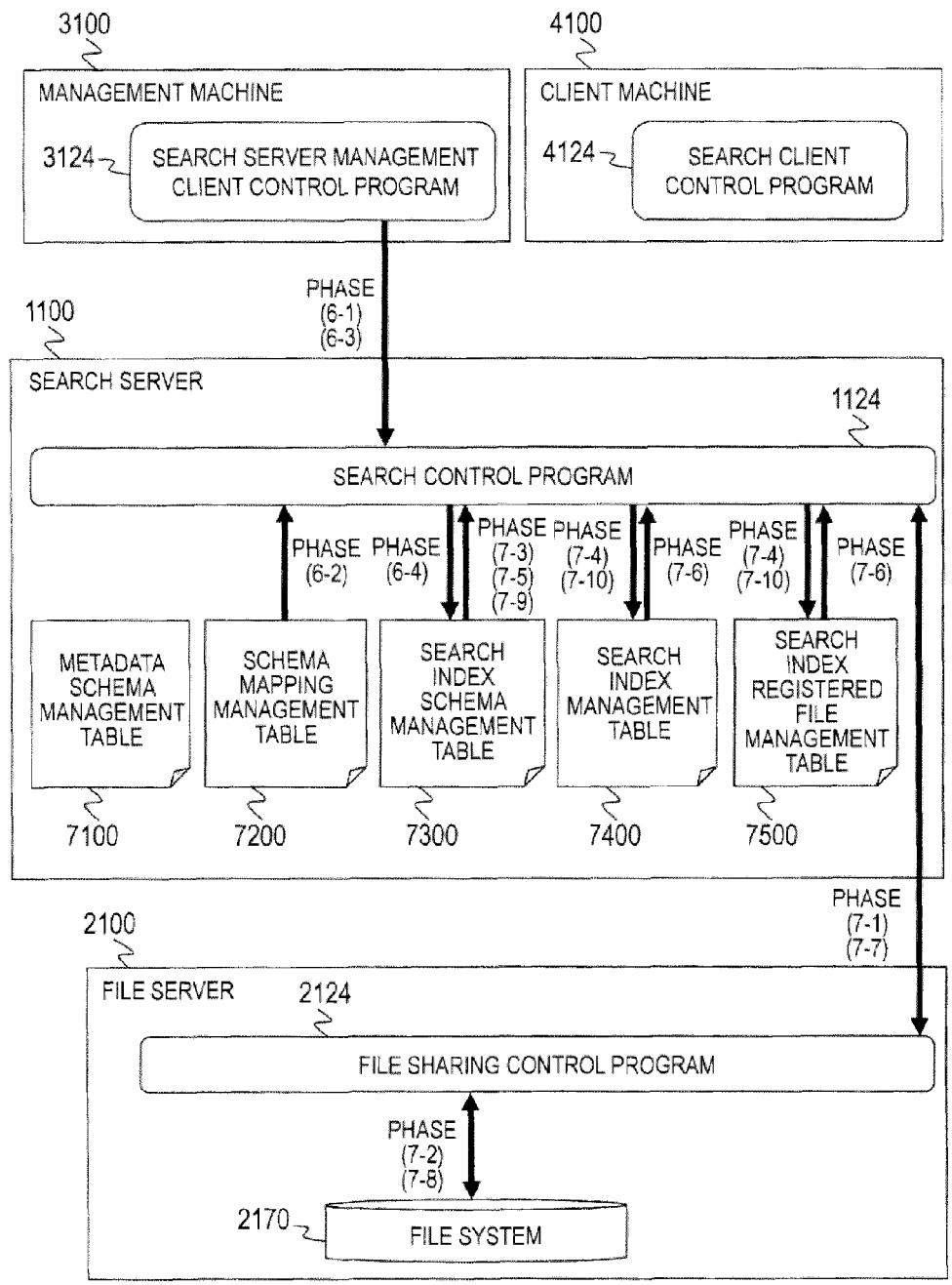
FIG. 23 is an explanatory diagram illustrating flows of processing performed in the computer system according to a second embodiment of this invention.

FIG. 23 is an explanatory diagram illustrating flows of processing performed in the computer system in Embodiment 2. In this section, two processing flows are described: one is search index schema definition registration (processing (6-n)) from the management machine 3100 to the search server 1100 and the other is search index update (processing (7-n)) from the search server 1100 to the files in the file server 2100. The processing (6-n) and the processing (7-n) respectively correspond to the processing (3-n) and the processing (4-n) in FIG. 6 of Embodiment 1. The same processing (1-n), processing (2-n), and processing (5-n) in FIG. 6 is performed in Embodiment 2. Accordingly, description common to Embodiments 1 and 2 is omitted.

First, the search index schema definition registration (6-n) is described. The system administrator calls up a screen 8300 (refer to FIG. 18) to register a search index schema to the search server 1100 with the search server management client control program 3124 in the management machine 3100 (phase (6-1)). In this operation, the system administrator designates the namespace alias used in the processing (2-n) in Embodiment 1 to use it in this search index schema registration. The search server 1100 acquires schema mapping information associated with the designated namespace alias from the schema mapping management table 7200, creates a candidate search index schema definition based on the acquired information, and presents the specifics of the candidate to the requestor (management machine 3100) (phase (6-2)). The created search index schema definition created at this phase includes the field names and data types of the fields in the schema mapping definition. The system administrator checks the presented information and sends alteration information for the specifics of the candidate to the search server 1100 if necessary (phase (6-3)). The search server 1100 creates a final search index schema definition based on the candidate search index schema definition and the alteration information from the requestor and stores it to the search index schema management table 7300 (phase (6-4)). When performing this operation, the search server 1100 newly stores information on the latest update time for each of the records of the search index schema management table 7300. As a result, update of the search index schema definition in the search server 1100 becomes available, allowing addition of new metadata to be designated in a search as well as identification when the fields corresponding to the metadata are added. This is the end of the processing flow of the search index schema definition registration.

Next, search index update (7-n) is described. The search control program 1124 in the search server 1100 accesses the files in the file server 2100, determines the files in need of updating the search indices, and retrieves the files to be updated (phase (7-1)).

To determine the files in need of updating the search indices, the search server 1000 acquires the latest change time of each file and makes the determination depending on whether it is later than the previous update of search indices. The file server 2100 that has received a file access request acquires the information on the files using the file system 2170 managed by the file server 2100 as necessary, and provides it to the requestor (management machine 3100) (phase (7-2)). The search control program 1124 that has acquired the files in need of updating identifies the file type of each file, acquires schema definition information matching the file type from the search index schema management table 7300, and parses the file to extract information required to create search index data (phase (7-3)). The search control program 1124 creates search index data based on the created information and reflects it to the search index management table 7400 and the search index registered file management table 7500 (phase (7-4)). Subsequently, the search control program 1124 refers to the newly registered time of the latest schema definition update from each record of the search index schema management table 7300 and acquires a list of field names of the records registered later than the previous search index update (phase (7-5)).

The search control program 1124 designates the acquired field names as keywords and searches for the files including the search keywords (field names) using the search index management table 7400 and the search index registered file management table 7500 (phase (7-6)).

The search control program of the search server 1100 performs file accesses to the file server 2100 based on the file list acquired as search results to retrieve the files (phase (7-7)). The file server 2100 that has received a file access request acquires information on the target files using the file system 2170 managed by the file server 2100 as necessary and provides it to the requestor (phase (7-8)). The search control program 1124 that has acquired additional files in need of updating the search indices identifies the file types of the files, acquires the schema definition information matching the file types from the search index schema management table 7300, parses the files to extract information necessary to create search index data (phase (7-9)).

The search control program 1124 creates search index data based on the created information and reflects it to the search index management table 7400 and the search index registered file management table 7500 (phase (7-10)). This is the end of the search index update by the search server 1100.

To identify updated fields of the search index schema management table 7300, to acquire the files including the field names thereof using a keyword search function, and to update the search indices by difference indexing as described above, the configuration of the search index schema management table 7300 and the processing of the search index schema definition registration and the search index update need to be partially modified. The specifics of the modification are described with FIGS. 24, 25, and 26.

FIG. 24 illustrates the modification of the search index schema management table 7300 described with FIG. 10 in Embodiment 1. The configuration of this management table is different from the table described with FIG. 10 in Embodiment 1 in the point that each record stores a latest schema definition update time 7330. This latest schema definition update time 7330 stores information on the time when the record is added to the search index schema management table 7300 and when the specifics of the record is updated. The remaining configuration is the same as shown in FIG. 10.

Figure 25:
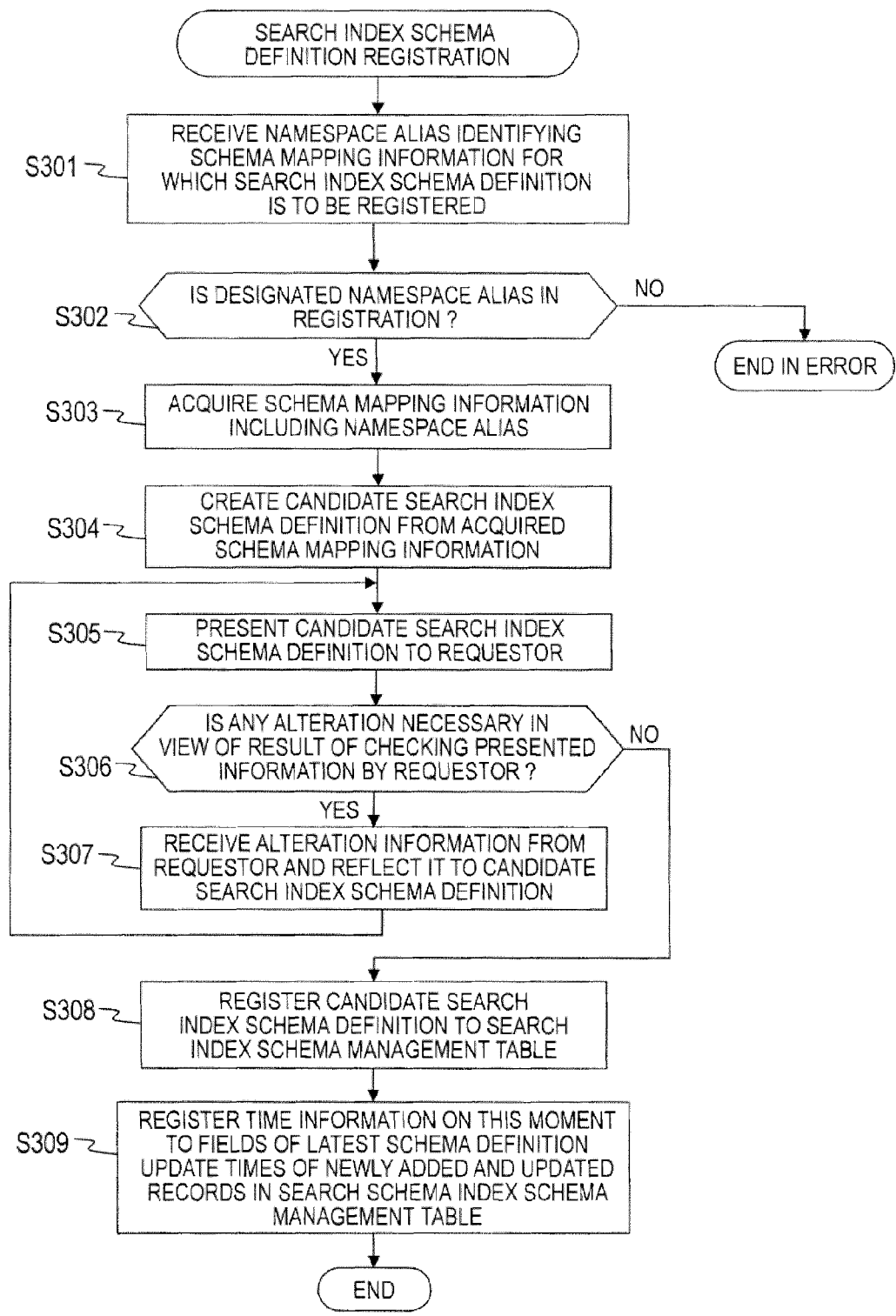
FIG. 25 illustrates the search index schema definition registration according to the second embodiment of this invention.

FIG. 25 illustrates the modification of the search index schema definition registration described with FIG. 17 in Embodiment 1. This processing is different from the search index schema definition registration described with FIG. 17 in the point that, in registering a candidate search index schema definition to the search index schema management table 7300, additional information of the latest schema definition update times 7330 shown in FIG. 24 is registered together. The specifics are described in the following.

In the flowchart of FIG. 25, the difference from FIG. 17 in Embodiment 1 is that Step S309 has been newly added subsequent to Step S308. The remaining is the same as FIG. 17. Hereinafter, only the difference is described.

After the processing of Step S308, the search index schema control subprogram 1171 registers time information on this moment to the latest schema definition update times 7330 of the newly added records and updated records in the search index schema management table 7300 (Step S309). This operation allows identification when the record is updated. This information is used in the later-described search index update.

Figure 26A:
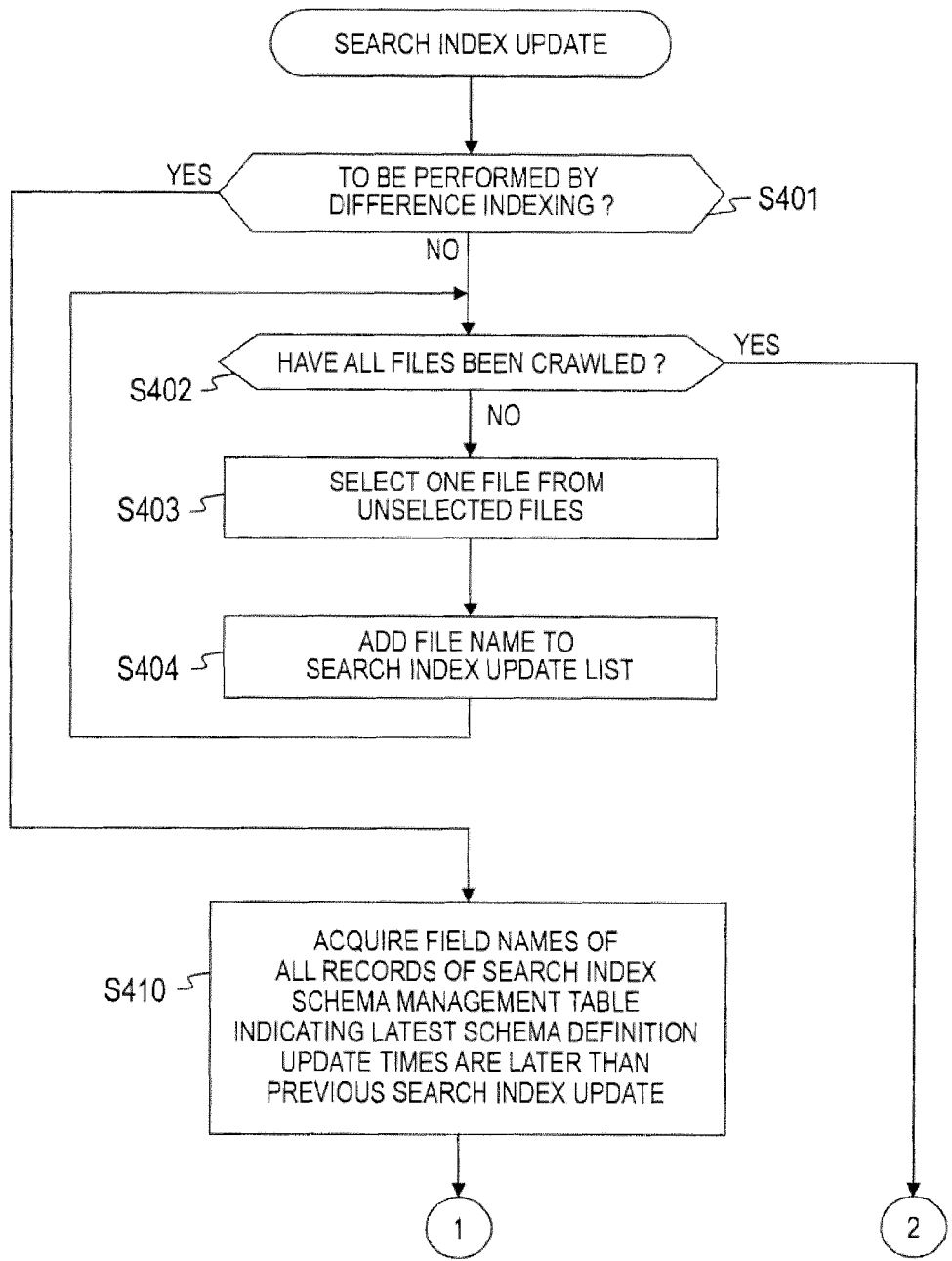
FIG. 26A is a first-half of a flowchart of processing of the search index update according to the second embodiment of this invention.
Figure 26B:
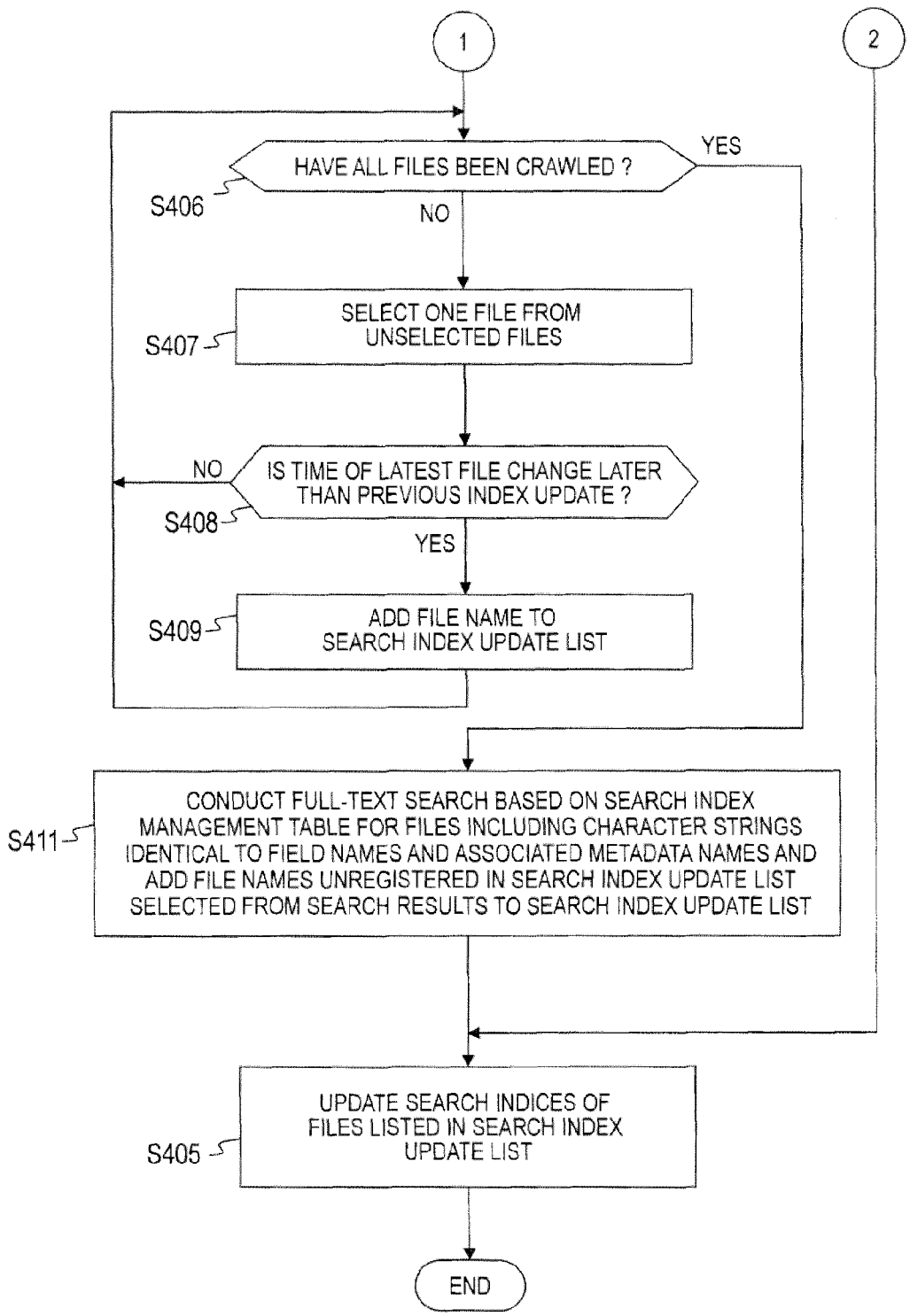
FIG. 26B is a second-half of a flowchart of processing of the search index update according to the second embodiment of this invention.

FIGS. 26A and 26B are a flowchart of processing partially modified from the search index update illustrated in FIG. 19 in Embodiment 1. Compared to the search index update illustrated in FIG. 19, this flowchart is different in the points that the indexing control subprogram 1173 acquires the latest update times 7330 of the schema definition newly provided in the search index schema management table 7300, acquires field names 7310 stored in the records having an update time later than the previous update of the search index, conducts a file search with the field names 7310 as keywords, and treats the files hit by the search as the files in need of updating the search indices. The specifics are described in the following.

In the flowchart of FIGS. 26A and 26B, the differences from FIG. 19 is that the processing in the case of Yes at Step S401 includes a new Step S410 before Step S406 in FIG. 19 and that the processing in the case of Yes at Step S406 includes a new Step S411 before Step 405 in FIG. 19. The remaining is the same as FIG. 19. Hereinafter, only the differences are described.

If Yes at Step S401, the indexing control subprogram 1173 acquires the field names 7310 of all records indicating that the latest schema definition update time 7330 in the search index schema management table 7300 is later than the previous search index update (Step 410). The field names 7310 acquired at this step are used later in determining the files in need of updating the search indices. It should be noted that, at this step, the indexing control subprogram 1173 further acquires metadata names 7230 associated with the field names from the schema mapping management table 7200. The subsequent search using a field name 7310 also uses this metadata name 7230.

If Yes at Step 406 in FIG. 26B, the indexing control subprogram 1173 conducts a full-text search for files including the character strings identical to the field names 7310 acquired at Step 410 and the character strings identical to the metadata names 7230 associated with the field names with the search index management table 7400. The indexing control subprogram 1173 selects the file names unregistered in the search index update list from the files hit as search results and adds them to the list (Step S411).

At this step, the file names of the files hit as search results are acquired from the search index registered file management table 7500. This step enables listing files in need of updating the search indices that are difficult to be extracted in the difference indexing using the latest file change time in Embodiment 1, so that search index update can be conducted.

The above-described processing achieves speedy and efficient search index update for the users of the search service, even if a large number of files are to be searched. As a result, search freshness in the search service is increased, contributing to increase in user's satisfaction to the search service. For the system administrator of the search service, speedy and efficient search index update regardless of a large number of files to be searched leads to reduction in computer resources required for the search index update.

Embodiment 3

The above-described Embodiment 2 uses the full-text search function with a field name designated as a keyword to prevent omission of files in need of updating the search indices. However, such a simple full-text search function lists up files including a character string identical to the field name as a value of a given field. Accordingly, this approach has a problem that files not in need of updating the search index are also acquired as the files in need of updating, while eliminating omission in acquiring the files in need of updating.

In view of such circumstances, demanded is an arrangement that lists up only the files including updated field names after the fields are updated in the search index schema management table 7300.

In the following, Embodiment 3 for controlling difference indexing is described. In Embodiment 3, the search server 1100 indexes all the metadata names associated with a file to be searched together with indexing the file. In updating the search indices of files stored in the file server 2100, the search server 1100 determines whether its own search index schema management table 7300 includes any updated field. If some updated field is included, the search server 1100 designates the field name as a search condition and conducts a metadata search using the search index management table 7400 managed by the search server 1100, and treats the files hit by the metadata search as files in need of updating the search indices.

For the search server 1100 to identify an updated field of the search index schema management table 7300 after the field is updated, to extract the files including the field name by using a metadata search function, and to update the search index by difference indexing as described above, the field definition in the search index schema management table 7300 and the processing of the search index schema definition update and the search index update need to be partially modified. The specifics of the modification are described with FIGS. 27, 28A, 28B, 29A, and 29B.

FIG. 27 is a search index schema management table 7300 which has been partially modified from the same table described with FIG. 24 in Embodiment 2. The configuration of this management table is different from the configuration described with FIG. 24 in the point that a record having a field name 7310 of "MetadataName" has been added. This record means to extract character strings of metadata names associated with a file to be searched and to index them. The character string provided for the field name 7310 of the newly added record may be any character string. The field type 7320 of the added record is specified as an array of character strings or a list of character strings. This is because, if a plurality of pieces of metadata is associated with a file, all the metadata names need to be indexed. The remaining configuration is the same as shown in FIG. 24.

Figure 28A:
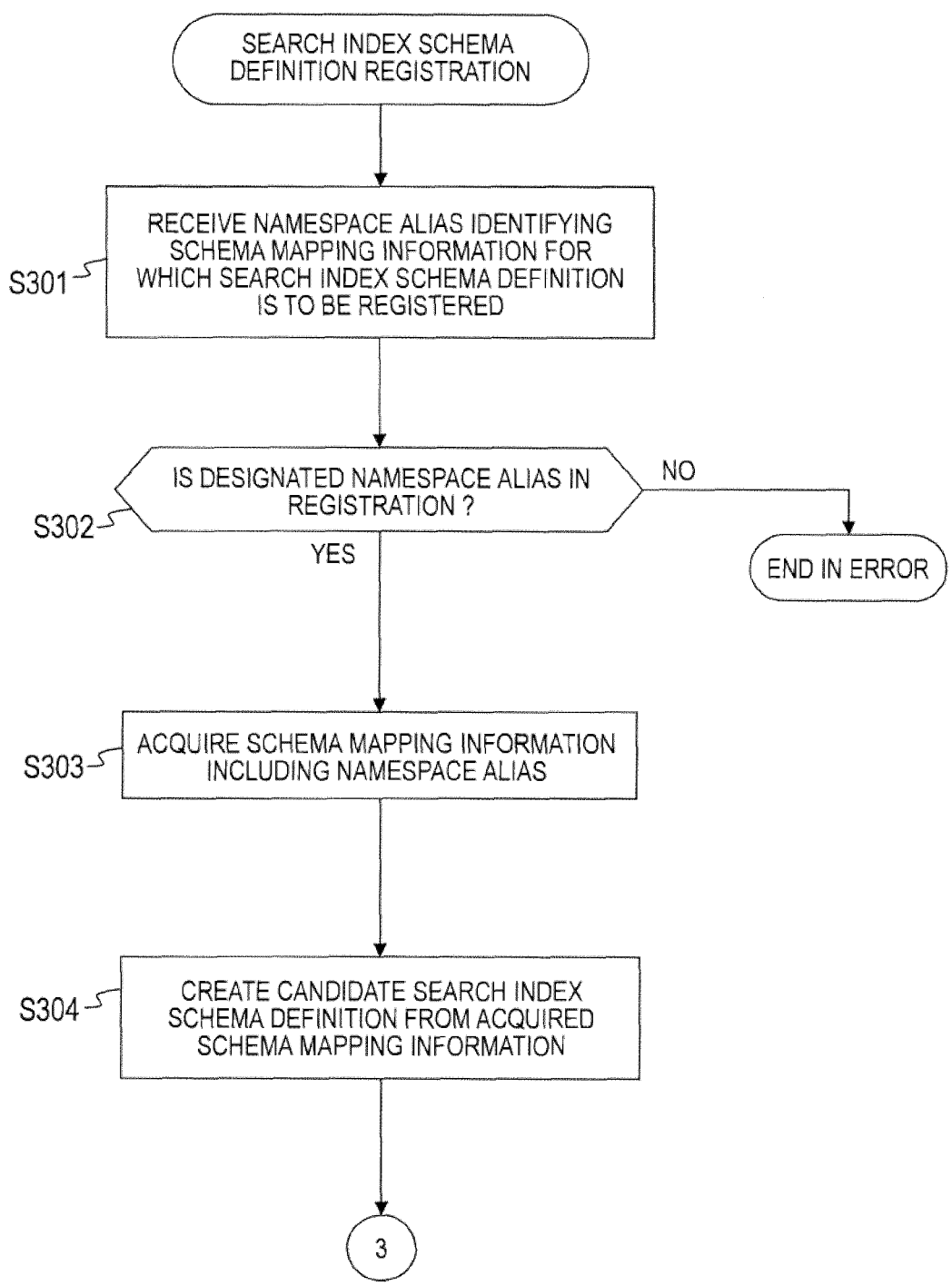
FIG. 28A is a first-half of a flowchart of processing of the search index schema definition registration according to the third embodiment of this invention.
Figure 28B:
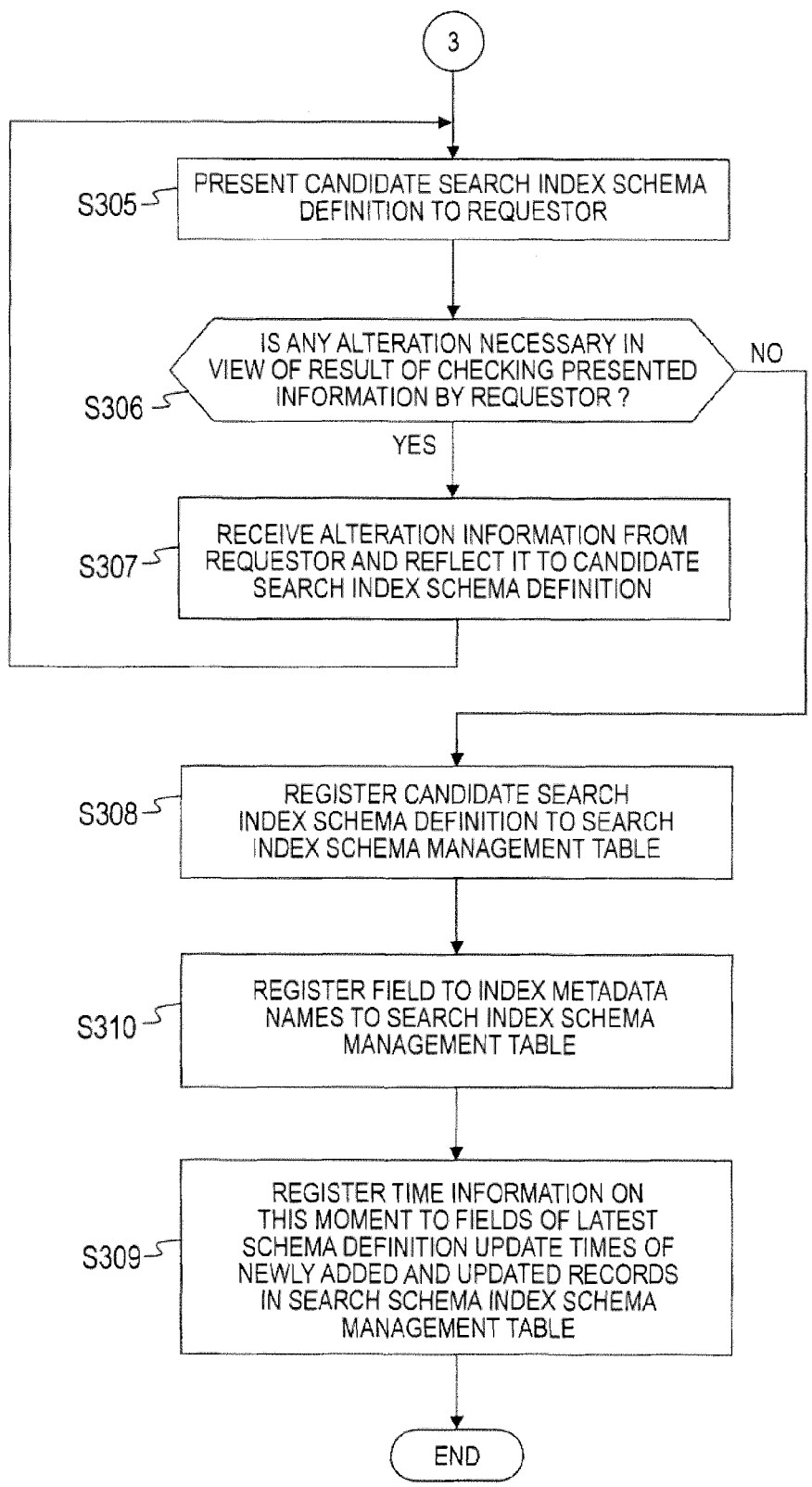
FIG. 28B is a second-half of a flowchart of processing of the search index schema definition registration according to the third embodiment of this invention.

FIGS. 28A and 28B are a flowchart of processing partially modified from the search index schema definition registration illustrated in FIG. 25 in Embodiment 2. Compared to the search index schema definition registration illustrated in FIG. 25, this processing is different in the point that the search index schema management table 7300 includes a field for indexing metadata names. The specifics are described in the following.

In the flowchart of FIGS. 28A and 28B, the difference from FIG. 25 is that FIG. 28B includes a new Step S310 subsequent to Step S308. The remaining is the same as FIG. 25. Hereinafter, only the difference is described.

After Step S308, the search index schema control subprogram 1171 registers a field to index metadata names to the search index schema management table 7300 (Step S310). At this step, the search index schema control subprogram 1171 registers a record having a field name assigned to index metadata names to the search index schema management table 7300 in the search server 1100.

The addition of this record leads to indexing a set of metadata names in a file in the next search index update. This information is used in the later-described search index update. If the search index schema management table 7300 already has a record to index metadata names, the search index schema control subprogram 1171 does nothing and proceeds to the next step.

Figure 29A:
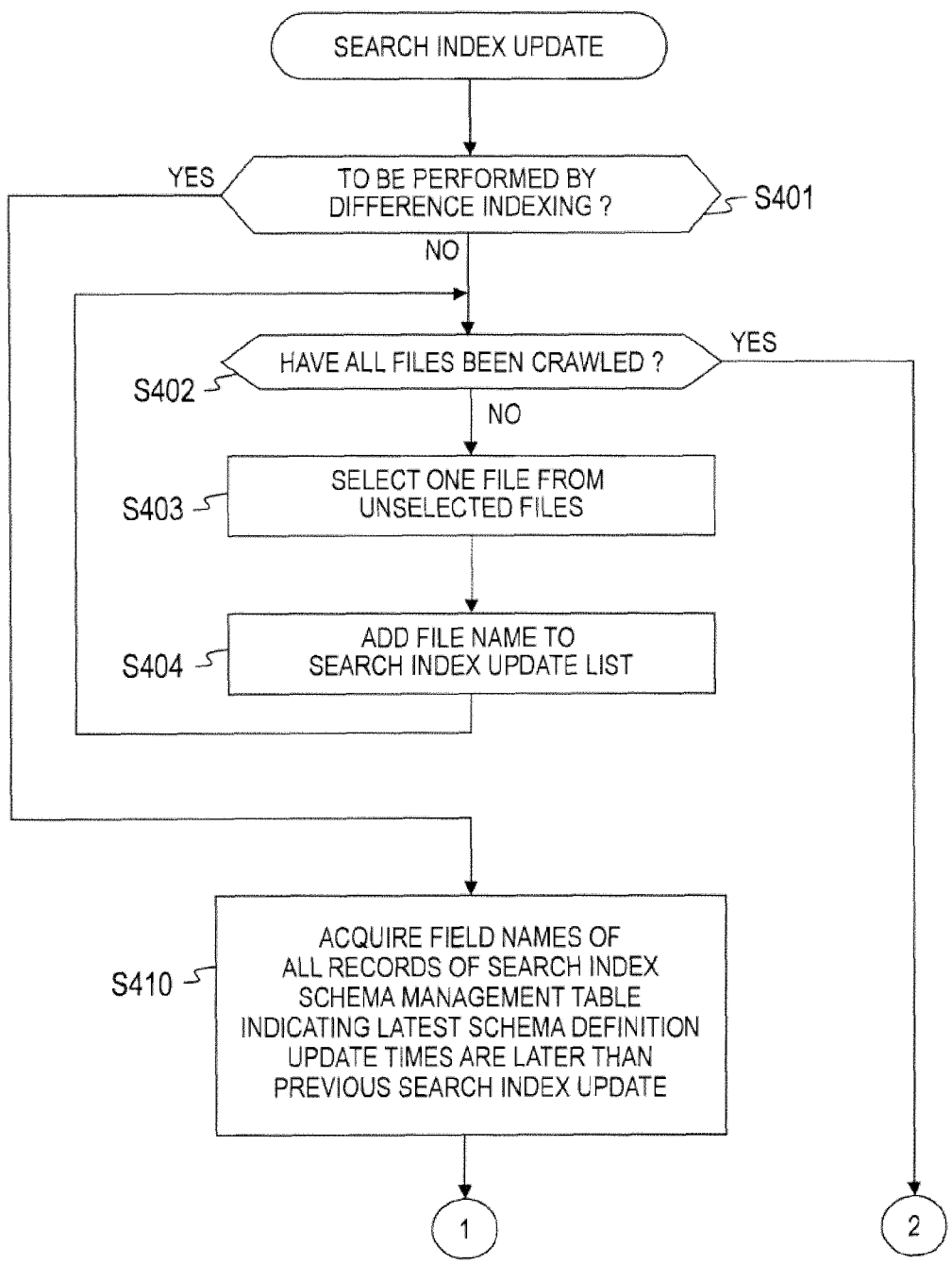
FIG. 29A is a first-half of a flowchart of processing of the search index update according to the third embodiment of this invention.
Figure 29B:
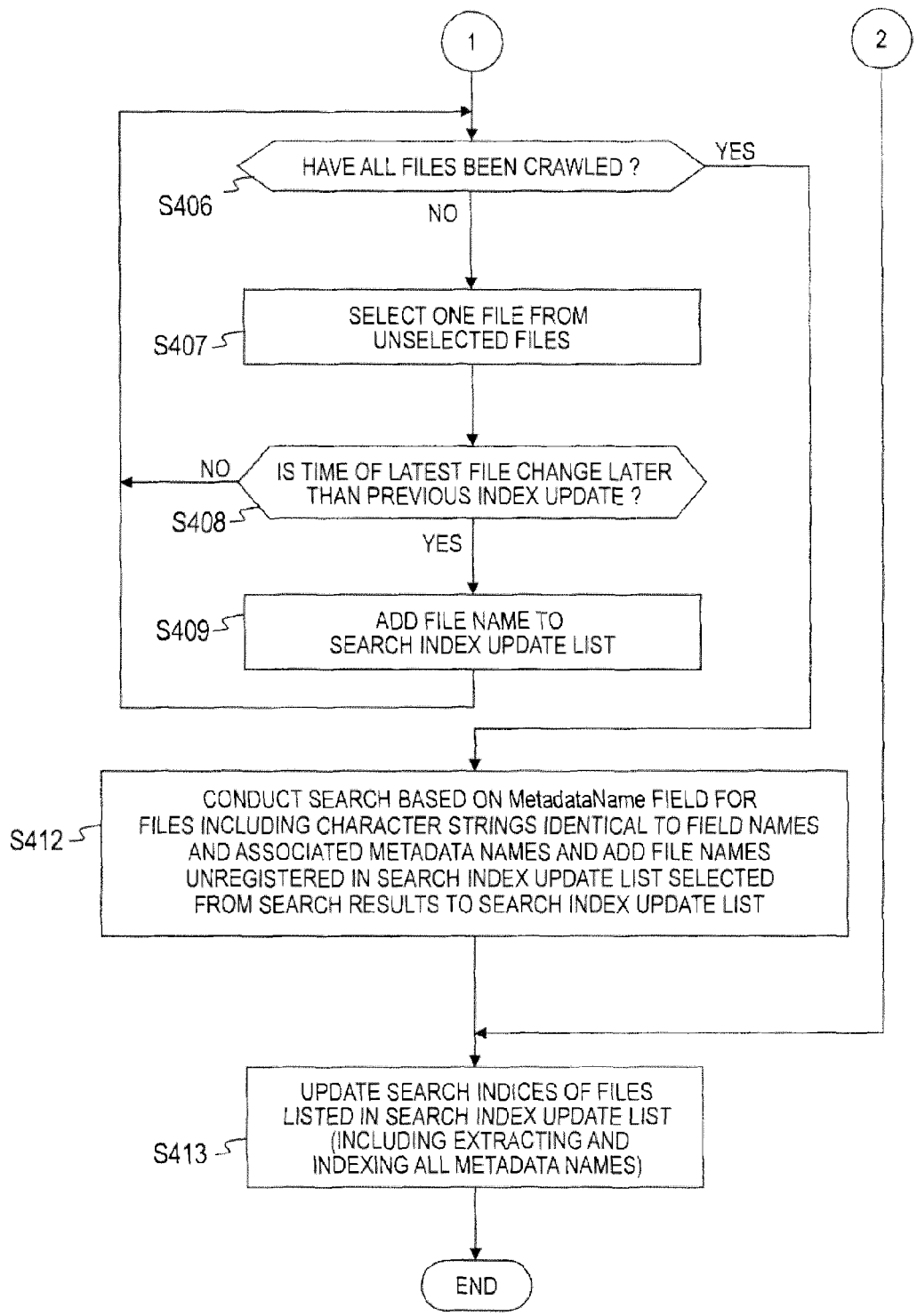
FIG. 29B is a second-half of a flowchart of processing of the search index update according to the third embodiment of this invention.

FIGS. 29A and 29B are a flowchart of processing partially modified from the search index update illustrated in FIGS. 26A and 26B in Embodiment 2. Compared to the search index update illustrated in FIGS. 26A and 26B, this processing is different in the points that the indexing control subprogram 1173 conducts a metadata search using the field to index metadata names and treats the files hit by the search as the files in need of updating the search indices. The specifics are described in the following.

In the flowchart of FIGS. 29A and 29B, the differences from FIGS. 26A and 26B are that, in the processing in the case of Yes at Step S406, Step S412 has replaced Step S411 in FIG. 26B and that Step S413 has replaced Step 405 in FIG. 26B. The remaining is the same as FIGS. 26A and 26B. Hereinafter, only the differences are described.

If Yes at Step S406 in FIG. 29B, the indexing control subprogram 1173 conducts a search based on the field to index metadata names in the search index management table for the files including character strings identical to the field names and associated metadata names. The indexing control subprogram 1173 then selects the file names unregistered in the search index update list from the files hit as search results, and adds them to the list (Step S412).

At this step, the file names of the files hit as search results are acquired from the search index registered file management table 7500. This processing reduces the possibility of listing files which are not in need of updating the search index as the files in need of updating the search indices, compared to the processing using full-text search like Embodiment 2.

After Step S412 or if Yes at Step S402, the indexing control subprogram 1173 updates the search indices of the files listed in the search index update list, and further, extracts and indexes all the metadata names in the files (Step S413), instead of Step S405. Indexing metadata names at this step enables the above-described Step 412 to determine the files to be listed in the search index update list through a search with the field names 7310 and the associated metadata names 7230.

The above-described processing improves accuracy in narrowing down the files in need of updating the search indices, compared to Embodiment 2.

Embodiment 4

The above-described Embodiment 3 uses the metadata search function using indexed field names to prevent omission in determining the files in need of updating the search indices. However, storing the information in the search index management table 7400 may increase the volume of data in the management table 7400, so that the processing performance in the search function, which should be essential to provide the search service, might be degraded.

In view of such circumstances, demanded is an arrangement that stores and manages the field names and the metadata names associated with the field names separately from the search index management table 7400.

In the following, Embodiment 4 for controlling search index update by difference indexing is described. In Embodiment 4, the search server 1100 newly introduces a metadata name management table 7600 indicating, for each of the field names 7310 in the search index schema management table 7300, which files include the metadata name 7230 associated with the field name 7310 and conducts search index update by difference indexing with the metadata name management table 7600.

To introduce a metadata name management table 7600 and to conduct search index update by difference indexing with the metadata name management table 7600 as described above, the configuration of the search server 1100 and the processing of the search index update need to be partially modified and a metadata name management table 7600 needs to be added. The specifics of the modification are described with FIGS. 30, 31, 32A, and 32B.

Figure 30:
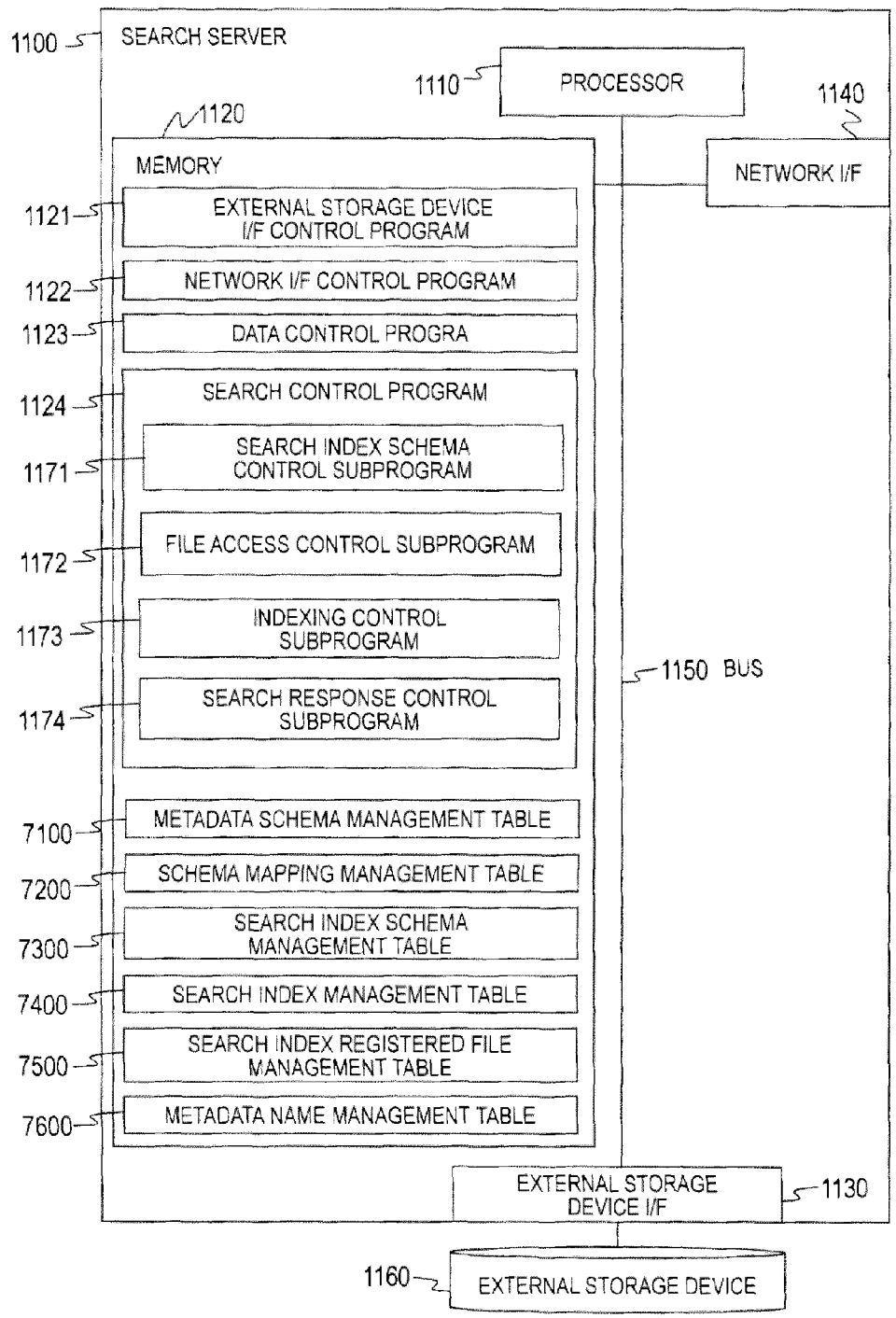
FIG. 30 is a block diagram illustrating a configuration of a search server according to a fourth embodiment of this invention.

FIG. 30 is a block diagram illustrating a configuration of a search server 1100 which has been partially modified from the search server 1100 described with FIG. 2 in Embodiment 1. This configuration is different from the configuration described with FIG. 2 in the point that a metadata name management table 7600 has been added in the memory 1120. This metadata name management table 7600 is described later. The remaining configuration is the same as shown in FIG. 2.

FIG. 31 is a diagram illustrating a configuration of a metadata name management table 7600. The metadata name management table 7600 is created using the results of extraction of metadata from the files to be searched in order to manage information required to identify the files including some metadata.

Specifically, the metadata name management table 7600 includes information of metadata IDs 7610, metadata names 7620, and file lists 7630.

Each metadata ID 7610 is to uniquely identify a metadata name and is an identification number automatically assigned to a record of this metadata name management table 7600. Each metadata name 7620 stores a character string of a metadata name included in the files to be searched. Each file list 7630 stores a list of information to identify files including the metadata name of the record. For example, it may store the filepath names of the files, URLs of the files, or the values identical to the file identification information 7510 of the search index registered file management table 7500.

Figure 32A:
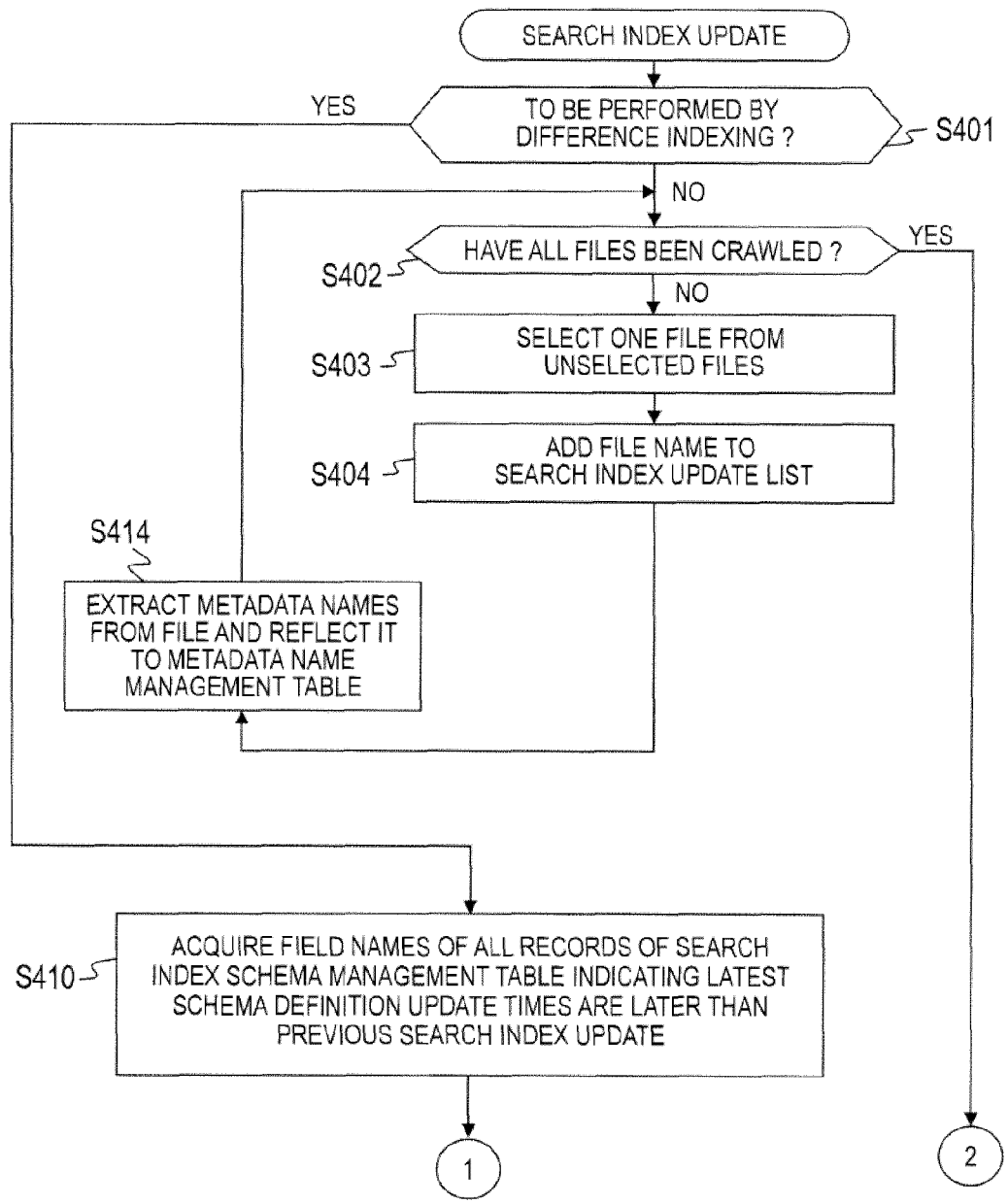
FIG. 32A is a first-half of a flowchart of processing of the search index update according to the fourth embodiment of this invention.
Figure 32B:
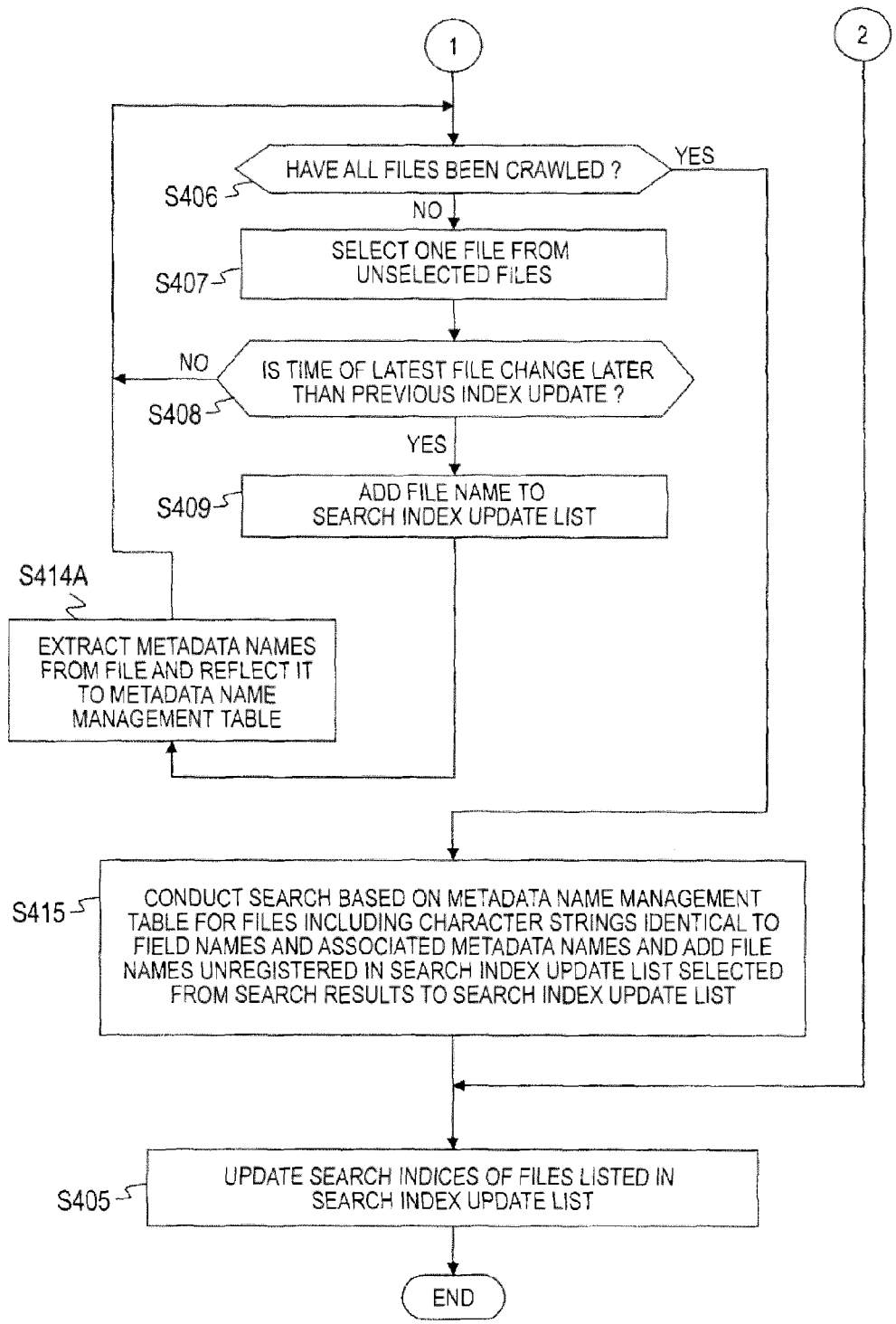
FIG. 32B is a second-half of a flowchart of processing of the search index update according to the fourth embodiment of this invention.

FIGS. 32A and 32B are a flowchart partially modified from the flowchart of search index update in FIGS. 26A and 26B. Compared to the search index update illustrated in FIGS. 26A and 26B, this processing is different in the points that metadata names extracted from the files are registered in the metadata name management table 7600 and that the files in need of updating the search indices can be determined with this metadata name management table 7600. The specifics are described in the following.

In the flowchart of FIGS. 32A and 32B, the differences from FIGS. 26A and 26B are that, in the processing subsequent to Step S404 in FIG. 32A, the processing subsequent to Step 409 in FIG. 32B, and the processing in the case of No at Step S408 of FIB. 32B, Step S414 has been newly added prior to the corresponding processing in FIGS. 26A and 26B and that Step S415 has replaced Step S411 in FIG. 26B. The remaining is the same as FIGS. 26A and 26B. Hereinafter, only the differences are described.

After Step S404, after Step S409, or if No at Step S408, the indexing control subprogram 1173 extracts metadata names from the file and reflects the extracted metadata names to the metadata name management table 7600 (Step S414, S414A). This operation may be performed as a part of the indexing the file.

If Yes at Step S406, the indexing control subprogram 1173 conducts, instead of performing Step S411, a search based on the metadata name management table 7600 for the files including character strings identical to the field names and the metadata names associated with the field names, selects the file names unregistered in the search index update list from the files hit as search results, and adds them to the list (Step S415). The file names of the files hit as search results are converted as necessary. For example, if the file lists 7630 of the metadata name management table 7600 hold the same information as the file identification information 7510 in the search index registered file management table 7500, the indexing control subprogram 1173 independently acquires the filepath names associated with the file identification information 7510 with reference to the search index registered file management table 7500. This step enables determination of files in need of updating the search indices with almost the same accuracy as Embodiment 3, even if the search index management table 7400 does not store the indexed metadata names like Embodiment 3.

The above-described processing can narrow down the files in need of updating the search indices with almost the same accuracy as Embodiment 3 without increasing the data volume stored in the search index management table 7400 compared to Embodiment 3.

Embodiment 5

The above-described Embodiment 4 newly introduces the metadata name management table 7600 that indicates which files include individual metadata names 7230 associated with the field names 7310 in the search index schema management table 7300 and uses the metadata name management table 7600 in difference indexing. To employ this technique, the data of the metadata name management table 7600 needs to be stored in the search server 1100. If the system does not allow a big storage data volume for the search server 1100, the search server 1100 may have a difficulty in storing the data of the metadata name management table 7600.

In view of such circumstances, demanded is an arrangement that a server different from the search server 1100 manages the metadata name management table 7600.

In the following, Embodiment 5 for controlling search index update by difference indexing is described. In Embodiment 5, a metadata name management table 7600 is introduced to the file server 2100 holding the files to be searched and the search server 1100 updates search indices by difference indexing with the metadata name management table 7600.

To introduce a metadata name management table 7600 to the file server 2100 and to perform search index update by difference indexing using the metadata name management table 7600 as described above, the hardware configuration of the file server 2100 and the processing of the search index update need to be partially modified and the processing of the file access performed by the file server 2100 in the above-described Embodiments 1 to 4 needs to further include processing related to the metadata name management table 7600. The specifics of the modification are described with FIGS. 33, 34, 35A, and 35B.

Figure 33:
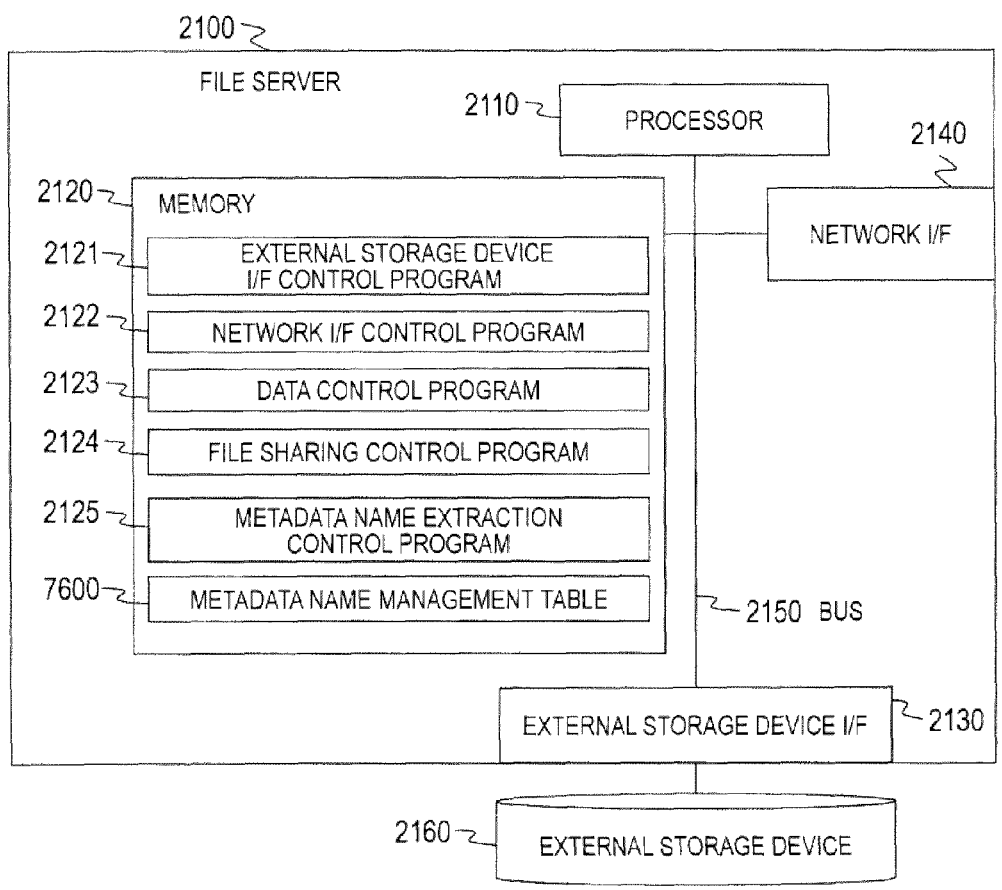
FIG. 33 is a block diagram illustrating a configuration of a file server according to a fifth embodiment of this invention.

FIG. 33 is a block diagram illustrating a configuration of a file server 2100 which has been partially modified from the file server 2100 illustrated in FIG. 3. This configuration is different from the configuration described with FIG. 3 in Embodiment 1 in the point that a metadata name extraction control program 2125 and a metadata name management table 7600 have been added in the memory 2120. The metadata name extraction control program 2125 is described later. The metadata name management table 7600 is the same as described with FIG. 31 in the foregoing Embodiment 4. The remaining configuration is the same as shown in FIG. 3.

Figure 34:
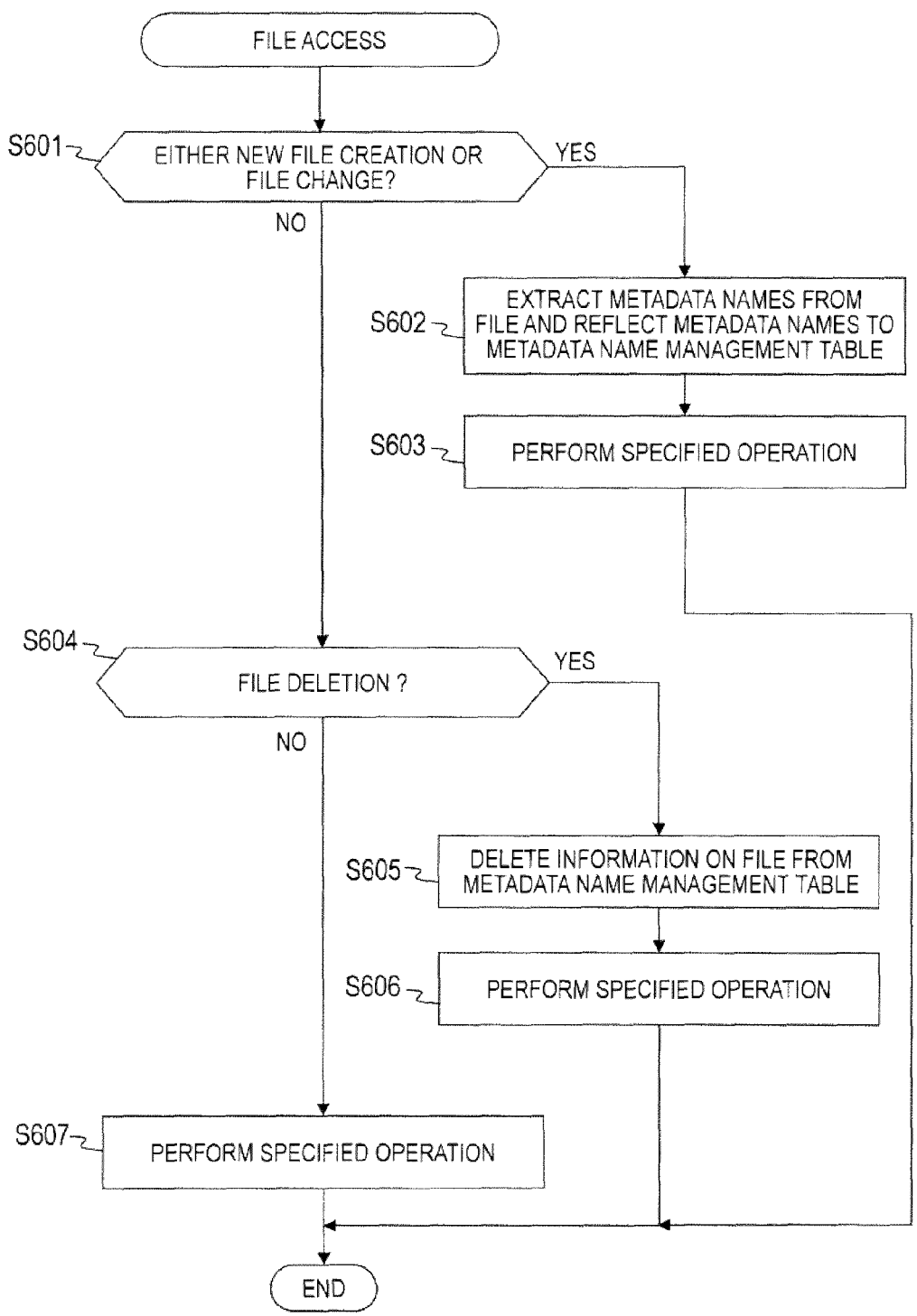
FIG. 34 is a flowchart illustrating an example of file access in a file sharing service according to the fifth embodiment of this invention.

FIG. 34 is a flowchart illustrating an example of file access in a file sharing service provided by the file sharing control program 2124 in the file server 2100. This processing provides a variety of file accessing requested from clients of the file sharing service (the search server 1100 and the client machine 4100).

In performing this file access, the file sharing control program 2124 newly performs processing of parsing the content of the accessed file, extracting metadata names, and reflecting the extracted metadata names to the metadata name management table 7600 in cooperation with the metadata name extraction control program 2125. The metadata name extraction control program 2125 may use a publicly or commonly known string parser program to extract character strings corresponding to metadata names from the file.

First, the processor 2120 executing the file sharing control program 2124 identifies whether the file access requested from the client is either new file creation or file change (Step S601). At this step, the identification is made based on the information on the kind of processing in the file access request.

If the requested file access is either new file creation or file change (Yes at Step S601), the file sharing control program 2124 extracts metadata names from the file and reflects the extracted metadata names to the metadata name management table 7600 (Step S602). At this step, the file sharing control program 2124 cooperates with the metadata name extraction control program 2125 to extract metadata names. Subsequently, the file sharing control program 2124 conducts the specified file access (Step S603) and terminates the processing.

If the requested file access is neither new file creation nor change (No at Step S601), the file sharing control program 2124 identifies whether the requested file access is file deletion (Step S604). If it is file deletion (Yes at Step S604), the file sharing control program 2124 deletes the information on the file to be deleted from the metadata name management table 7600 (Step S605). Subsequently, the file sharing control program 2124 deletes the file for the specified file access (Step S606) and terminates the processing.

If the requested file access is not file deletion (No at Step S604), the file sharing control program 2124 conducts the file access specified by the client (Step S607) and terminates the processing.

Figure 35A:
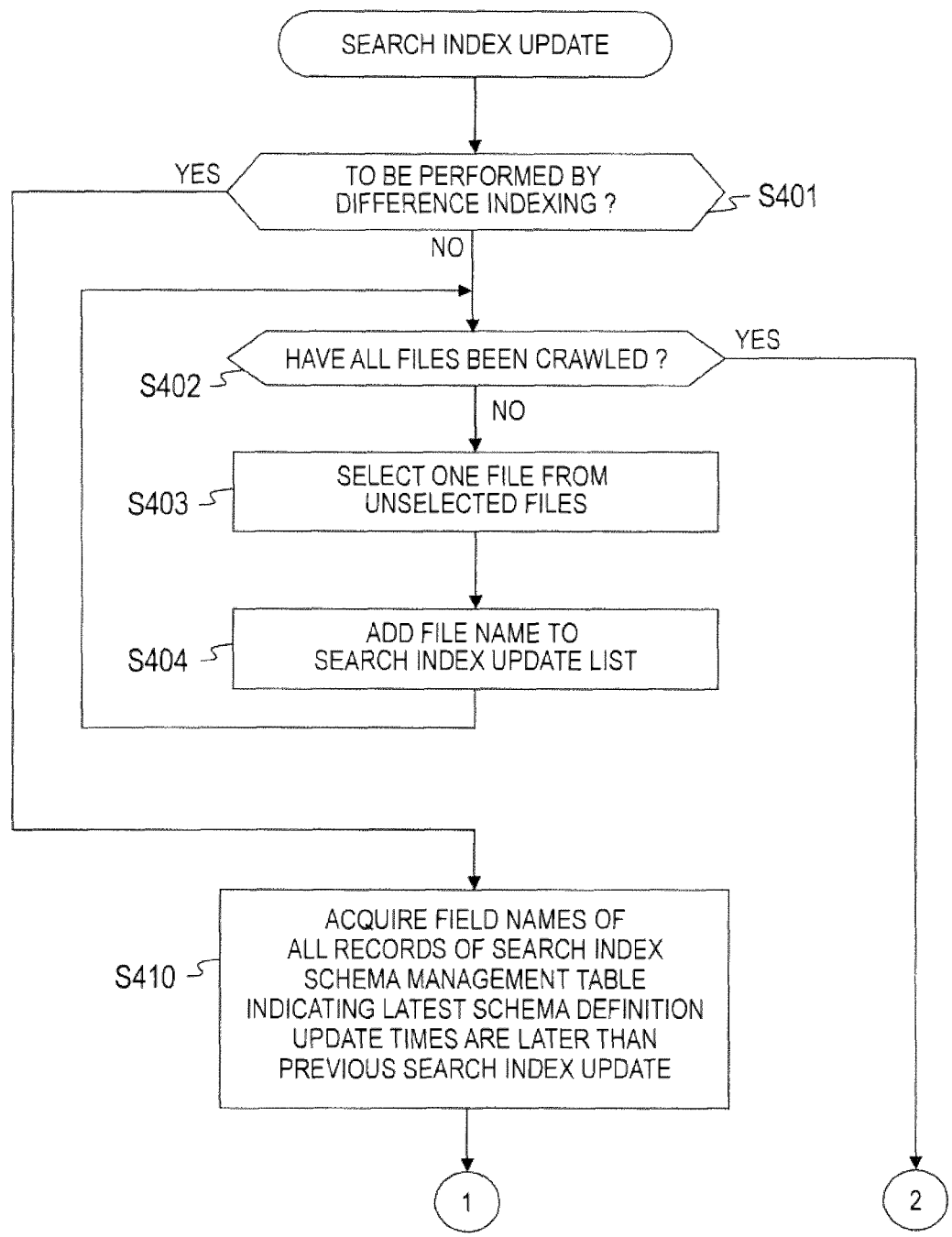
FIG. 35A is a first-half of a flowchart of processing of the search index update according to the fifth embodiment of this invention.
Figure 35B:
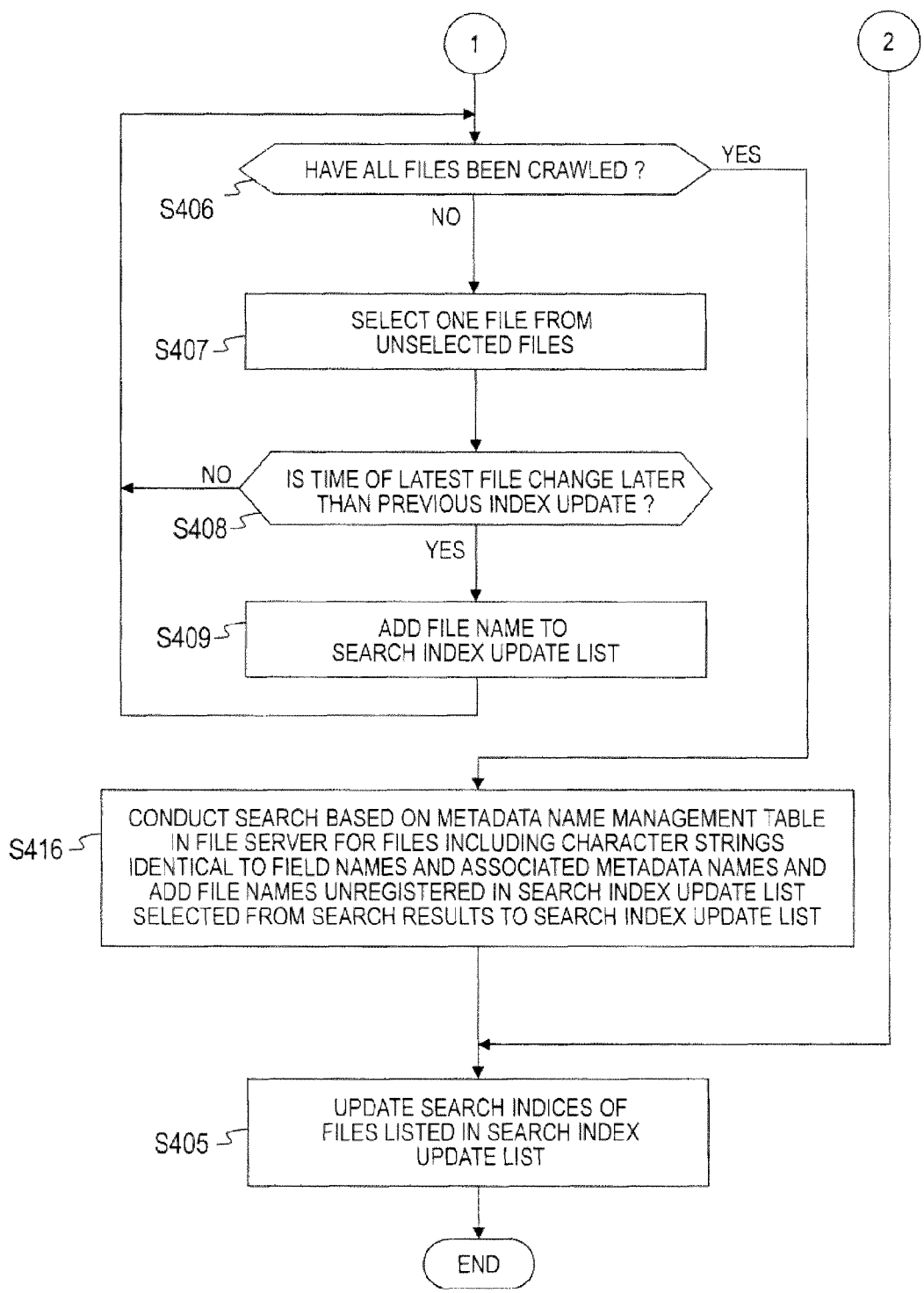
FIG. 35B is a second-half of a flowchart of processing of the search index update according to the fifth embodiment of this invention.

FIGS. 35A and 35B are a flowchart of processing partially modified from the search index update described with FIGS. 26A and 26B in Embodiment 2. Compared to the search index update illustrated in FIGS. 26A and 26B, this processing is different in the point that a search is conducted using the metadata name management table 7600 in the file server 2100 and the files hit by the search are also treated as the files in need of updating the search indices. The specifics are described in the following.

In the flowchart of FIGS. 35A and 35B, the difference from FIGS. 26A and 26B is that, in the processing in the case of Yes at Step S406 in FIG. 35B, Step S416 has replaced Step S411 in FIG. 26B. The remaining is the same as FIGS. 26A and 26B. Hereinafter, only the difference is described.

If Yes at Step S406 in FIG. 35B, the indexing control subprogram 1173 conducts, instead of performing Step 3411, a search based on the metadata name management table 7600 in the file server 2100 for the files including character strings identical to the field names and the metadata names associated with the field names, selects the file names unregistered in the search index update list from the files hit as search results, and adds them to the list (Step S416). At this step, the indexing control subprogram 1172 uses the filepath names stored in the file lists 7630 in the metadata name management table 7600 as the file names of the files hit in the search.

The above-described processing can narrow down the files in need of updating the search indices with almost the same accuracy as Embodiment 3 without increasing the data volume stored in the search server 1100 compared to Embodiment 4. Furthermore, since the file server 2100 performs metadata name extraction before search index update, the steps in the search index update can be reduced.

Embodiment 6

The above-described Embodiment 5 provides an example that the metadata name management table 7600 is managed in the file server 2100. This metadata name management table 7600 may be managed in a server other than the search server 1100 and the file server 2100. For example, in a computer system that consolidates data related to metadata in a metadata management server, which is newly provided separately from the search server 1100 and the file server 2100, this metadata name management table 7600 can be managed in the metadata management server.

For this purpose, demanded is an arrangement that a given server different from the search server 1100 and the file server 2100 manages the metadata name management table 7600.

In the following, Embodiment 6 for controlling search index update by difference indexing is described. In Embodiment 6, the metadata name management table 7600 is newly introduced to a given server (hereinafter, referred to as metadata management server 5100) and the search server 1100 performs search index update by difference indexing with the metadata name management table 7600, while the search server 1100 and the file server 2100 uses the metadata name management table 7600.

To introduce the metadata name management table 7600 to the metadata management server 5100 different from the search server 1100 and the file server 2100 and to perform search index update by difference indexing with the metadata name management table 7600 as described above, the configuration of the computer system and the processing of the search index update and the file access in the file server 2100 need to be partially modified and the metadata management server 5100 is newly added. The specifics of the modification are described with FIGS. 36, 37, 38A, and 38B.

Figure 36:
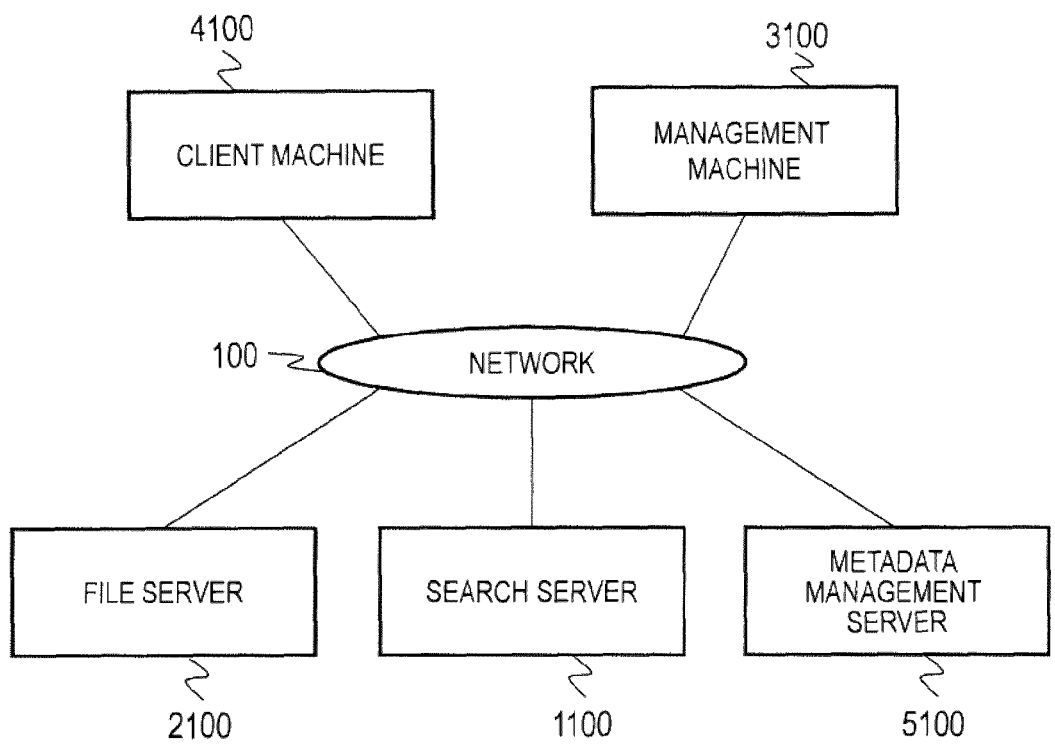
FIG. 36 is a block diagram illustrating a configuration of a computer system according to a sixth embodiment of this invention.

FIG. 36 is a block diagram illustrating a configuration of a computer system which has been partially modified from the computer system illustrated in FIG. 1 in Embodiment 1. This configuration is different from the configuration described with FIG. 1 in Embodiment 1 in the point that a metadata management server 5100 has been added. The metadata management server 5100 is described later. Although the example of FIG. 36 shows only one metadata management server 5100, the number of the metadata management servers is not limited to this. A plurality of metadata management servers 5100 may be provided. The remaining configuration is the same as shown in FIG. 1 of Embodiment 1.

Figure 37:
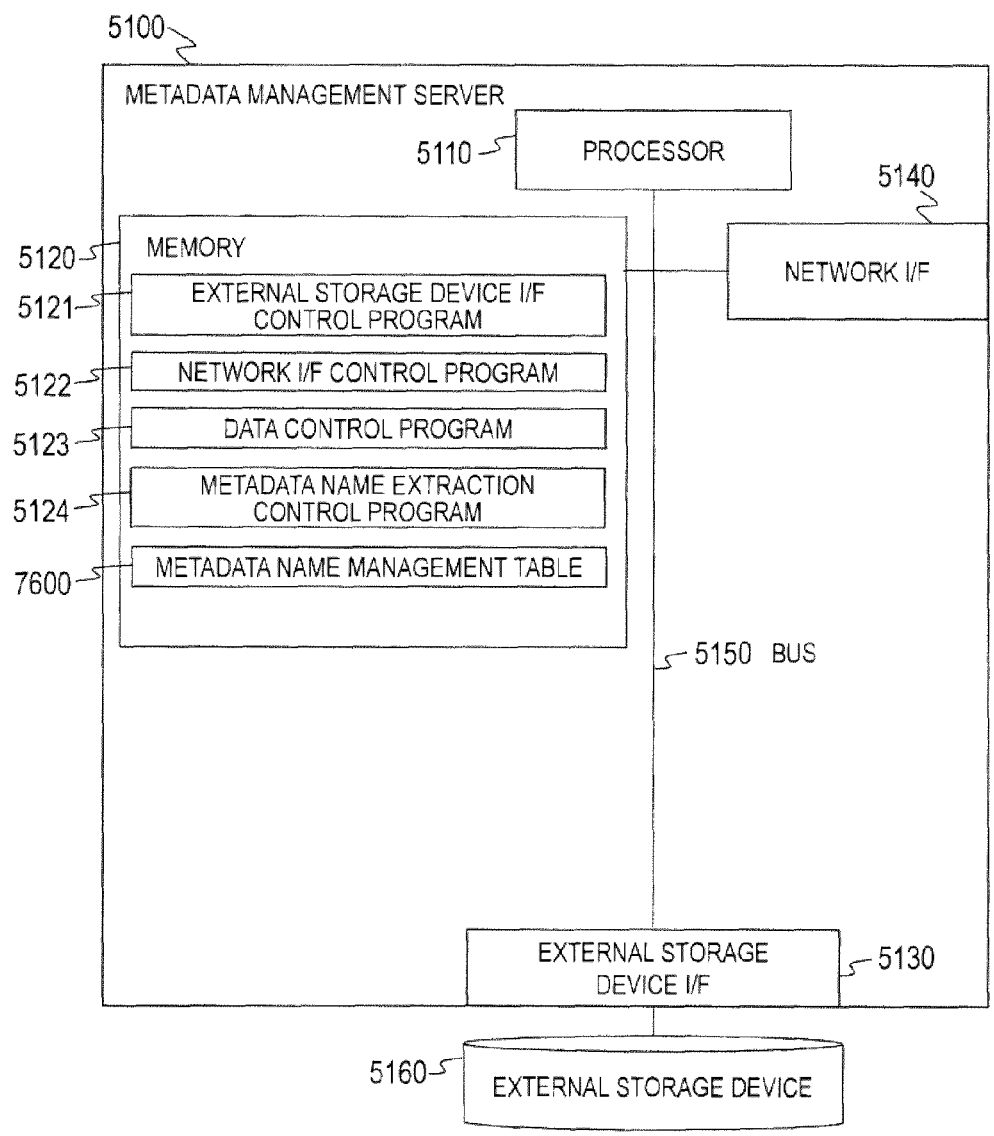
FIG. 37 is a block diagram illustrating a configuration of the metadata management server according to the sixth embodiment of this invention.

FIG. 37 is a block diagram illustrating a configuration of the metadata management server 5100. The metadata management server 5100 includes a processor 5110 for executing programs, a memory 5120 for temporarily storing the programs and data, an external storage device I/F 5130 for accessing an external storage device 5160, a network I/F 5140 for accessing other apparatuses coupled via the network, and a bus 5150 for coupling these devices. The memory 5120 stores programs including an external storage device I/F control program 5121 for controlling the external storage device I/F 5130, a network I/F control program 5122 for controlling the network I/F 5140, a data control program 5123 for providing a file system or database to be used to manage the data stored in the metadata management server 5100, a metadata name extraction control program 5124, and a metadata name management table 7600.

Figure 38A:
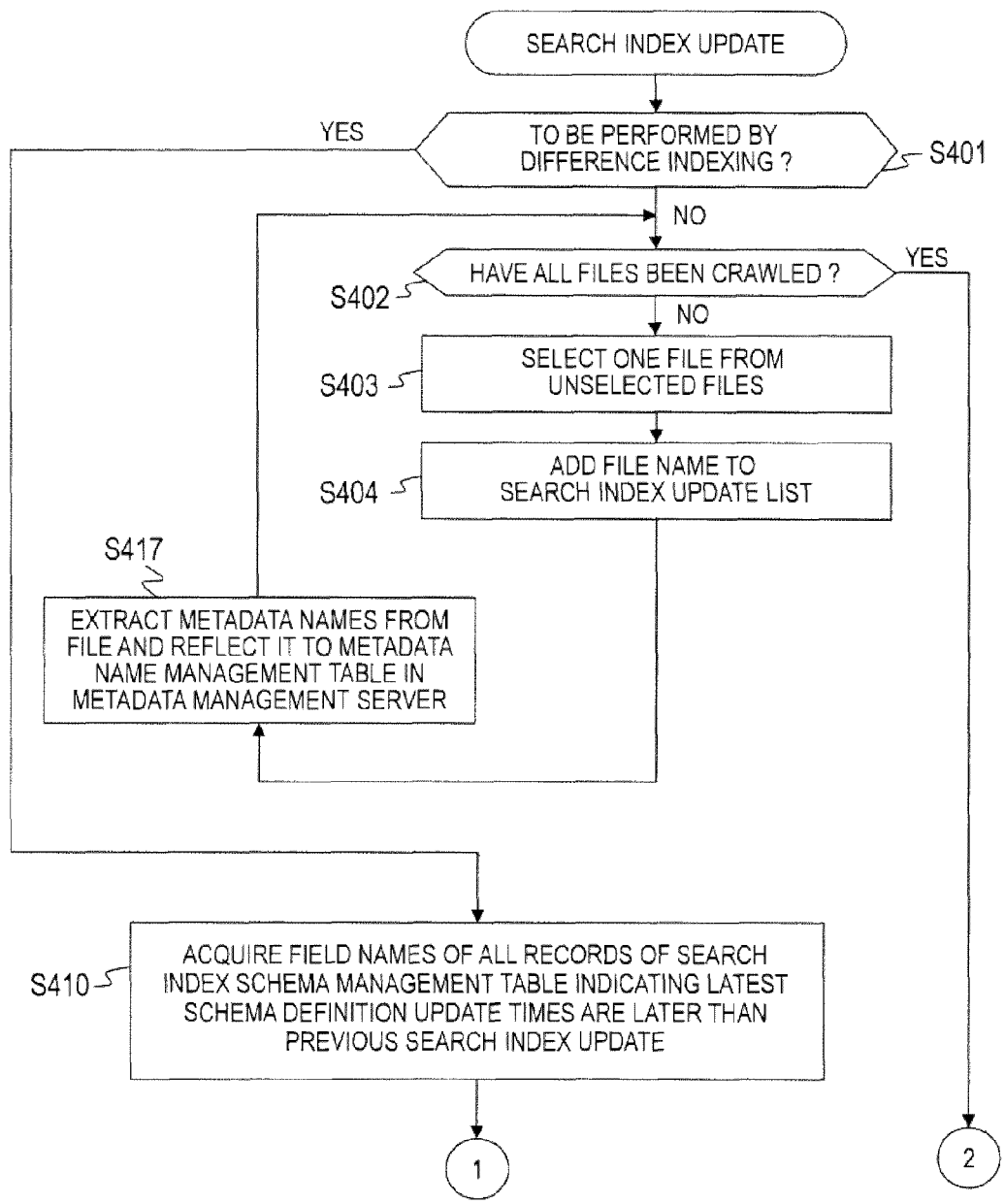
FIG. 38A is a first-half of a flowchart of processing of the search index update according to the sixth embodiment of this invention.
Figure 38B:
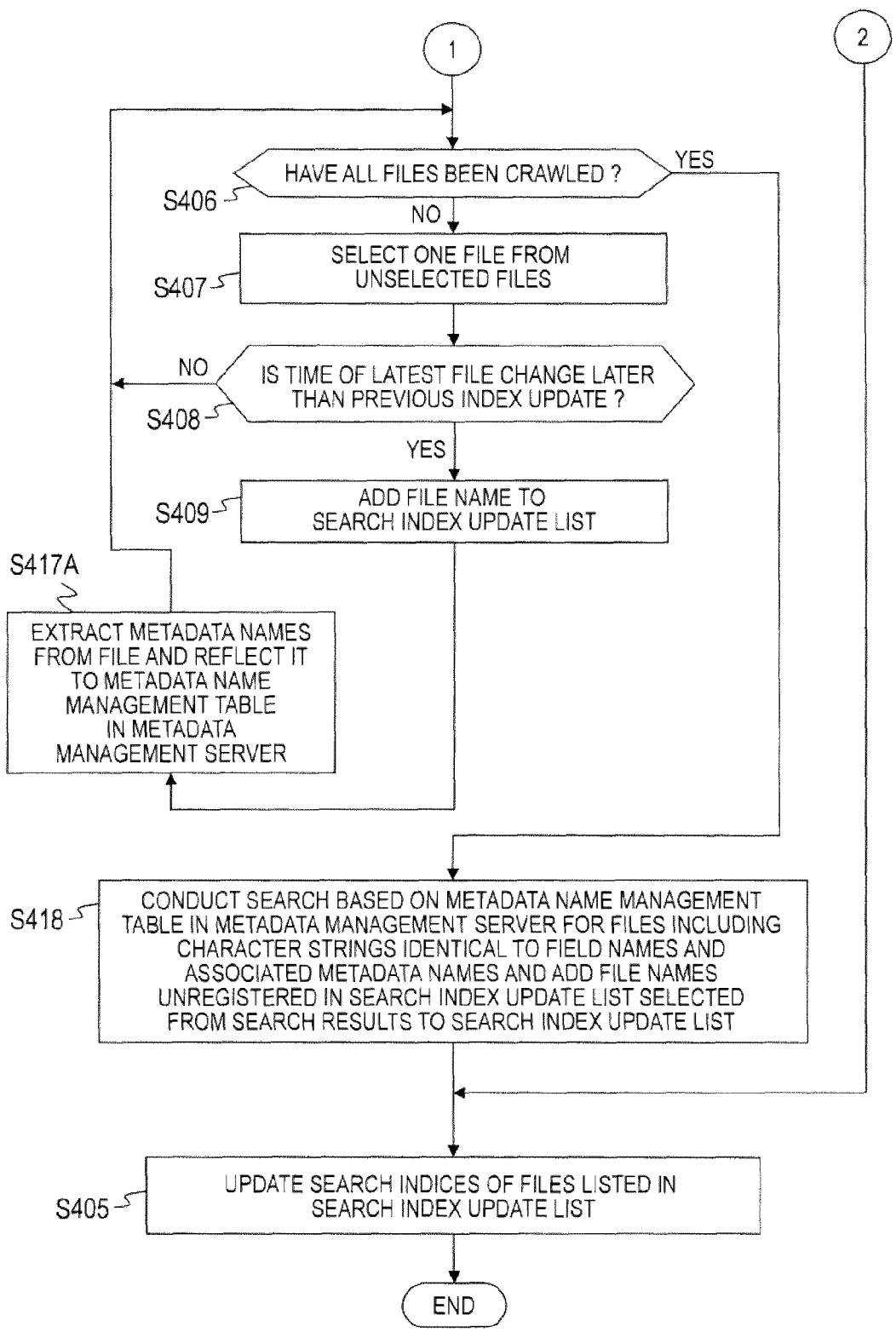
FIG. 38B is a second-half of a flowchart of processing of the search index update according to the sixth embodiment of this invention.

FIGS. 38A and 38B are a flowchart of processing partially modified from the search index update illustrated in FIGS. 32A and 32B in Embodiment 4. Compared to the search index update illustrated in FIG. 32, this processing is different in the points that metadata names extracted from the files are registered in the metadata name management table 7600 in the metadata management server 5100 and that the files in need of updating the search indices are determined by using the metadata name management table 7600 in the metadata management server 5100. The specifics are described in the following.

In the flowchart of FIGS. 38A and 38B, the differences from FIGS. 32A and 32B are that Step S417 and S417A have replaced Steps S414 in FIG. 32A and Step S414A in FIG. 32B, respectively, and that Step S418 has replaced Step S415 in FIG. 32B. The remaining is the same as FIG. 32. Hereinafter, only the differences are described.

After Step S404, after Step S409, or if No at Step S408, the indexing control subprogram 1173 extracts metadata names from the file and reflects the extracted metadata names to the metadata name management table 7600 in the metadata management server 5100 (Step S417, S417A), instead of Step S414. This operation may be performed as part of the indexing of the file. It should be noted that this step needs to be performed only in the case where the search server 1100 extracts metadata names and does not need to be performed in the case where the file server 2100 extracts metadata names.

If Yes at Step S406, the indexing control subprogram 1173 conducts, instead of performing Step S415, a search based on the meta data name management table 7600 in the metadata management server 5100 for the files including character strings identical to the field names and the metadata names associated with the field names, selects the file names unregistered in the search index update list from the files hit as search results, and adds them to the list (Step S418).

Figure 39:
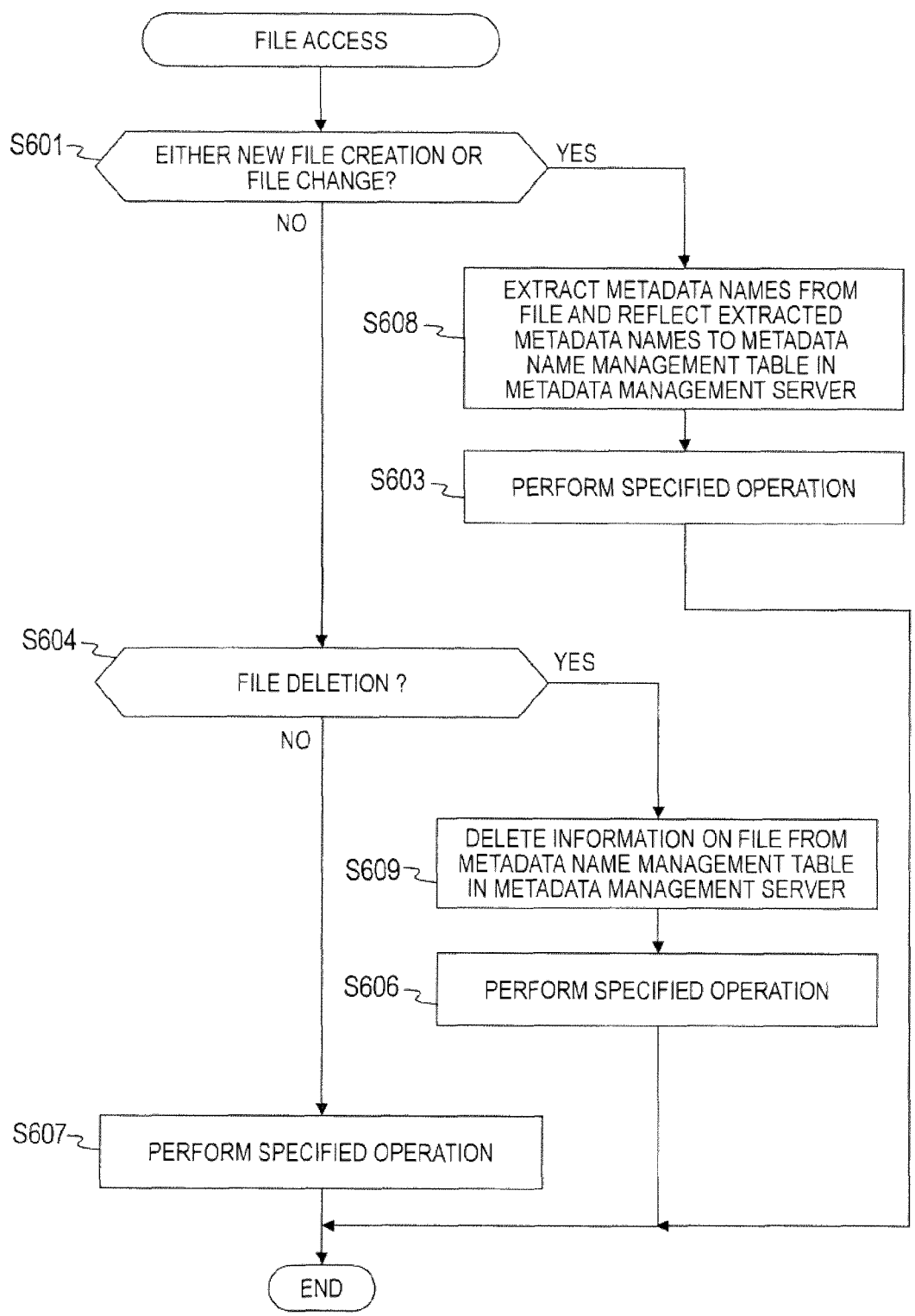
FIG. 39 is a flowchart illustrating file access in the file server according to the sixth embodiment of this invention.

FIG. 39 is a flowchart illustrating file access in the file server 2100 that has been partially modified from the file access illustrated in FIG. 34 in Embodiment 5. This processing is different from the file access illustrated in FIG. 34 in Embodiment 5 in the points that the extracted metadata names are reflected to the metadata name management table 7600 in the metadata management server 5100 and that, in deleting a file, information on the file to be deleted is deleted from the metadata name management table 7600 in the metadata management server 5100. The specifics are described in the following.

In the flowchart of FIG. 39, the differences from FIG. 34 in Embodiment 5 are that Step S608 has replaced Step S602 in FIG. 34 and that Step S609 has replaced Step S605 in FIG. 34. The remaining is the same as FIG. 34 in Embodiment 5. Hereinafter, only the differences are described.

If Yes at Step S601, the file sharing control program 2124 extracts metadata names from the file and reflects the extracted metadata names to the metadata name management table 7600 in the metadata management server 5100 (Step S608), instead of Step S602. This step needs to be performed only in the case where the file server 2100 extracts metadata names and does not need to be performed in the case where the search server 1100 extracts metadata names.

Furthermore, if Yes at Step S604, the file sharing control program 2124 deletes the information on the file to be deleted from the metadata name management table 7600 in the metadata management server 5100 (Step S609), instead of Step S605. This step needs to be performed only in the case where the file server 2100 extracts metadata names and does not need to be performed in the case where the search server 1100 extracts metadata names.

The above-described processing allows the metadata name management table 7600 to be provided in a metadata management server 5100 different from the search server 1100 and the file server 2100 and further can narrow down the files in need of updating the search indices with almost the same accuracy as Embodiment 3.

Embodiment 7

The above-described Embodiment 6 provides an example that metadata extraction to register metadata to the metadata name management table 7600 is performed by the search server 1100 or the file server 2100. This metadata extraction may be performed by a server other than the search server 1100 and the file server 2100. For example, a metadata extraction server may be provided to periodically extract metadata by crawling the files in the file server 2100 or otherwise, the system may be configured to transmit a file via a reverse proxy server to store the file to file server 2100 and the reverse proxy server may act a role of the metadata extraction server to extract metadata from the file. Providing a separate metadata extraction server achieves load balancing in metadata extraction, for example.

For this purpose, demanded is an arrangement to perform metadata extraction at a given server other than the search server 1100 and the file server 2100.

In the following, Embodiment 7 for controlling metadata extraction is described. Embodiment 7 newly introduces a given server (hereinafter, referred to as metadata extraction server) and the metadata extraction server extracts metadata of files and stores the extracted information to a metadata name management table 7600.

The metadata extraction server may extract any information other than metadata. It may reflect the extracted information not only to the metadata name management table 7600 but also to any other management table.

To newly introduce a metadata extraction server and to extract metadata at the metadata extraction server as described above, the configuration of the computer system is partially modified and the metadata extraction server and the processing of metadata extraction are newly added. The specifics of the modification are described with FIGS. 40, 41, and 42.

Figure 40:
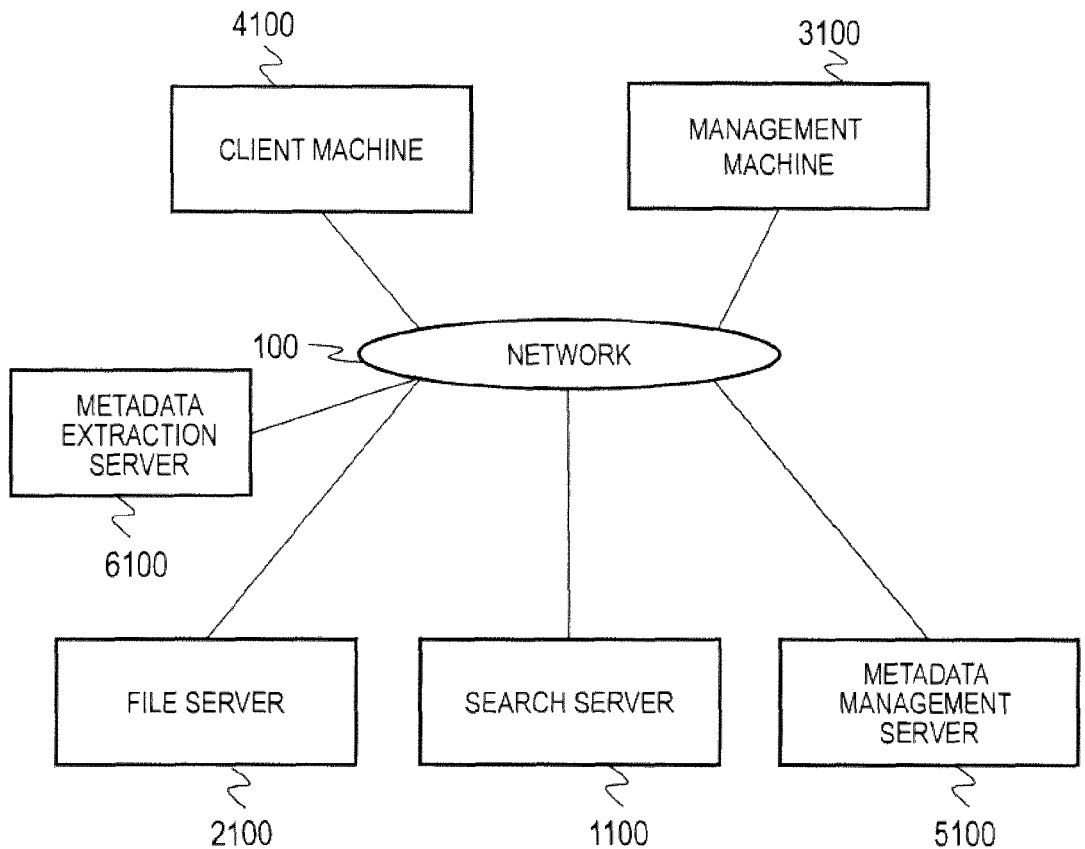
FIG. 40 is a block diagram illustrating a configuration of a computer system according to a seventh embodiment of this invention.

FIG. 40 is a block diagram illustrating a configuration of a computer system which has been partially modified from the computer system illustrated in FIG. 36 in Embodiment 6. This configuration is different from the configuration described with FIG. 36 in Embodiment 6 in the point that a metadata extraction server 6100 has been added. The metadata extraction server 6100 is described later. Although the example of FIG. 40 shows only one metadata extraction server 6100, the number of the metadata extraction servers is not limited to this. A plurality of metadata extraction servers 6100 may be provided. The remaining configuration is the same as shown in FIG. 36.

Figure 41:
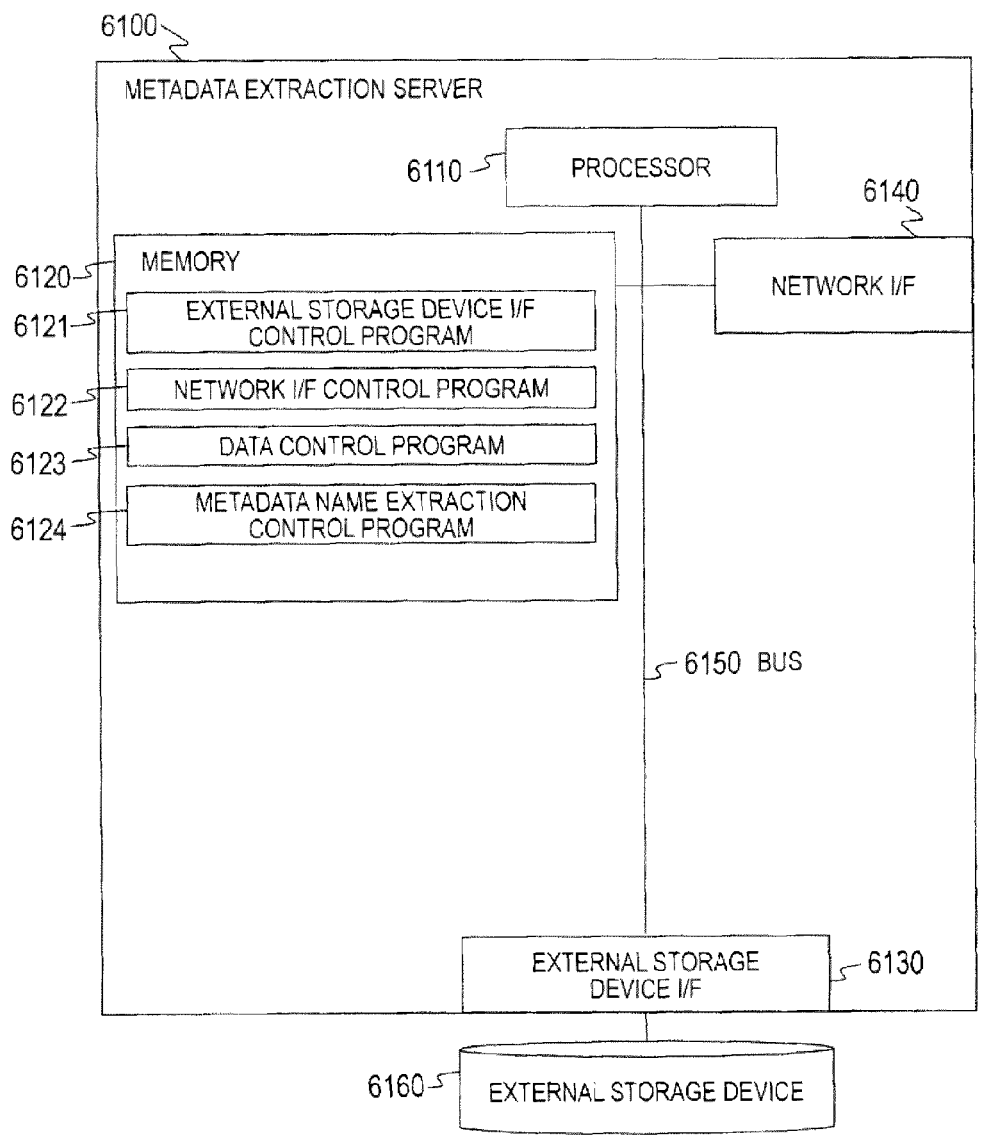
FIG. 41 is a block diagram illustrating a configuration of the metadata extraction server according to the seventh embodiment of this invention.

FIG. 41 is a block diagram illustrating a configuration of the metadata extraction server 6100. The metadata extraction server 6100 includes a processor 6110 for executing programs, a memory 6120 for temporarily storing the programs and data, an external storage device I/F 6130 for accessing an external storage device 6160, a network I/F 6140 for accessing other apparatuses coupled via the network, and a bus 6150 for coupling these devices.

The memory 6120 stores programs including an external storage device I/F control program 6121 for controlling the external storage device I/F 6130, a network I/F control program 6122 for controlling the network I/F 6140, a data control program 6123 for providing a file system or database to be used to manage the data stored in the metadata extraction server 6100, and a metadata name extraction control program 6124.

The metadata name extraction control program 6124 may use a publicly or commonly known string parser program to extract character strings corresponding to metadata names from the file. The metadata extraction server 6100 may manage the metadata name management table 7600.

Figure 42:
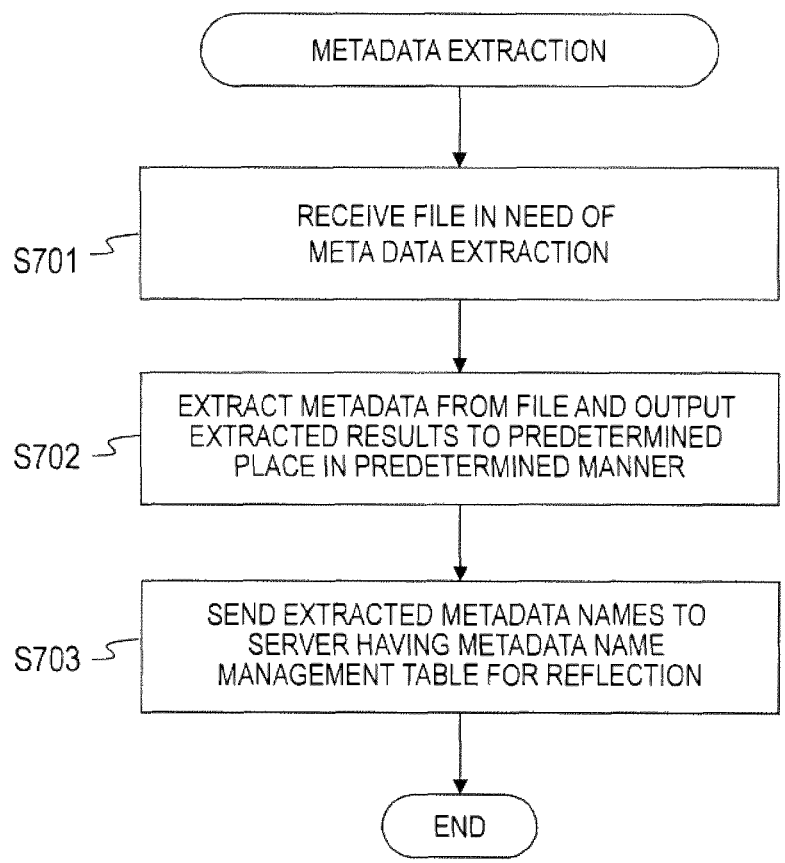
FIG. 42 illustrates a processing flow of metadata extraction according to the seventh embodiment of this invention.

FIG. 42 illustrates a processing flow of metadata extraction provided by the metadata extraction control program 6124 in the metadata extraction server 6100. As to this processing, the processor 6110 executing the metadata extraction control program 6124 acquires a file in need of extraction of metadata, extracts the metadata, and outputs the metadata.

First, the processor 6110 executing the metadata extraction control program 6124 receives a file in need of extraction of metadata (Step S701). For the metadata extraction control program 6124 to determine and acquire files in need of extraction of metadata, a publicly or commonly known technique can be used; accordingly, details are not provided in this description. The metadata extraction server 6100 may periodically perform crawling the file system 2170 in the file server 2100 holding files, receive a file in need of updating the search index from the file server 2100, or act as a reverse proxy server for the file access operations by the file server 2100 to acquire information on the files during the file access operations.

Next, the metadata extraction control program 6124 extracts metadata from the file, performs predetermined processing, and outputs extracted results to a predetermined place (computer) (Step S702). For example, the metadata extraction control program 6124 sends pairs of a name and a value of a piece of extracted metadata to the search server 1100 and the search server 1100 may index the set of metadata for metadata search. The output destination may be the metadata extraction server 6100 itself or a remote server. The output manner and output format can be selected as appropriate so that the output destination can receive the data.

Next, the metadata extraction control program 6124 sends the extracted metadata names to the server (5100) having the metadata name management table 7600 for reflection (Step S703). The metadata name management table 7600 may be included in any server, the local server or a remote server. This step allows the search server 1100 to use the information held in the metadata name management table 7600 in determining the files in need of updating the search indices in the search index update by difference indexing.

The above-described processing enables the metadata extraction server 6100 provided separately from the search server 1100 and the file server 2100 to perform metadata extraction. As a result, load balancing in metadata extraction is achieved.

Embodiment 8

In the above-described Embodiment 2, the search server 1100 crawls all files in the file server 2100 and checks the latest change times of the files to determine the files in need of updating the search indices in performing search index update by difference indexing. However, there is another approach that the file server 2100 makes the determination of files in need of updating the search indices. Specifically, the file server 2100 holds a file operation history for the files. This file operation history is configured to record operation types such as creation, update, deletion, and reference.

The file server 2100 provides a search service based on the file operation history. Specifically, to obtain a list of files that are created, updated, or deleted later than a specific time, the file server 2100 conducts a search with designation of such a search condition to provide a list of files matching the search conditions as search results.

If the search server 1100 can utilize this arrangement, the search server 1100 can request the file server 2100 for a list of files created, updated, and deleted later than the previous index update by designating the previous index update time as search conditions to acquire a file list matching the search conditions. Then, all the files do not need to be crawled, achieving more efficient difference indexing in the search server 1100.

For this purpose, the file server 2100 is demanded to hold a history of file operations in the file server and to have an arrangement (hereinafter, referred to as change file notification control) to search the file operation history.

In the following, control of Embodiment 8 is described. In Embodiment 8, the file server 2100 holds a history of operations on files and has a capability of searching the operation history, and the search server 1100 utilizes this search function in determining the files in need of updating the search indices in performing search index update after update of a search index schema management table 7300 by difference indexing.

To perform change file notification in the file server 2100 and to perform search index update by difference indexing utilizing the change file notification as described above, the hardware configuration of the file server and the processing of the search index update need to be partially modified, and a file change list management table and the processing of file change list registration and file change list inquiry need to be newly added. The specifics of the modification are described with FIGS. 43, 44, 45, 46A, 46B, and 47.

Figure 43:
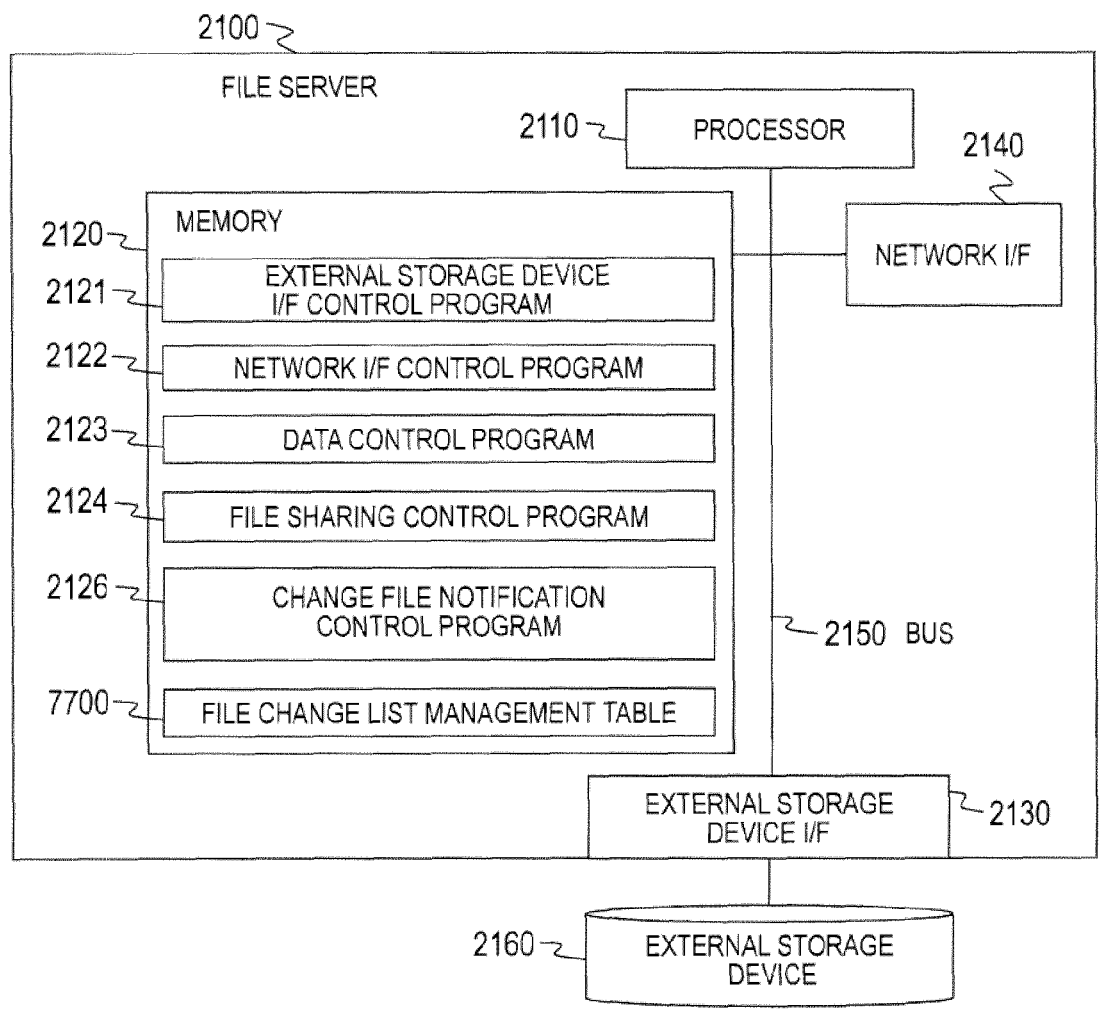
FIG. 43 is a block diagram illustrating a configuration of a file server according to an eighth embodiment of this invention.

FIG. 43 is a block diagram illustrating a configuration of a file server 2100 which has been partially modified from the file server 2100 illustrated in FIG. 3 in Embodiment 1. This configuration is different from the configuration described with FIG. 3 in the points that a change file notification control program 2126 and a file change list management table 7700 have been added in the memory 2120. The change file notification control program 2126 and the file change list management table 7700 are described later. The remaining configuration is the same as shown in FIG. 3 in Embodiment 1.

FIG. 44 is a diagram illustrating a configuration of a file change list management table 7700 managed in the file server 2100. The file change list management table 7700 records and manages information on events such as creation of a new file, update of a file, or deletion of a file in the file server 2100 in accordance with a request from a user (client machine 4100). Specifically, the file change list management table 7700 includes constituent elements such as occurrence times 7710, operation types 7720, object types 7730, and path names 7700.

Each occurrence time 7710 stores information on the time when an event such as creation, update, or deletion has occurred.

Each operation type 7720 stores a piece of information on the type of event. Specifically, it registers a type such as creation, update, or deletion. For the update, information identifying the object where the update has occurred may be added. For example, to distinguish between data update and metadata update of the file, a type of either data update or metadata update may be registered in the field of this operation type 7700.

Each object type 7730 stores a piece of information on the type for categorizing the object where the event has occurred. Specifically, in the case of using a file system, a type such as file or directory is registered. In the case of using a database, a type such as record, column, or tuple is registered.

Each path name 7740 stores a piece of information required to access the object where the event has occurred. Specifically, in the case of using a file system, information such as the path name or the node number of the file may be stored. In the case of using a database, information such as an identification record number of the record may be stored.

Figure 45:
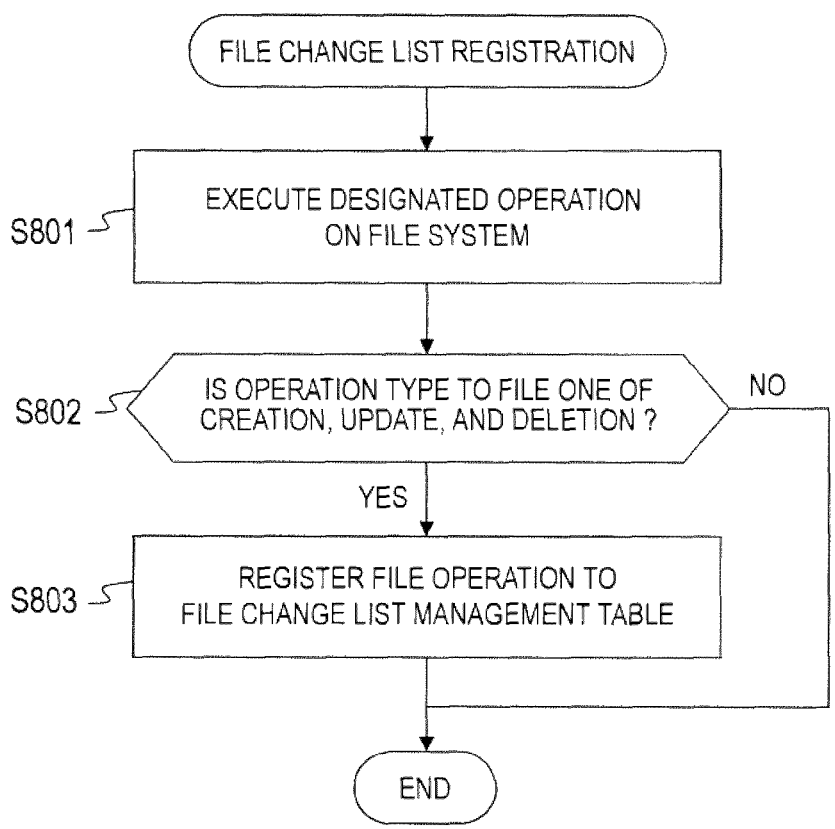
FIG. 45 is a flowchart illustrating a processing flow of file change list registration according to the eighth embodiment of this invention.

FIG. 45 is a flowchart illustrating a processing flow of file change list registration performed by the data control program 2123 in cooperation of the change file notification control program 2126 when the file system managed by the data control program 2123 in the file server receives a file access. The change file notification control program 2126 monitors file access operations in the data control program 2123 all the time and performs predetermined operations as described below when an event to be registered to the file change list occurs.

First, the processor 2110 executing the data control program 2123 performs, upon receipt of a file access request for the file system, a predetermined operation on the file system (Step S801). For example, in the case of a file creation request, it creates a file having a designated name. In the case of a file update request, it reflects specified update information to the designated file. In the case of a file deletion request, it deletes the designated file. In this example, the file change list registration is to be executed for not only the operations on files but also the operations on directories.

Next, the data control program 2123 determines whether the operation type for the file is one of creation, update, and deletion (Step S802). That is to say, the program 2123 determines whether the file operation is an event in need of registration to the file change list at Step S802.

If the determination is that the operation is an event in need of registration to the file change list (Yes at Step S802), the data control program 2123 instructs the change file notification control program 2126 to register the file operation to the file change list management table 7700 (Step S803), and terminates the processing. If the determination is that the operation is not an event in need of registration to the file change list (No at Step S802), the program 2123 terminates the processing without doing anything.

Figure 46A:
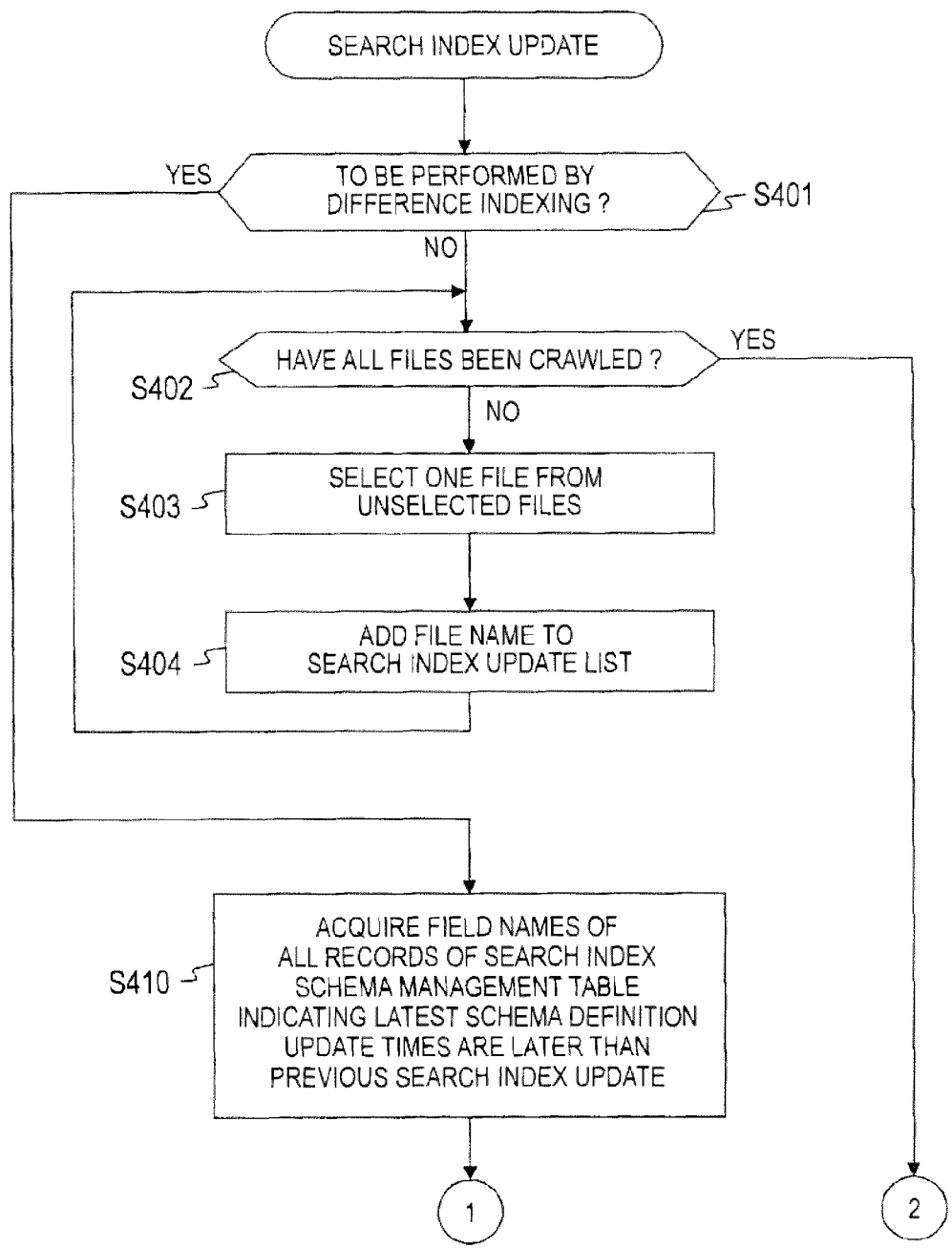
FIG. 46A is a first-half of a flowchart of processing of the search index update according to the eighth embodiment of this invention.
Figure 46B:
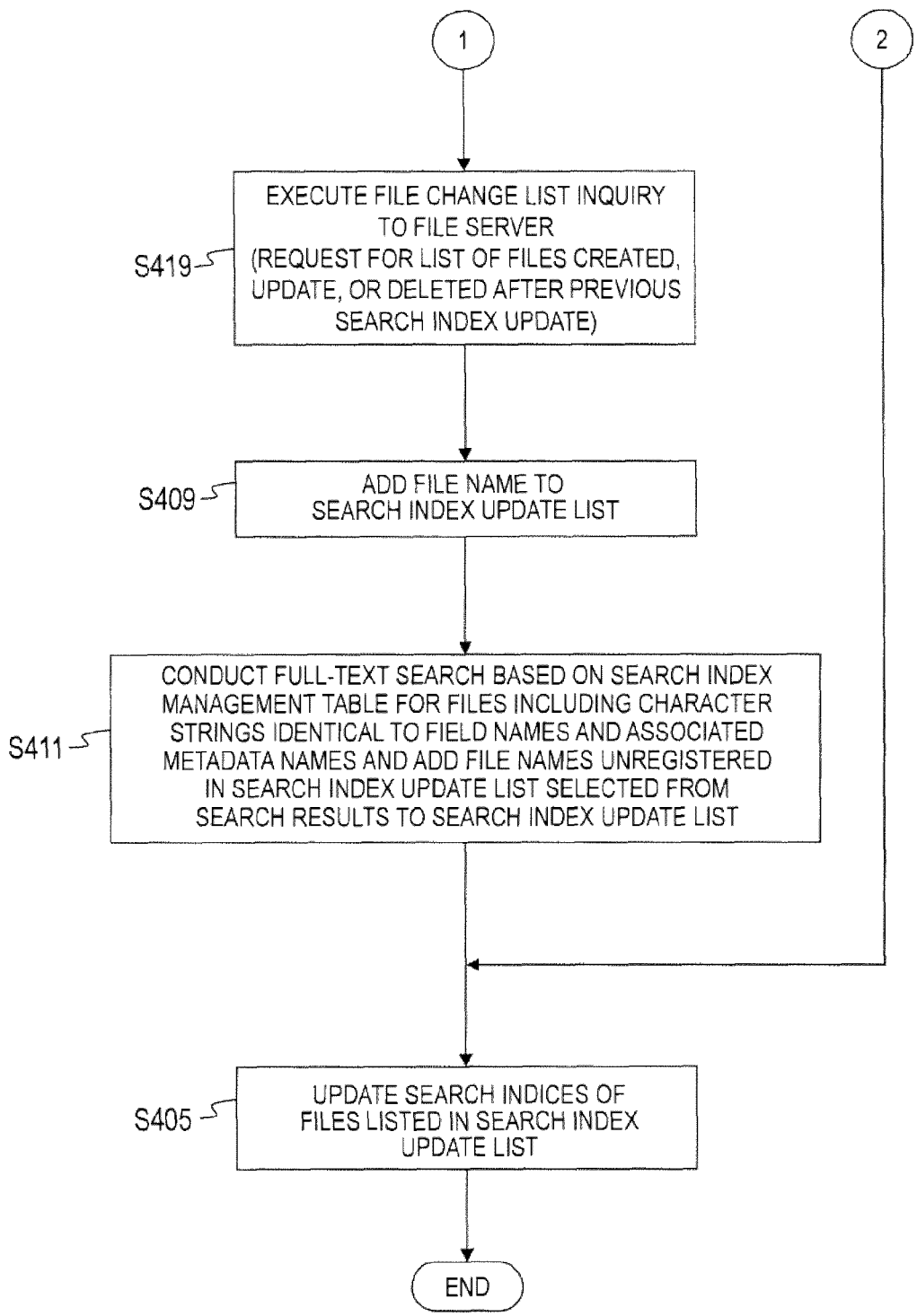
FIG. 46B is a second-half of a flowchart of processing of the search index update according to the eighth embodiment of this invention.

FIGS. 46A and 46B are a flowchart of processing partially modified from the processing of search index update illustrated in FIGS. 26A and 26B in Embodiment 2. Compared to the search index update illustrated in FIGS. 26A and 26B, this processing is different in the point that the files in need of updating the search indices are determined through a search using the change file notification control program 2126 in the file server 2100. The specifics are described in the following.

In the flowchart of FIGS. 46A and 46B, the difference from FIGS. 26A and 26B is that Step S419 has replaced a series of processing subsequent to Step S410 in FIG. 26B (Steps S406, S407, S408, and S409). The remaining is the same as FIGS. 26A and 26B. Hereinafter, only the difference is described.

After Step S410, the indexing control subprogram 1173 performs file change list inquiry to the file server 2100 (Step S419) instead of Steps S406 to S409 in FIG. 26B. At this step, the indexing control subprogram 1173 requests the file server 2100 to provide a list including the files which are newly created, updated, and deleted after the previous search index update time. The file change list inquiry will be described later.

After completion of this step, the indexing control subprogram 1173 adds the file names listed in the file list acquired by the file change list inquiry to the search index update list at Step S409 in FIG. 26B.

Figure 47:
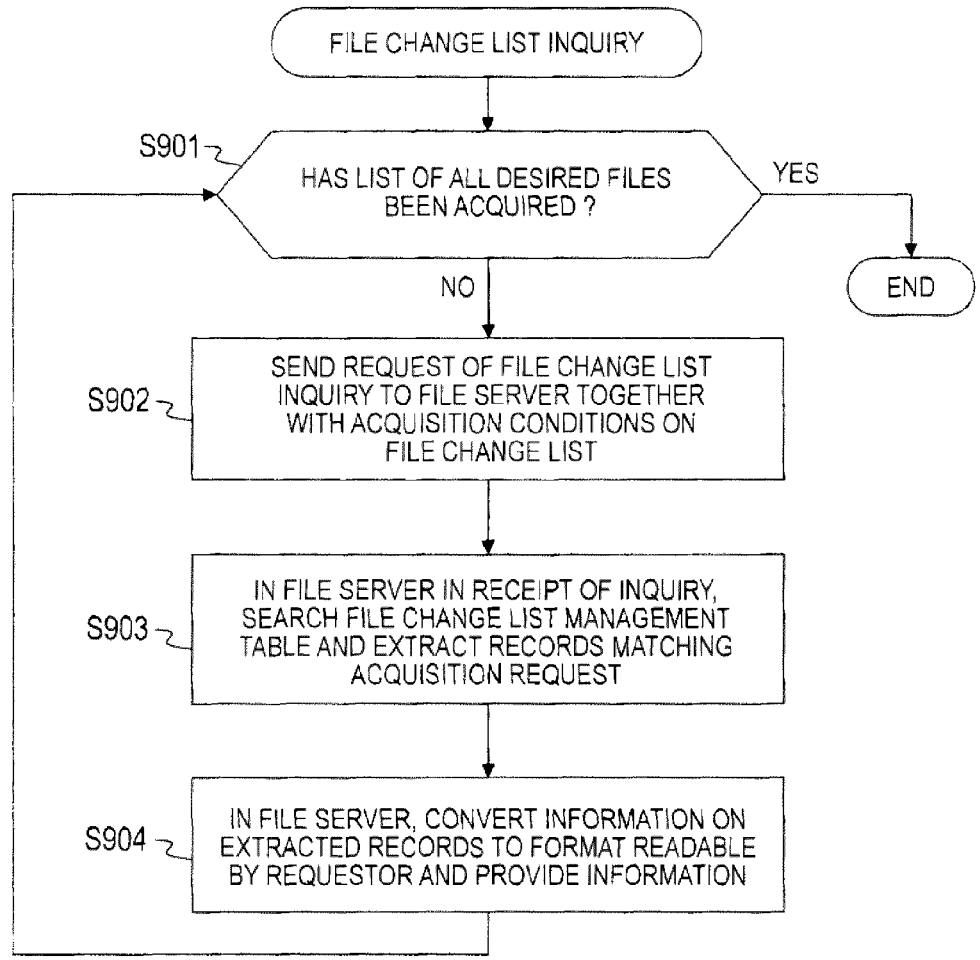
FIG. 47 is a flowchart illustrating a processing flow of the file change list inquiry according to the eighth embodiment of this invention.

FIG. 47 is a flowchart illustrating a processing flow of the file change list inquiry at Step S419 in FIG. 46B. First, the indexing control subprogram 1173 determines whether the search server 1100 has acquired a desired list including all files in need of updating the indices (Step S901). The index update list is sometimes divided for transmission; accordingly, the program 1173 determines whether all the elements divided for transmission have been acquired at this step. If all the files have been acquired (Yes at Step S901), the processing is terminated.

If all the files have not been acquired yet (No at Step S901), the indexing control subprogram 1173 sends a file change list inquiry request to the file server 2100 together with the condition to acquire the file change list (Step S902). At this step, the indexing control subprogram 1173 designates the information on the time of the previous update of search indices in the search server 1100 as the acquisition condition to send the inquiry request.

The change file notification control program 2126 in the file server 2100 that has received the inquiry searches the file change list 7700 to extract records matching the designated acquisition conditions (Step S903).

The change file notification control program 2126 then converts the information on the extracted records to a format readable by the requestor and provides it to the requestor of the search server 1100 (Step S904). Thereafter, the program 2126 returns to Step S901 and repeats the above-described processing.

Through the above-described processing in which the file server 2100 performs change file notification control, the search server 1100 does not need to crawl all the files, achieving efficient search index update by difference indexing.

Accordingly, in search index update after update of the fields of the search index schema management table 7300, the search index update can be performed efficiently.

What is claimed is:

1. A search apparatus of searching data, the search apparatus comprising:
    a processor;
    a memory;
    metadata schema management information for managing metadata schema definitions each defining a structure of files to be searched, the files including metadata;
    search index schema management information for managing search index schema definitions each defining a structure of search index data;
    schema mapping management information for managing correspondence relations between the metadata schema management information and the search index schema definitions; and
    a search controller configured to receive a search request and to extract files matching the search request using the schema mapping management information and the search index schema management information,
    wherein the metadata schema management information includes aliases of namespaces for identifying the metadata schema definitions and metadata names,
    wherein each of the search index schema definitions includes field names of the files to be searched,
    wherein the schema mapping management information includes correspondence relations of the metadata names and the field names,
    wherein the search controller is configured to:
        extract at least either an alias or one or more metadata names from the search request;
        convert the alias to metadata names using the metadata schema management information including the aliases of namespaces that are uniquely identifiable to the search controller; and
        identify field names from the metadata names using the schema mapping management information.

2. The search apparatus according to claim 1, further comprising:
    search index management information for holding correspondence relations between the field names defined in the search index schema definitions and the files,
    wherein the search controller is configured to:
        extract at least either an alias or one or more metadata names from the search request;
        identify metadata names from the alias using the metadata schema management information;
        identify field names from the metadata names using the schema mapping management information; and
        identify files matching the identified field names using the search index management information.

3. The search apparatus according to claim 2, wherein the search controller is configured to:
    receive information identifying whether the search index management information is to be created for each of the field names in registering a search index schema definition; and
    register the field name to the search index management information in a case where the information identifies that the search index management information is to be created.

4. The search apparatus according to claim 1, wherein the metadata schema management information stores the aliases of namespaces.

5. The search apparatus according to claim 2,
    wherein the search index schema management information includes update time information storing a time when one of the operations of update, creation, and deletion is executed for each of the search index schema definitions, and
    wherein the search controller is configured to:
        identify field names for which values of the update time information satisfy a predetermined condition;
        determine files associated with the identified field names to be files in need of updating from the search index management information; and
        execute difference indexing to update the values of the search index management information for the determined files in need of updating.

6. The search apparatus according to claim 2, wherein the search controller is configured to:
    determine files in need of updating the values of the search index management information to be files in need of updating by crawling; and
    update the values of the search index management information for the determined files in need of updating.

7. The search apparatus according to claim 2,
wherein the search apparatus is coupled with a file server storing the files to be searched,
wherein the file server is configured to:
store operation records on the files to be searched; and
determine files on which the operation records match a predetermined condition to be files in need of updating, and
wherein the search controller is configured to update the values of the search index management information for the determined files in need of updating.

8. The search apparatus according to claim 5, wherein the search controller is configured to:
update the values of the search index management information for all the files in need of updating after updating a search index schema definition; and
incorporate information on the files associated with the updated search index schema definition to the search index management information.

9. The search apparatus according to claim 5, wherein the search controller is configured to:
extract and index all metadata names of the files in need of updating after updating a search index schema definition;
search for files including a metadata name of a character string identical to the metadata name associated with a field name in the search index schema definition;
determine the files hit by the search to be the files in need of updating and update the values of the search index management information on the determined files; and
incorporate information on the files associated with the updated search index schema definition to the search index management information.

10. The search apparatus according to claim 5, further comprising metadata name management information storing information on files including metadata names associated with the field names in the search index schema management information,
wherein the search controller is configured to:
search the metadata name management information for files including a character string identical to the metadata name associated with a field name in a search index schema definition after updating the search index schema definition;
determine the files hit by the search to be the files in need of updating and update the values of the search index management information on the determined files; and
incorporate information on the files associated with the updated search index schema definition to the search index management information.

11. The search apparatus according to claim 5,
wherein the search apparatus is coupled with a file server storing the files to be searched,
wherein the file server includes metadata name management information storing information on files including metadata names associated with the field names in the search index schema management information, and
wherein the search controller is configured to:
search the metadata name management information in the file server for files including a character string identical to the metadata name associated with a field name in a search index schema definition after updating the search index schema definition;
determine the files hit by the search to be the files in need of updating and update the values of the search index management information on the determined files; and
incorporate information on the files associated with the updated search index schema definition to the search index management information.

12. The search apparatus according to claim 5,
wherein the search apparatus is coupled with a metadata management server,
wherein the metadata management server includes metadata name management information storing information on files including metadata names associated with the field names in the search index schema management information, and
wherein the search controller is configured to:
search the metadata name management information in the metadata management server for files including a character string identical to the metadata name associated with a field name in a search index schema definition after updating the search index schema definition;
determine the files hit by the search to be the files in need of updating and update the values of the search index management information on the determined files; and
incorporate information on the files associated with the updated search index schema definition to the search index management information.

13. The search apparatus according to claim 5,
wherein the search apparatus is coupled with a file server storing the files to be searched, and
wherein the file server is configured to extract files including a metadata name associated with a field name in the search index schema management information.

14. The search apparatus according to claim 5,
wherein the search apparatus is coupled with a metadata extraction server for extracting metadata, and
wherein the metadata extraction server is configured to extract files including a metadata name associated with a field name in the search index schema management information.

15. A method of controlling a search apparatus of searching data,
the search apparatus including:
a processor;
a memory;
metadata schema management information for managing metadata schema definitions each defining a structure of files to be searched, the files including metadata;
search index schema management information for managing search index schema definitions each defining a structure of search index data; and
schema mapping management information for managing correspondence relations between the metadata schema management information and the search index schema definitions,
the method comprising:
a first step of receiving, by the search apparatus, a search request;
a second step of extracting, by the search apparatus, at least either an alias or one or more metadata names from the search request;
a third step of converting, by the search apparatus, the alias to metadata names using the metadata schema management information including aliases of namespaces that are uniquely identifiable to the search apparatus; and a fourth step of identifying, by the search apparatus, field names from the metadata names using the schema mapping management information.

16. The method of controlling the search apparatus according to claim 15, wherein the search apparatus further includes search index management information for holding correspondence relations between the field names defined in the search index schema definitions and the files, and wherein the method further comprises a fifth step of identifying, by the search apparatus, files matching the identified field names using the search index management information.

17. A non-transitory recording medium storing a program for a computer to search data, the computer including:
a processor;
a memory;
metadata schema management information for managing metadata schema definitions each defining a structure of files to be searched, the files including metadata;
search index schema management information for managing search index schema definitions each defining a structure of search index data; and
schema mapping management information for managing correspondence relations between the metadata schema management information and the search index schema definitions, the program being configured to make the computer execute:
a first step of receiving a search request;
a second step of extracting at least either an alias or one or more metadata names from the search request;
a third step of converting the alias to metadata names using the metadata schema management information including aliases of namespaces that are uniquely identifiable to the computer; and
a fourth step of identifying field names from the metadata names using the schema mapping management information.

18. The non-transitory storage medium according to claim 17, wherein the search apparatus further includes search index management information for holding correspondence relations between the field names defined in the search index schema definitions and the files, and wherein the program is configured to make the computer further execute a fifth step of identifying files matching the identified field names using the search index management information.

* * * * *